(12) United States Patent
Aoki et al.

(10) Patent No.: US 6,178,052 B1
(45) Date of Patent: Jan. 23, 2001

(54) FINDER OPTICAL SYSTEM

(75) Inventors: Norihiko Aoki, Sagamihara; Takayoshi Togino, Koganei, both of (JP)

(73) Assignee: Olympus Optical Co., Ltd., Tokyo (JP)

( * ) Notice: Under 35 U.S.C. 154(b), the term of this patent shall be extended for 0 days.

(21) Appl. No.: 08/998,481

(22) Filed: Dec. 29, 1997

(30) Foreign Application Priority Data

Dec. 27, 1996 (JP) .................................................. 8-351541

(51) Int. Cl.[7] ............................. G02B 17/00; G02B 27/14
(52) U.S. Cl. ........................ 359/730; 359/631; 359/633; 359/728
(58) Field of Search .................................. 359/631, 633, 359/637, 638, 640, 726–730; 396/373, 382, 384–385

(56) References Cited

U.S. PATENT DOCUMENTS

| | | | |
|---|---|---|---|
| 3,810,221 | 5/1974 | Plummer | 396/382 |
| 3,836,931 | 9/1974 | Plummer | 396/352 |
| 5,699,194 | * 12/1997 | Takahashi | 359/633 |
| 5,701,202 | * 12/1997 | Takahashi | 359/631 |
| 5,812,323 | * 9/1998 | Takahashi | 359/630 |
| 5,815,326 | * 9/1998 | Takahashi | 359/729 |
| 5,847,887 | 12/1998 | Ogura | 359/822 |
| 6,008,948 | * 12/1999 | Togino | 359/637 |

FOREIGN PATENT DOCUMENTS

| | | |
|---|---|---|
| 722 106 | 7/1996 | (EP) . |
| 722 106 A2 | 7/1996 | (EP) . |
| 730 179 a2 | 9/1996 | (EP) . |
| 730 183 A2 | 9/1996 | (EP) . |
| 59-84201 | 5/1959 | (JP) . |
| 62-144127 | 6/1987 | (JP) . |
| 62-205547 | 9/1987 | (JP) . |
| 8-201912 | 8/1996 | (JP) . |
| 8-292371 | 11/1996 | (JP) . |
| 8-292372 | 11/1996 | (JP) . |

* cited by examiner

Primary Examiner—Georgia Epps
Assistant Examiner—Jordan M. Schwartz
(74) Attorney, Agent, or Firm—Pillsbury Madison & Sutro LLP

(57) ABSTRACT

An object of the invention is to provide a compact yet high-performance finder optical system comprising an image inversion optical subsystem having a decentered reflecting surface, which enables a bright, distortion-free image to be observed. This object is achieved by locating a rotationally asymmetric surface in the image inversion optical subsystem forming part of the finder optical system.

5 Claims, 35 Drawing Sheets

FINDER OPTICAL SYSTEM

BACKGROUND OF THE INVENTION

The present invention relates generally to a finder optical system comprising an image inversion optical subsystem, and more particularly to a finder optical system for viewing an image of an object inverted by an objective in the form of an erected image using an image inversion optical subsystem.

Typical finder optical systems are known from U.S. Pat. Nos. 3,810,221 and 3,836,931, JP-A's 59-084201, 62-144127, 62-205547, 1-257834 (corresponding to U.S. Pat. No. 5,274,406), 8-201912, 8-234137, 8-248481, 8-292368, 8-292371 and 8-292372, and EP 0722106A2.

These prior art systems include a single image formation type real image finder optical system used on cameras or video cameras, which makes use of an image inversion optical subsystem comprising an elaborately combined mirror and prism arrangement for the observation of an erected image. This optical system is not only designed to erect an inverted image of an object by use of a combined mirror and prism, but is also designed to achieve size reductions by using a turn-back optical path. Since the reflecting surfaces of the mirror and prism in the image inversion optical subsystem are decentered with respect to the optical axis, however, rotationally asymmetric decentration aberrations are produced when the reflecting surfaces have powers. The resulting optical performance loss can never be prevented only by use of a rotationally symmetric lens. For this reason, optical elements such as mirrors and prisms in image inversion optical subsystems are generally in plano surface forms.

To meet recently increasing demands for size reductions of cameras and video cameras, it is now required to achieve further size reductions of finder optical systems used on them. To this end, various investigations are made of the direction and angle of the reflecting surfaces of mirror and prism elements in image inversion optical subsystems or combinations of such optical elements. However, any drastic solution to this problem cannot be obtained because such reflecting surfaces are still used in plano surface forms.

SUMMARY OF THE INVENTION

In view of such problems associated with the prior art, it is an object of the invention to provide a compact yet high-performance finder optical system which enables decentration aberrations to be corrected by means of a rotationally asymmetric surface.

According to one aspect of the invention, the aforesaid object is achieved by the provision of an image inversion optical subsystem comprising a reflecting optical element incapable of image inversion, wherein a rotationally asymmetric surface is provided at an optical surface of said reflecting optical element. According to another aspect of the invention, there is provided an image inversion optical subsystem comprising an image inversion optical element having image inversion action (at least on vertical inversion of an image or horizontal inversion of an image), wherein a rotationally asymmetric surface is provided at an optical surface of said optical element.

By the term "rotationally asymmetric surface" used herein is intended every surface having a rotationally asymmetric surface shape. Therefore, it is understood that the term "rotationally asymmetric surface" includes an optical surface with an axis of rotational symmetry designed to be located outside of the surface. However, it is understood that the rotationally asymmetric surface does not include a surface with an axis of rotational symmetry located inside and at a position off the center thereof, because a part of surface shape is of rotational symmetry. Surface shape is passed on defined for an area (effective area) of a physically optical surface through which light beams pass rather than on a non-effective area thereof through which only ghost or flare light passes. In this regard, however, the rotationally asymmetric surface with a section in both the X- and Y-axis directions taking a curved surface (line) shape is understood to refer to a toric or other surface, except a cylindrical surface with a sectional shape in one direction taking a plano surface (straight line) form.

The term "rotationally asymmetric surface having no axis of rotational symmetry both inside and outside" is understood to refer to a surface free of rotational symmetry at design stages such as an anamorphic surface, except a rotationally asymmetric surface having an axis of rotational symmetry outside such as a toric or cylindrical surface. The term "rotationally asymmetric surface" used herein is also understood to include a surface having two surfaces symmetric with respect to a plane (the surfaces may be called axially symmetric surfaces in two-dimensional planes but cannot be expressed in terms of axial symmetry, because surfaces include curved surfaces in addition to plano surfaces), a free form surface symmetric with respect to a plane (TFC surface for short) having only one surface symmetric with respect to plane, and an asymmetric polynomial surface (APS surface for short).

As one example, the rotationally asymmetric surface is defined by the following polynomial (a):

$$\begin{aligned} Z = &\ C_2 + C_3 y + C_4 x + C_5 y^2 + C_6 yx + C_7 x^2 + \\ &\ C_8 y^3 + C_9 y^2 x + C_{10} yx^2 + C_{11} x^3 + C_{12} y^4 + \\ &\ C_{13} y^3 x + C_{14} y^2 x^2 + C_{15} yx^3 + C_{16} x^4 + C_{17} y^5 + \\ &\ C_{18} y^4 x + C_{19} y^3 x^2 + C_{20} y^2 x^3 + C_{21} yx^4 + C_{22} x^5 + \\ &\ C_{23} y^6 + C_{24} y^5 x + C_{25} y^4 x^2 + C_{26} y^3 x^3 + C_{27} y^2 x^4 + \\ &\ C_{28} yx^5 + C_{29} x^6 + C_{30} y^7 + C_{31} y^6 x + C_{32} y^5 x^2 + \\ &\ C_{33} y^4 x^3 + C_{34} y^3 x^4 + C_{35} y^2 x^5 + C_{36} yx^6 + C_{37} x^7 \end{aligned} \quad (a)$$

In general, the surface defined by the above polynomial (a) has no symmetric surface with respect to both the x-z axis and the y-z axis. If, for instance, all the odd number terms with respect to x are reduced to zero, it is then possible to obtain a TFC surface wherein there is only one symmetric surface parallel with the y-z surface. As one example, this may be achieved by reducing the coefficients of terms $C_4$, $C_6$, $C_9$, $C_{11}$, $C_{13}$, $C_{15}$, $C_{18}$, $C_{20}$, $C_{22}$, $C_{24}$, $C_{26}$, $C_{28}$, $C_{31}$, $C_{33}$, $C_{35}$ and $C_{37}$ . . . .

If the odd number terms with respect to y are all reduced to zero, it is also possible to obtain a TFC surface wherein there is only one symmetric surface parallel with the x-z surface. As one example, this may be achieved by reducing the coefficients of terms $C_3$, $C_6$, $C_8$, $C_{10}$, $C_{13}$, $C_{15}$, $C_{17}$, $C_{19}$, $C_{21}$, $C_{24}$, $C_{26}$, $C_{28}$, $C_{30}$, $C_{32}$, $C_{34}$ and $C_{36}$ . . . . Productivity is improved by the symmetric surface.

It is more preferable to use an APS surface having no symmetric surface at all. This is because there is an increase in the degree of freedom in designing a compact surface while making as good correction for aberrations as possible.

The above defining polynomial is given as one example. As mentioned above, the major feature of the invention is to make correction for rotationally asymmetric decentration aberrations produced at a rotationally asymmetric surface. It is thus understood that all other polynomials defining the rotationally asymmetric surface hold for the invention.

For instance, the rotationally asymmetric surface may be defined by Zernike's polynomial. That is, the shape of this surface may be defined by the following polynomial (b) with the Z-axis being an axis in Zernike's polynomial. The rotationally asymmetric surface is defined by polar coordinates for the height of the Z-axis with respect to the X-Y surface. Here A is a distance from the Z-axis in the X-Y surface, and R is an angle of azimuth around the Z-axis as represented by an angle of rotation measured from the Z-axis.

$$X = R \times \cos(A)$$
$$Y = R \times \sin(A)$$
$$\begin{aligned}Z = &\, D_2 + D_3 R \cos(A) + D_4 R \sin(A) + D_5 R^2 \cos(2A) + \\ & D_6(R^2 - 1) + D_7 R^2 \sin(2A) + D_8 R^3 \cos(3A) + \\ & D_9(3R^3 - 2R)\cos(A) + D_{10}(3R^3 - 2R)\sin(A) + \\ & D_{11} R^3 \sin(3A) + D_{12} R^4 \cos(4A) + D_{13}(4R^4 - 3R^2)\cos(3A) + \\ & D_{14}(6R^4 - 6R^2 + 1) + D_{15}(4R^4 - 3R^2)\sin(2A) + \\ & D_{16} R^4 \sin(4A) + D_{17} R^5 \cos(5A) + D_{18}(5R^5 - 4R^3)\cos(3A) + \\ & D_{19}(10R^5 - 12R^3 + 3R)\cos(A) + D_{20}(10R5 - 12R3 + 3R)\sin(A) + \\ & D_{21}(5R^5 - 4R^3)\sin(3A) + D_{22} R^5 \sin(5A) + D_{23} R^6 \cos(6A) + \\ & D_{24}(6R^6 - 5R^4)\cos(4A) + D_{25}(15R^6 - 20R^4 + 6R^2)\cos(2A) + \\ & D_{26}(20R^6 - 30R^4 + 12R^2 - 1) + D_{27}(15R^6 - 20R^4 + 6R^2)\sin(2A) + \\ & D_{28}(6R^6 - 5R^4)\sin(4A) + D_{29} R^6 \sin(6A)\end{aligned} \quad (b)$$

It is here noted that the surface is expressed as a symmetric surface in the X direction. However, Dm (where m is an integer of 2 or more) is a coefficient.

Besides, the rotationally asymmetric surface may be defined by the following equation (c):

$$Z = \Sigma n \Sigma m C n m X^m Y^{n-m}$$

where Σn indicates that n for Σ is 0 to k, and Σm indicates that m for Σ is 0 to n.

Here consider k=7 (7th term) as one example. A surface symmetric in the X-direction, where k=7 and coefficients of odd number terms for X are zero ($C_4$, $C_6$, $C_9$=0), may also be represented by the following polynomial (c):

$$\begin{aligned}Z = &\, C_2 + C_3 y + C_4|x| + C_5 y^2 + C_6 y|x| + \\ & C_7 x^2 + C_8 y^3 + C_9 y^2|x| + C_{10} y x^2 + C_{11}|x^3| + \\ & C_{12} y^4 + C_{13} y^3|x| + C_{14} y^2 x^2 + C_{15} y|x^3| + \\ & C_{16} x^4 + C_{17} y^5 + C_{18} y^4|x| + C_{19} y^3 x^2 + C_{20} y^2|x^3| + \\ & C_{21} y x^4 + C_{22} y|x^5| + C_{23} y^6 + C_{24} y^5|x| + C_{25} y^4 x^2 + \\ & C_{26} y^3|x^3| + C_{27} y^2 x^4 + C_{28} y|x^5| + C_{29} x^6 + C_{30} y^7 + \\ & C_{31} y^6|x| + C_{32} y^5 x^2 + C_{33} y^4|x^3| + C_{34} y^3 x^4 + \\ & C_{35} y^2|x^5| + C_{36} y x^6 + C_{37}|x^7|\end{aligned} \quad (c)$$

It is noted that the term with respect to an aspheric surface with no data given thereon is zero. For the index of refraction, d-line indices of refraction (at 587.56 nm wavelength) are given. Length is given in mm.

The first aspect of the invention is now explained.

According to the first aspect of the invention, there is provided a single image formation type finder optical system comprising a surface acting as an objective for forming an object image, an image inversion optical subsystem for erecting said object image, and a surface acting as an eyepiece for observing said object image, wherein said image inversion optical subsystem comprises an image inversion optical element including an image inversion reflecting surface acting to invert at least said object image vertically or horizontally and a reflection optical element including at least one reflecting surface and incapable of image inversion, and said reflection optical element comprises a power surface for imparting converging or diverging action to a light beam and a rotationally asymmetric surface having a rotationally asymmetric surface shape, with a sectional shape passing through a center of said surface entirely defined by a curved surface.

Preferably, the aforesaid rotationally asymmetric surface has no axis of rotational symmetry both inside and outside.

Preferably, a toric surface, an anamorphic surface or a TFC surface is used as the aforesaid rotationally asymmetric surface although depending on what purpose it is used for.

According to one embodiment of the first aspect of the invention, there is provided a finder optical system including an image inversion optical subsystem comprising a plurality of optical elements each having at least one reflecting surface, wherein at least one of said optical elements is incapable of image inversion and has power, said at least one optical element having at least a rotationally asymmetric surface, with an axial chief ray crossing over itself therein.

First, the terms used in the first aspect of the invention are defined along with an explanation of the coordinate system used.

By the term "image inversion optical subsystem" used in the first aspect of the invention is intended every optical element comprising at least one reflecting surface and having action to erect an inverted image of an object while an optical path is turned back. In the present disclosure, an optical element which is by itself incapable of image inversion but has at least a reflecting surface to turn back an optical system, too, may be regarded as a part of the image inversion optical subsystem.

By the term "image inversion" used herein is intended not only image inversion whereby an inverted real image of an object is inverted into an erected image, but also image inversion whereby an inverted real image of an object is inverted either vertically or horizontally.

The coordinate system used herein is explained. Assume that an axial chief ray is defined by a light ray passing through the center of an object point to the center of an image plane via the center of a stop or aperture, a Z-axis is defined by an optical axis represented by a segment of a straight line intersecting with and terminating at a first surface of an optical system, a Y-axis is defined by an axis perpendicular to the Z-axis and lying in a decentered surface of each of surfaces forming the finder optical system, and an X-axis is defined by an axis perpendicular to the Y-axis. The image inversion referred to in the first aspect of the invention implies that, according to the aforesaid coordinate system, the inversion of an image takes place within at least one of x-z and y-z surfaces.

The ray-tracing direction used herein is a forward ray tracing direction from an object toward an image plane.

In general, a spherical lens system composed only of spherical lenses is designed such that spherical aberration produced at spherical surfaces and aberrations such as coma and curvature of field are mutually compensated for at several surfaces to reduce such aberrations throughout the system. To make good correction for aberrations with the use of a reduced number of surfaces, on the other hand, rotationally asymmetric aspheric surfaces or the like are used. This is to reduce various aberrations per se produced at spherical surfaces.

The features, and advantages (action and effect) of the first aspect of the invention are now explained.

When a rotationally symmetric optical system is decentered, rotationally asymmetric aberrations are produced, but they cannot be corrected by the rotationally symmetric optical system alone. The rotationally asymmetric aberrations produced by decentration include distortion and curvature of field as well as astigmatism and coma which may be longitudinally produced as the case may be. According to the first aspect of the invention, a rotationally asymmetric surface is incorporated in an optical system to make correction for the rotationally asymmetric aberrations produced by decentration.

Rotationally asymmetric aberrations produced by a decentered concave mirror include rotationally asymmetric curvature of field. For instance, a light ray emitted from an object point at infinity and incident on the concave mirror forms an image upon reflection at the concave mirror. When the image space is defined by air, however, the back focal distance from the concave mirror to the image plane is a half of the radius of curvature of the portion of the concave mirror on which the light ray is incident. Whereupon an image plane 1 tilts with respect to an axial chief ray, as shown in FIG. 1. Such rotationally asymmetric curvature of field cannot possibly be corrected by a rotationally symmetric optical system. To make correction for this tilting curvature of field, it is required to construct the concave mirror of a rotationally asymmetric surface. In this case, it is further required to make the curvature strong in the positive direction of Y-axis (or make the refracting power strong) and make the curvature weak in the negative direction of Y-axis (or make the refracting power weak). If, besides the concave mirror, a rotationally asymmetric surface having similar effect as in the aforesaid arrangement is incorporated in the optical system, it is then possible to obtain a flat image plane with the use of a more reduced number of elements.

Then, the rotationally asymmetric astigmatism is explained.

As can be seen from FIG. 2, a decentered concave mirror produces astigmatism 2 with respect to an axial ray, too. This astigmatism can be corrected by the proper changing of the curvatures of the rotationally asymmetric surface in the directions of X-axis and Y-axis.

Here the rotationally asymmetric coma is explained.

As mentioned above, a decentered concave mirror produces such coma 3 as shown in FIG. 3 with respect to an axial ray, too. This coma can be corrected by changing the tilt of the rotationally asymmetric surface with respect to the origin of the X-axis and properly changing the tilt of the surface depending on the positive and negative of the Y-axis.

The first aspect of the invention is now described.

In a single image formation type finder optical system, an optical element in an image inversion subsystem generally includes a reflecting surface decentered with respect to the aforesaid axial chief ray (with respect to an optical axis in the case of a rotationally symmetric system). For reducing the size of the finder optical system in particular, it is desired to turn back its optical path at both objective and eyepiece sides. For further size reductions, it is preferable to give power to the surface of the image inversion optical subsystem which is decentered with the respect to the axial chief ray because the power of other rotationally symmetric surface forming the image inversion optical subsystem can be reduced, and the number of rotationally symmetric lenses can be reduced as well. However, this is unfavorable in view of optical performance because the resulting rotationally asymmetric decentration aberrations cannot be corrected at the rotationally symmetric surface. In the finder optical system of the invention, therefore, the image inversion optical subsystem is made up of a plurality of optical elements wherein power is imparted to a surface decentered with respect to the axial chief ray for the purpose of size reductions and, at the same time, a rotationally asymmetric surface is used in the image inversion optical subsystem to make good correction for rotationally asymmetric decentration aberrations produced by imparting power to the decentered surface. It is thus possible to achieve a compact yet high-performance finder optical system.

It is desired that the rotationally asymmetric surface be applied to an optical element having power in the image inversion optical subsystem. This is because it is preferred that rotationally asymmetric decentration aberrations produced in one optical element be well corrected in that optical element. As a result, severe limitations on the position, accuracy, etc. of the optical element relative to other optical elements during the process of assembling them into the image inversion optical subsystem are raised. Particularly severe limitations are imposed on the decentration sensitivity and fabrication accuracy of the optical element to which the rotationally asymmetric surface is to be applied. Therefore, it is preferable to apply the rotationally asymmetric surface to an optical element including a reflecting surface that is incapable image inversion in the image inversion optical subsystem, because cost reductions are achievable in view of fabrication accuracy. For reducing the size of the finder optical system itself, it is preferable to make sure of some length of the optical path in the optical element having a reflecting surface in the image inversion optical subsystem. This is achieved by allowing an axial chief ray to cross over itself in that optical element. By allowing the axial chief ray to cross over itself, it is possible to largely change the angles of light rays striking and leaving the finder optical system. Consequently, it is possible to increase the degree of freedom in laying out the finder optical system in an optical apparatus and so reduce the whole size of the optical apparatus.

The finder optical system according to the first aspect of the invention is characterized in that an optical element having power and incapable of image inversion is made up of at least a common surface having both transmitting action and reflecting action. In this regard, it is noted that severe limitations are imposed on the decentration sensitivity and fabrication accuracy of an optical element which has a surface decentered with respect to an axial chief ray and to which a rotationally asymmetric surface is applied. It is therefore desired that as few rotationally asymmetric surfaces as possible have as many reflecting, and transmitting actions as possible. This also makes a contribution to cost reductions.

In the first aspect of the invention, the rotationally asymmetric surface is decentered with respect to the aforesaid axial chief ray. In the invention, power is imparted to the surface decentered with respect to the axial chief ray. At this surface, however, rotationally asymmetric decentration aberrations are produced. According to the invention, it is found that such rotationally asymmetric decentration aberrations cannot be well corrected with no introduction of the rotationally asymmetric surface decentered with respect to the axial chief ray. The rotationally asymmetric surface introduced to make efficient correction for the rotationally asymmetric decentration aberrations must be decentered with respect to the axial chief ray. Otherwise, the degree of rotational asymmetry of the rotationally asymmetric surface becomes too strong with an increase in the sensitivity to aberrations. As a result, it is difficult to fabricate the finder optical system according to the first aspect of the invention. Alternatively, it is acceptable to construct the surface decentered with respect to the axial chief ray and having power using a rotationally asymmetric surface. It is thus possible to construct a surface less likely to produce rotationally asymmetric decentration aberrations although this surface itself is decentered and has power.

It is desired that the rotationally asymmetric surface to be applied to the finder optical system according to the first aspect of the invention has no axis of rotational symmetry both inside and outside. A surface having axes of rotational symmetry both inside and outside, for instance, a toric or paraboloidal surface with an axis of rotational symmetry removed therefrom, cannot make sufficient correction for rotationally asymmetric decentration aberrations because rotationally symmetric components remain uncorrected even if such decentration aberrations were corrected by use of such a rotationally asymmetric surface as introduced in the invention.

The finder optical system according to the first aspect of the invention is characterized in that an optical element incapable of image inversion and having power provides an even number of reflections. If the optical element provides an odd number of reflections, image inversion will take place as defined herein. For this reason, when power is imparted to the optical element with a rotationally asymmetric surface introduced therein, more severe limitations must be imposed on fabrication accuracy and decentration accuracy, resulting in cost increases.

The finder optical system according to the first aspect of the invention is characterized in that at least one of the optical elements forming a part of the image inversion optical subsystem, not including the optical element incapable of image inversion and having power, provides an even number of reflections and has a roof surface. The optical element in the image inversion optical subsystem must have a roof surface. Otherwise, image inversion itself cannot occur, and its size cannot be reduced either. When the roof surface is decentered with the axial chief ray at least in the Y-axis direction, it is preferable that the ridgeline of the roof surface lies in the y-z surface because satisfactory image inversion takes place at least in the x-y axis direction.

The finder optical system according to the first aspect of the invention is characterized in that at least one of optical elements forming a part of the image inversion optical subsystem, not including the optical element incapable of image inversion and having power, provides an odd number of reflections. When image inversion takes place in at least one plane, for instance, in the y-z surface, it is essentially required that an odd number of reflections take place in the y-z surface. Unless this requirement is satisfied, image inversion itself cannot take place, and the size of the image inversion element cannot be reduced either.

The finder optical system according to the first aspect of the invention is characterized in that at least one of the optical elements forming a part of the image inversion optical subsystem, except the optical element incapable of image inversion and having power, consists of a Porro prism. A Porro prism is capable of image inversion to convert an inverted real image of an object into an erected image by itself. By using one such Porro prism in combination with an optical element in which such a rotationally asymmetric surface as used herein is introduced and which is incapable of image inversion, therefore, it is possible to construct a single image formation type finder optical system.

According to the first aspect of the invention, there is provided a single image formation type finder optical system comprising an image inversion optical subsystem including a plurality of optical elements, each having at least one reflecting surface, wherein at least one of said optical elements is incapable of image inversion and has power, and each surface in said optical elements transmits and reflects light independently, and at least one of surfaces in said optical elements comprises a rotationally asymmetric surface. By the introduction of the rotationally asymmetric surface and the independence of each surface it is possible to increase the degree of freedom in making correction for rotationally asymmetric decentration aberrations and so to make good correction therefor.

The finder optical system according to the first aspect of the invention is characterized in that an axial chief ray crosses over itself in an optical element that is incapable of image inversion and has power. To reduce the size of the finder optical system itself, it is preferable to make sure of some length of an optical path in an optical element having a reflecting surface in an image inversion optical subsystem. This is achieved by allowing the axial chief ray to cross over itself in that optical element. By the crossing of the axial chief ray over itself, it is also possible to provide a large change of the angles of light rays upon incidence on and leaving the finder optical system. It is thus possible to increase the degree of freedom in laying out the finder optical system in an optical apparatus and so make a great contribution to reducing the size of the optical apparatus.

The finder optical system according to the first aspect of the invention is characterized in that an axial chief ray does not cross over itself in an optical element that is incapable of image inversion and has power. This feature means that there is no large difference between the angles of light rays upon incidence on and leaving the optical element that is incapable of image inversion and has power. In other words, it is possible to construct a finder optical system with no large difference between the angles of incident light rays and emerging light rays. This, in turn, enables an optical path to be turned back for reducing the whole size of the optical system. For an observer, on the other hand, it is possible to take images reasonably using a camera or video camera, because there is no distinct difference between the observer's direction of line of sight and the subject direction.

According one embodiment of the first aspect according to the invention, there is provided a single image formation type finder optical system comprising an image inversion optical subsystem including a plurality of optical elements each having at least one reflecting surface, wherein at least one of said optical elements is incapable of image inversion and has power, said one optical element having at least a rotationally asymmetric surface wherein an axial chief ray does not cross over itself, and at least one of said optical elements forming a part of said image inversion optical subsystem, except said one optical element that is incapable of image inversion and has power, has power. By imparting power to at least one of the optical elements forming a part of the image inversion optical subsystem, except the one optical element that is incapable of image inversion and has power, it is possible to reduce the size of the finder optical system, and improve the performance of the finder optical system due to an increase in the degree of freedom in making correction for aberrations.

According another embodiment of the first aspect according to the invention, there is provided a single image formation type finder optical system comprising an image inversion optical subsystem including a plurality of optical elements each having at least one reflecting surface, wherein at least one of said optical elements is incapable of image inversion and has power, said one optical element having at least a rotationally asymmetric surface wherein an axial chief ray does not cross over itself, and at least one of said optical elements forming a part of said image inversion optical subsystem, not including said one optical element that is incapable of image inversion and has power, is a Porro prism having no power. Since the axial chief ray does not cross over itself in the optical element that is incapable of image inversion and has power, there is no large difference between the angles of light rays upon incidence on and leaving that optical element. In other words, it is possible to construct a finder optical system with no large difference between the angles of incident light rays and emerging light rays. This, in turn, enables an optical path to be turned back for reducing the whole size of the optical system. For an observer, on the other hand, it is possible to take images reasonably using a camera or video camera, because there is no distinct difference between the observer's direction of line of sight and the subject direction. At the same time, the Porro prism can be fabricated at low cost yet with an improved accuracy because the Porro prism has no power.

According to yet another embodiment of the first aspect according to the invention, there is provided a single image formation type finder optical system comprising an image inversion optical subsystem including a plurality of optical elements each having at least one reflecting surface, wherein at least one of said optical elements is incapable of image inversion and has power, said one optical element having at least a rotationally asymmetric surface wherein an axial chief ray does not cross over itself, and at least one of said optical elements forming a part of said image inversion optical subsystem, not including said one optical element that is incapable of image inversion and has power, is an optical element with no power, which includes a roof surface and provides an even number of reflections. Since the axial chief ray does not cross over itself in the optical element that is incapable of image inversion and has power, there is no large difference between the angles of light rays upon incidence on and leaving that optical element. In other words, it is possible to construct a finder optical system with no large difference between the angles of incident light rays and emerging light rays. This, in turn, enables an optical path to be turned back for reducing the whole size of the optical system. For an observer, on the other hand, it is possible to take images reasonably using a camera or video camera, because there is no distinct difference between the observer's direction of line of sight and the subject direction. At the same time, the optical element having a roof surface and providing an even number of reflections can be fabricated at low cost yet with an improved accuracy because it has no power.

According to a further embodiment of the first aspect according to the invention, there is provided a single image formation type finder optical system comprising an image inversion optical subsystem including a plurality of optical elements each having at least one reflecting surface, wherein at least one of said optical elements is incapable of image inversion and has power, said one optical element having at least a rotationally asymmetric surface wherein an axial chief ray does not cross over itself, and at least one of said optical elements forming a part of said image inversion optical subsystem, except said one optical element that is incapable of image inversion and has power, is an optical element with no power, which includes a roof surface and provides three reflections, with no axial chief ray crossing over itself in said optical element. Since the optical element including a roof surface and providing three reflections has no power, its cost can be reduced in view of fabrication accuracy, with an improved accuracy performance. Triple reflection ensures an optical path of long length, thereby achieving size reductions.

According to a yet further embodiment of the first aspect according to the invention, there is provided a single image formation type finder optical system comprising an image inversion optical subsystem including a plurality of optical elements each having at least one reflecting surface, wherein at least one of said optical elements is incapable of image inversion and has power, said one optical element having at least a rotationally asymmetric surface wherein an axial chief ray does not cross over itself, and at least one of said optical elements forming a part of said image inversion optical subsystem, except said one optical element that is incapable of image inversion and has power, is a triple reflection type mirror which has no power and includes a roof surface, with an axial chief ray crossing over itself therein. Since the optical element including a roof surface and providing three reflections has no power, its cost can be reduced in view of fabrication accuracy, with an improved accuracy performance. Triple reflection ensures an optical path of long length, thereby achieving size reductions. In addition, weight reductions are achievable by use of the mirror.

According to a still yet further embodiment of the first aspect according to the invention, there is provided a single image formation type finder optical system comprising an image inversion optical subsystem including a plurality of optical elements each having at least one reflecting surface, wherein at least one of said optical elements is incapable of image inversion and has power, said one optical element having at least a rotationally asymmetric surface wherein an axial chief ray does not cross over itself, and at least one of said optical elements forming a part of said image inversion optical subsystem, except said one optical element that is incapable of image inversion and has power, is an optical element with no power, which includes a roof surface and provides three reflections, with an axial chief ray crossing over itself in said optical element. At least one of optical elements except the optical element incapable of image inversion and having power is a triple reflection type optical element having neither power and nor a roof surface; that is, its cost can be reduced in view of fabrication accuracy. By the crossing of the axial chief ray over itself, it is possible to reduce the size of the optical element itself and, hence, the size of the finder optical system.

According to a still yet further embodiment of the first aspect according to the invention, there is provided a single image formation type finder optical system comprising an image inversion optical subsystem including a plurality of optical elements each having at least one reflecting surface, wherein at least one of said optical elements is incapable of image inversion and has power, said one optical element having at least a rotationally asymmetric surface wherein an axial chief ray does not cross over itself, and at least one of said optical elements forming a part of said image inversion optical subsystem, except said one optical element that is incapable of image inversion and has power, is a triple reflection type optical element which has neither power nor a roof surface, with no axial chief ray crossing over itself therein. At least one of optical elements except the optical element incapable of image inversion and having power is a triple reflection type optical element having neither power and nor a roof surface; that is, its cost can be reduced in view of fabrication accuracy.

According to a still yet further embodiment of the first aspect according to the invention, there is provided a single image formation type finder optical system comprising an image inversion optical subsystem including a plurality of optical elements each having at least one reflecting surface, wherein at least one of said optical elements is incapable of image inversion and has power, said one optical element having at least a rotationally asymmetric surface wherein an axial chief ray does not cross over itself, and at least one of said optical elements forming a part of said image inversion optical subsystem, except said one optical element that is incapable of image inversion and has power, is an optical element having no power and providing a single reflection.

Referring here to an optical element providing a single reflection, no care need be taken of the decentration of the reflecting surface thereof relative to other reflecting surface therein. In addition, further cost reductions are achievable because it is unnecessary to take into account the decentration accuracy of the reflecting surface having sensitivity twice as high as a refractive surface. Moreover, light loss can be avoided because the number of reflecting surfaces is reduced.

In the first aspect of the invention, it is preferable that the Porro prism used comprises one or more blocks. When the Porro prism is made up of one block, considerable fabrication cost reductions are achievable because the decentration accuracy and figure tolerance of each surface can be obtained at the time of part molding, and so it is not necessary to control them. In the practice of the invention, it is also preferable to construct the Porro prism of two, three or four blocks. This is because an inverted image of an object is located in the Porro prism so that the degree of freedom regarding the magnification of the finder can be increased concurrently with an increase in the degree of freedom in locating an information-displaying field frame, etc. in the finder.

The finder optical system of the invention is characterized in that an axial chief ray crosses over itself in an optical element forming an image inversion optical subsystem. The so-called finder magnification of a finder optical system, i.e., the size with which an object is to be viewed, is determined by the focal length ratio between an objective and an eyepiece. To increase the finder magnification while the finder optical system itself is kept compact, it is preferable to make the focal length of the objective long. If the axial chief ray are designed to cross over itself in the aforesaid optical element, it is possible to make sure of some length of an optical path therein and so reduce the size of the finder optical system with an increase in the finder magnification. By designing the axial chief ray to cross over itself in the aforesaid optical element, at the same time, it is possible to provide a large change of the angles of light rays upon incidence on and leaving the finder optical system. This, in turn, makes it possible to increase the degree of freedom in laying out the finder optical system in an optical apparatus, and so makes a great contribution to a reduction in the whole size of the optical apparatus.

The finder optical system according to the first aspect of the invention is characterized in that an axial chief ray does not cross over itself in an optical element forming an image inversion optical subsystem. This feature means that there is no large difference between the angles of light rays upon incidence on and leaving the optical element. In other words, it is possible to construct a finder optical system with no large difference between the angles of incident light rays and emerging light rays. This, in turn, enables an optical path to be turned back for reducing the whole size of the optical system. For an observer, on the other hand, it is possible to take images reasonably using a camera or video camera, because there is no distinct difference between the observer's direction of line of sight and the subject direction.

The finder optical system according to the first aspect of the invention is characterized in that an optical element forming an image inversion optical subsystem is made up of a mirror, thereby reducing the size and weight of the finder optical system.

The finder optical system according to the first aspect of the invention is characterized in that an optical element forming an image inversion optical subsystem is made up of a prism. The prism used as the optical element forming an image inversion optical subsystem is constructed in the form of an integral member, and the decentration of a rotationally asymmetric surface with other surface is determined at the stage of part assembly so that assembly accuracy can be reduced with further size and cost reductions. Back surface reflection by the prism enables the curvature of the reflecting surface of the prism to be weakened to obtain the same power as in the case of surface reflection. For this reason, the Petzval sum having an influence on curvature of field in particular is so reduced that a flat image plane can be obtained.

It is understood that the objective system for forming an inverted real image of an object according to the first aspect of the invention, whether it is a zoom system or a single-focus lens system, may be applied to such arrangements as explained above.

It is also understood that an eyepiece for erecting the inverted real image of an object formed by the objective and viewing the thus erected image may be applied to such arrangements as explained above.

If the role of an objective or eyepiece is allocated to the image inversion optical subsystem having power, it is then possible to dispense with the objective and/or the eyepiece. This, in turn, enables the number of parts to be reduced with some considerable cost and size reductions.

The optical element forming the image inversion optical subsystem in the finder optical system according to the first aspect of the invention is here assumed to have a reflecting surface represented by a prism. Then, this optical element may be constructed of, in addition to the aforesaid Porro prism, a deflecting prism, a rectangular prism, a penta prism, a wedge prism, and a Pechan prism. Prisms having a roof surface, and mirrors having similar reflecting surface actions may also be used.

The so-called finder magnification of the finder optical system according to the first aspect of the invention, i.e., the size with which an image is to be viewed, is determined by the focal length ratio between an objective and an eyepiece. To increase the finder magnification while the finder optical system itself is kept compact, it is preferable to make the focal length of the objective long or make the focal length of the eyepiece short. However, if the finder magnification is increased by making the focal length of the eyepiece short, the amount of aberrations produced at the eyepiece then becomes too large. To make correction for these aberrations, the eyepiece must be composed of an increased number of lenses, thus eventually failing to reduce the size of the finder optical system. Single reflection or triple reflection is preferable for the odd number of reflections. Five or more reflections make it impossible to reduce the size of a finder optical system. Triple reflection is particularly preferred because it is possible to make sure of some length of an optical path in the optical element so that the optical path for the objective can be turned back to achieve compactness and increase the finder magnification. For the optical element providing one single reflection, no care need be taken of the decentration of the reflecting surface relative to other reflecting surface in the optical element. In addition, further cost reductions are achievable because it is unnecessary to take into account the decentration accuracy of the reflecting surface having sensitivity twice as high as a refractive surface. Moreover, light loss can be avoided because the number of reflecting surfaces is reduced.

By using a roof surface for the optical element, it is possible to achieve image inversion in both vertical and horizontal directions; that is, it is possible to reduce the size of the optical element.

That the optical element is free of a roof surface is advantageous for the production of that element. A roof surface is usually difficult to mass produce because extremely severe limitations are placed on its fabrication accuracy. A reduced number of reelections imply that light losses are reduced.

If power is imparted to at least one of optical elements in the image inversion optical subsystem, except the optical element that is incapable of image inversion and has power, it is then possible to achieve further size reductions.

If no power is imparted to at least one of optical elements in the image inversion optical subsystem, except the optical element that is incapable of image inversion and has power, it is then possible to cut down the cost of that optical element in view of its production accuracy.

If the rotationally asymmetric surface is designed such that a symmetric surface is defined by a surface substantially identical with each decentered surface, it is then possible to make both its right and left sides symmetric with the symmetric surface located between them. This, in turn, enables aberrations to be well corrected with a considerable improved productivity.

If the rotationally asymmetric surface is constructed in the form of a reflecting surface, it is then possible to obtain preferable results in view of correction of aberrations. This is because chromatic aberration is not produced at all as compared with the case where the rotationally asymmetric surface is used for a transmitting surface, and because light rays can be bent even when its tilt angle is small so that other aberrations are less likely to occur. When the same refracting power is obtained, the amount of aberrations produced is smaller at the reflecting surface than at the refracting surface. If the aforesaid reflecting surface is defined by a total reflection surface inclined with respect to light rays so that light rays are incident thereon at greater than the critical angle, it is then possible to achieve high reflectivity.

In the practice of the invention, it is preferable to form a metal thin film of aluminum, silver or the like, or a multilayer dielectric film on a reflecting surface-forming surface. If a metal thin film having reflecting action is used, high reflectivity can then be easily achieved. The dielectric reflecting film is favorable for the formation of a reflecting film having wavelength selectivity and less likely to absorb light.

If the reflecting surface is defined by a back-surface mirror, the occurrence of curvature of field can then be reduced. This is because, assuming the focal length is the same, a back-surface mirror is larger and smaller by the index of refraction than a concave mirror in terms of the radius of curvature and the amount of curvature of field produced, respectively.

Condition (1), given below, is concerned with a bow form of rotationally asymmetric distortion of a horizontal line image, for instance.

$$0<|DY|<0.1 \tag{1-1}$$

This is explained with reference to FIGS. 4 and 5. Now assume that a chief ray 4 having a maximum field angle in the X-direction intersects with a rotationally asymmetric surface 5 (a section 5a of FIG. 5) in the Y-Z surface, and an axial chief ray 7 intersects with the aforesaid rotationally asymmetric surface 5 (a section 5b of FIG. 5). DY in condition (1) represents a difference between the value of tan. of a normal 6 of the rotationally asymmetric surface at a point of intersection of ray 4 with surface 5 and the value of tan. of a normal 8 of the rotationally asymmetric surface at a point of intersection of ray 7 with surface 5. In the practice of the invention, it is of importance to satisfy condition (1). When |DY|<0, the bow form of image distortion cannot be corrected, and when |DY|>0.1, the bow form of image distortion is overcorrected. In either case, the image is distorted in a bow form. In the practice of the invention, it is preferable to satisfy the following condition (1-2):

$$0<|DY|<0.05 \tag{1-2}$$

Condition (2-1) or (2-2), given below, is concerned with a trapezoidal form of image distortion.

$$0<|Cxn|<1 \tag{2-1}$$

$$1<|Cxn|<10 \tag{2-2}$$

In the practice of the invention, it is essentially important to satisfy either one of conditions (2-1) and (2-2) where, assuming that the direction of decentration of the rotationally asymmetric surface lies within the Y-Z surface, Cxn represents the X-direction curvature ratio between portions of the rotationally asymmetric surface which a chief ray having a maximum field angle in the Y-positive direction and a chief ray having a maximum field angle in the Y-negative direction strike. When |Cxn|<0, trapezoidal distortion with an upper side becoming short in the Y-negative direction becomes too large upon the reflection of rays in the Y-positive direction, and so it cannot be corrected at the other surface. When |Cxn|>10, on the other hand, trapezoidal distortion with an upper side becoming short in the Y-positive direction becomes too large for correction at the other surface.

When |cxn|=1, trapezoidal distortion continues to be produced at the rotationally asymmetric surface because it cannot be corrected at that surface. In summary, it is essentially important that |Cxn| be within the above-defined range so that the trapezoidal distortion can be corrected while the rotationally asymmetric surface and the other surface are in a well-balanced state.

In the practice of the invention, it is more preferable to satisfy the following condition (2-3) or (2-4).

$$0.8<|cxn|<1 \tag{2-3}$$

$$1<|cxn|<3 \tag{2-4}$$

In what follows, the second aspect of the invention is explained.

According to the second aspect of the invention, there is provided a single image formation type finder optical system comprising an image inversion optical subsystem, wherein said image inversion optical subsystem comprises an image direction-converting element having at least one rotationally asymmetric surface, said image direction-converting element having power.

First, the terms used in the second aspect of the invention are defined along with an explanation of the coordinate system used.

By the term "image inversion optical subsystem" used in the second aspect of the invention are intended all optical elements having action to erect an inverted image of an object. Conversely speaking, all optical elements having such action are herein represented by the single term "image inversion optical subsystem". By the term "image direction-converting element" used herein is intended an optical element which, by itself, provides a vertical or horizontal image inversion. It is understood that an optical element which, by itself, provides a vertical or horizontal image inversion to erect an inverted image of an object is also encompassed in this term. However, an optical element which provides a mere conversion of the angles of incident rays or emerging rays but does not provide a vertical or horizontal image inversion is excluded from the term "image direction-converting element" used herein.

Then, the coordinate system used in the second aspect of the invention is explained.

Here assume that an axial chief ray is defined by a light ray passing through the center of an object point to the center of an image plane via the center of a stop or aperture, a Z-axis is defined by an optical axis represented by a segment of a straight line intersecting with and terminating at a first surface in an optical system, a Y-axis is defined by an axis perpendicular to the Z-axis and lying in a decentered surface of each of surfaces forming the finder optical system, and an X-axis is defined by an axis perpendicular to the Y-axis.

The image inversion referred to in the second aspect of the invention implies that, according to the aforesaid coordinate system, the inversion of an image takes place within at least one of x-z and y-z surfaces. Thus, even the same mirror or prism may or may not act as the image direction-converting element depending on whether or not it has an image inversion action. For instance, an optical element such as a mirror or prism that has a mere action on turning back an optical path without having any image inversion action is herein not referred to as the image direction-converting element.

The ray-tracing direction used herein is a forward ray tracing direction from an object toward an image plane.

In general, a spherical lens system composed only of spherical lenses is designed such that spherical aberration produced at spherical surfaces and aberrations such as coma and curvature of field are mutually compensated for at several surfaces to reduce such aberrations throughout the system.

To make good correction for aberrations with the use of a reduced number of surfaces, on the other hand, rotationally asymmetric surfaces or the like are used. This is to reduce various aberrations per se produced at spherical surfaces.

The features, and advantages (action and effect) of the second aspect of the invention are explained.

When a rotationally symmetric optical system is decentered, rotationally asymmetric aberrations are produced, but they cannot be corrected by the rotationally symmetric optical system alone. The rotationally asymmetric aberrations produced by decentration include distortion and curvature of field as well as astigmatism and coma which may be longitudinally produced as the case may be. According to the first aspect of the invention, a rotationally asymmetric surface is incorporated in an optical system to make correction for the rotationally asymmetric aberrations.

Rotationally asymmetric aberrations produced by the decentered concave mirror include rotationally asymmetric curvature of field. For instance, light rays emitted from an object point at infinity and incident on the concave mirror forms an image upon reflection at the concave mirror. When the image space is defined by air, however, the back focal distance from the concave mirror to the image plane is a half of the radius of curvature of the portion of the concave mirror on which the light rays are incident. Whereupon an image plane 1 tilts with respect to axial chief ray, as shown in FIG. 1. Such rotationally asymmetric curvature of field cannot possibly be corrected in a rotationally symmetric optical system. To make correction for this tilting curvature of field, it is required to construct the concave mirror of a rotationally asymmetric surface. In this case, the correction may be achieved by making the curvature strong in the positive direction of the Y-axis (or making the refracting power strong) and making the curvature weak in the negative direction of the Y-axis (or making the refracting power weak). If, apart from the concave mirror, a rotationally asymmetric surface having similar effect as in the aforesaid arrangement is incorporated in the optical system, it is then possible to obtain a flat image plane with the use of a more reduced number of surfaces.

Then, the rotationally asymmetric astigmatism is explained.

As can be seen from FIG. 2, the decentered concave mirror also produces astigmatism 2 with respect to axial rays. This astigmatism can be corrected by the proper changing of the curvatures of the rotationally asymmetric surface in the X- and Y-axis directions.

Here the rotationally asymmetric coma is explained.

As mentioned above, the decentered concave mirror further produces such coma 3 as shown in FIG. 3 with respect to axial rays. This coma can be corrected by changing the tilt of the rotationally asymmetric surface gradually with respect to the origin of the X-axis and properly changing the tilt of the surface depending on the positive and negative of the Y-axis.

The second aspect of the invention is now described.

In a finder optical system, the image direction-converting element generally includes a surface decentered with respect to the aforesaid axial chief ray (with respect to an optical axis in the case of a rotationally symmetric optical system). For reducing the size of the finder optical system, it is preferable to give power to this surface because the power of other rotationally symmetric surface forming the finder optical system can be reduced, and the number of rotationally symmetric lenses can be reduced as well. However, this is unfavorable in view of optical performance because the resulting rotationally asymmetric decentration aberrations cannot be corrected at the rotationally symmetric surface. In the finder optical system of the invention, therefore, power is imparted to a surface of the image direction-converting element decentered with respect to the axial chief ray for the purpose of size reductions and, at the same time, a rotationally asymmetric surface is used in the finder optical system to make good correction for rotationally asymmetric decentration aberrations produced by imparting power to the decentered surface. It is thus possible to achieve a compact yet high-performance finder optical system.

The rotationally asymmetric surface applied to the finder optical system according to the second aspect of the invention is characterized in that it is decentered with respect to the aforesaid axial chief ray.

In the second aspect of the invention, power is imparted to the surface decentered with respect to the axial chief ray. At this surface, however, rotationally asymmetric decentration aberrations are produced. According to the invention, it is found that such rotationally asymmetric decentration aberrations cannot be well corrected with no introduction of the rotationally asymmetric surface decentered with respect to the axial chief ray. In the second aspect of the invention, the rotationally asymmetric surface introduced to make correction for the rotationally asymmetric decentration aberrations must be decentered with respect to the axial chief ray. Otherwise, the degree of rotational asymmetry of the rotationally asymmetric surface becomes too strong with an increase in the sensitivity to aberrations. As a result, it is difficult to fabricate the finder optical system according to the second aspect of the invention.

Alternatively, it is acceptable to construct the surface decentered with respect to the axial chief ray and having power using a rotationally asymmetric surface. It is thus possible to construct a surface less likely to produce rotationally asymmetric decentration aberrations although this surface itself is decentered and has power.

The rotationally asymmetric surface to be applied to the finder optical system according to the second aspect of the invention is characterized by having no axis of rotational symmetry both inside and outside. A surface having axes of rotational symmetry both inside and outside, for instance, a toric or paraboloidal surface with an axis of rotational symmetry removed therefrom, cannot make sufficient correction for rotationally asymmetric decentration aberrations because rotationally symmetric components remain uncorrected even if such decentration aberrations were corrected by use of such a rotationally asymmetric surface as introduced in the invention.

The finder optical system according to the second aspect of the invention is characterized in that the image direction-converting element provides an even number of reflections and has a roof surface. In the second aspect of the invention, the image direction-converting element must have a roof surface. Otherwise, image inversion itself cannot occur, and the size of the image direction-converting element itself cannot be reduced as well. When the surface of the image direction-converting element having power is decentered with the axial chief ray at least in the Y-axis direction, it is preferable that the ridgeline of the roof surface lies in the y-z surface because satisfactory image inversion takes place at least in the x-y axis direction.

The finder optical system according to the second aspect of the invention is characterized in that the image direction-converting element provides an odd number of reflections. When image inversion takes place in at least one plane, for instance, in the y-z surface, it is essentially required that an odd number of reflections take place in the y-z surface. Unless this requirement is satisfied, image inversion itself cannot take place, and the size of the image direction-converting element itself cannot be reduced as well.

A preferable odd number of reflections are single reflection, and triple reflection. When five or more reflections take place, it is difficult to obtain a finder optical system of good performance because severe limitations are imposed on the fabrication, and assembly accuracy of image direction-converting elements. The so-called finder magnification of a finder optical system, i.e., the size with which an image is to be viewed, is determined by the focal length ratio between an objective and an eyepiece. To increase the finder magnification while the finder optical system itself is kept compact, it is preferable to make the focal length of the objective long or make the focal length of the eyepiece short. However, if the finder magnification is increased by making the focal length of the eyepiece short, the amount of aberrations produced at the eyepiece then becomes too large. To make correction for these aberrations, the eyepiece must be composed of an increased number of lenses, thus eventually failing to reduce the size of the finder optical system. Three reflections are particularly preferred because it is possible to make sure of some length of an optical path in the image direction-converting element so that the optical path for the objective can be turned back to achieve compactness and increase the finder magnification. For the optical element providing one single reflection, no care need be taken of the decentration of the reflecting surface thereof relative to other reflecting surface in the image direction-converting element. In addition, further cost reductions are achievable because it is unnecessary to take into account the decentration accuracy of the reflecting surface having sensitivity twice as high as a refractive surface. Moreover, light loss can be avoided because the number of reflecting surfaces is reduced.

By using a roof surface for the image direction-converting element providing an odd number of reflections, it is possible to achieve image inversion in both vertical and horizontal directions; that is, it is possible to erect the inverted real image of an object at least by sole use of that element. Hence, it is possible to achieve cost reductions by a decrease in the number of parts. Since, at the same time, the optical path of considerable length can be obtained, it is possible to increase the finder magnification.

That the image direction-converting element providing an odd number of reflections has no roof surface is advantageous for the production of that element. A roof surface is usually difficult to mass produce because extremely severe limitations are placed on its fabrication accuracy. Thus, the optical element having no roof surface is advantageous for mass production. It is also preferable to reduce the number of reflection because light losses can be reduced.

The finder optical system according to the second aspect of the invention is characterized in that an image direction-converting element is made up of a Porro prism. A Porro prism, when used in a rotationally symmetric system, is capable of inverting an image with respect to both the x-y axis and the y-z axis. For achieving size reductions, it is preferable to give power to the Porro prism itself and apply a TFC surface to at least one of refracting, and reflecting surfaces of the Porro prism thereby decentering the Porro prism with respect to an axis chief ray. This, for the first time, makes good correction of rotationally asymmetric decentration aberrations possible.

In the second aspect of the invention, it is preferable that the Porro prism used comprises one or more blocks. When the Porro prism is made up of one block, considerable fabrication cost reductions are achievable because the decentration accuracy and figure tolerance of each surface can be obtained at the time of part molding, and so it is not necessary to control them. In the practice of the invention, it is also preferable to construct the Porro prism of two, three or four blocks. This is because an inverted image of an object is located in the Porro prism so that the degree of freedom regarding the finder magnification can be increased concurrently with an increase in the degree of freedom in locating an information-displaying field frame, etc. in the finder.

The finder optical system according to the second aspect of the invention is characterized in that an axial chief ray crosses over itself in an image direction-converting element. The so-called finder magnification of a finder optical system, i.e., the size with which an object is to be viewed, is determined by the focal length ratio between an objective and an eyepiece. To increase the finder magnification while the finder optical system itself is kept compact, it is preferable to make the focal length of the objective long. If the axial chief ray is designed to cross over itself in the image-direction converting element, it is possible to make sure of some length of an optical path therein and so reduce the size of the finder optical system with an increase in the finder magnification. By designing the axial chief ray to cross over itself in the image direction-converting element, at the same time, it is possible to provide a large change of the angles of light rays upon incidence on and leaving the finder optical system. This, in turn, makes it possible to increase the degree of freedom in laying out the finder optical system in an optical apparatus, and so makes a great contribution to a reduction in the whole size of the optical apparatus.

The finder optical system according to the second aspect of the invention is characterized in that an axial chief ray does not cross over itself in an image direction-converting element. This feature means that there is no large difference between the angles of light rays upon incidence on and leaving the image direction-converting element. In other words, it is possible to construct a finder optical system with no large difference between the angles of incident light rays and emerging light rays. This, in turn, enables an optical path to be turned back for reducing the whole size of the optical system. For an observer, on the other hand, it is possible to take images reasonably using a camera or video camera, because there is no distinct difference between the observer's direction of line of sight and the subject direction.

The finder optical system according to the second aspect of the invention is characterized in that an image direction-converting element is made up of a mirror, thereby reducing the size and weight of the finder optical system.

The finder optical system according to the second aspect of the invention is characterized in that an image direction-converting element is made up of a prism. The prism used as the image direction-converting element is constructed in the form of an integral member, and the decentration of a rotationally asymmetric surface with other surface is determined at the stage of part assembly so that assembly accuracy can be reduced with further size and cost reductions. Back surface reflection by the prism enables the curvature of the reflecting surface of the prism to be weakened to obtain the same power as in the case of surface reflection. For this reason, the Petzval sum having an influence on curvature of field in particular is so reduced that a flat image plane can be obtained.

It is understood that the objective system for forming an inverted real image of an object according to the second aspect of the invention, whether it is a zoom system or a single-focus lens system, may be applied to such arrangements as explained above.

It is also understood that an eyepiece for erecting the inverted real image of an object formed by the objective and viewing the thus erected image may be applied to such arrangements as explained above.

If the role of an objective or eyepiece is allocated to the image inversion optical subsystem having power, it is then possible to dispense with the objective and/or the eyepiece. This, in turn, enables the number of parts to be reduced with some considerable cost and size reductions.

The image direction-converting element used is here assumed to have a reflecting surface represented by a prism. Then, this optical element may be constructed of, nothing to say of the aforesaid Porro prism, a rectangular prism, a penta prism, a wedge prism, and a Pechan prism. Prisms having a roof surface may also be used. A deflecting prism, if it includes a roof surface, may be used as well.

In addition, mirrors having such reflecting surfaces may be used in the practice of the invention.

If the rotationally asymmetric surface is designed such that a symmetric surface is defined by a surface substantially identical with each decentered surface, it is then possible to make both its right and left sides symmetric with the symmetric surface located between them. This, in turn, enables aberrations to be well corrected with a considerable improved productivity.

If the rotationally asymmetric surface is constructed in the form of a reflecting surface, it is then possible to obtain preferable results in view of correction of aberrations. This is because chromatic aberration is not produced at all as compared with the case where the rotationally asymmetric surface is used for a transmitting surface, and because light rays can be bent even when its tilt angle is small so that other aberrations are less likely to occur. When the same refracting power is obtained, the amount of aberrations produced is smaller at the reflecting surface than at the refracting surface.

If the aforesaid reflecting surface is defined by a total reflection surface inclined with respect to light rays so that the light rays can be incident thereon at an angle greater than the critical angle, it is then possible to achieve high reflectivity. In the practice of the invention, it is preferable to form a metal thin film of aluminum, silver or the like, or a multilayer dielectric film on a reflecting surface-forming surface. If a metal thin film having reflecting action is used, high reflectivity can then be easily achieved. The dielectric reflecting film is favorable for the formation of a reflecting film having wavelength selectivity and less likely to absorb light.

If the reflecting surface is defined by a back-surface mirror, the occurrence of curvature of field can then be reduced. This is because, assuming the focal length is the same, a back-surface mirror is larger and smaller by the index of refraction than a concave mirror in terms of the radius of curvature and the amount of curvature of field produced, respectively.

Condition (1), given below, is concerned with a bow form of rotationally asymmetric distortion of a horizontal line image, for instance.

$$0 < |DY| < 0.1 \tag{1-1}$$

This is explained with reference to FIGS. 4 and 5. Now assume that a chief ray 4 having a maximum field angle in the X-direction intersects with a rotationally asymmetric surface 5 (a section 5a of FIG. 5) in the Y-Z surface, and an axial chief ray 7 intersects with the aforesaid rotationally asymmetric surface 5 (a section 5b of FIG. 5). DY in condition (1) represents a difference between the value of tan. of a normal 6 of the rotationally asymmetric surface at a point of intersection of ray 4 with surface 5 and the value of tan. of a normal 8 of the rotationally asymmetric surface at a point of intersection of ray 7 with surface 5. In the practice of the invention, it is of importance to satisfy condition (1). When |DY|<0, the bow form of image distortion cannot be corrected, and when |DY|>0.1, the bow form of image distortion is overcorrected. In either case, the image is distorted in a bow form. In the practice of the invention, it is preferable to satisfy the following condition (1-2):

$$0 < |DY| < 0.05 \quad (1\text{-}2)$$

Condition (2-1) or (2-2), given below, is concerned with a trapezoidal form of image distortion.

$$0 < |Cxn| < 1 \quad (2\text{-}1)$$

$$1 < |Cxn| < 10 \quad (2\text{-}2)$$

In the practice of the invention, it is essentially important to satisfy either one of conditions (2-1) and (2-2) where, assuming that the direction of decentration of the rotationally asymmetric surface lies within the Y-Z surface, Cxn represents the X-direction curvature ratio between portions of the rotationally asymmetric surface which a chief ray having a maximum field angle in the Y-positive direction and a chief ray having a maximum field angle in the Y-negative direction strike. When $|Cxn| < 0$, trapezoidal distortion with an upper side becoming short in the Y-negative direction becomes too large upon the reflection of rays in the Y-positive direction, and so it cannot be corrected at the other surface. When $|Cxn| > 10$, on the other hand, trapezoidal distortion with an upper side becoming short in the Y-positive direction becomes too large for correction at the other surface.

When $|Cxn| = 1$, trapezoidal distortion continues to be produced at the rotationally asymmetric surface because it cannot be corrected at that surface. In summary, it is essentially important that $|Cxn|$ be within the above-defined range so that the trapezoidal distortion can be corrected while the rotationally asymmetric surface and the other surface are in a well-balanced state.

In the practice of the invention, it is more preferable to satisfy the following condition (2-3) or (2-4).

$$0.8 < |cxn| < 1 \quad (2\text{-}3)$$

$$1 < |cxn| < 3 \quad (2\text{-}4)$$

Still other objects and advantages of the invention will in part be obvious and will in part be apparent from the specification.

The invention accordingly comprises the features of construction, combinations of elements, and arrangement of parts which will be exemplified in the construction hereinafter set forth, and the scope of the invention will be indicated in the claims.

DESCRIPTION OF THE PREFERRED EMBODIMENTS

Set below are examples of the finder optical systems according to the first and second aspects of the invention.

Each example according to the first aspect of the invention is first explained.

Figure 1:
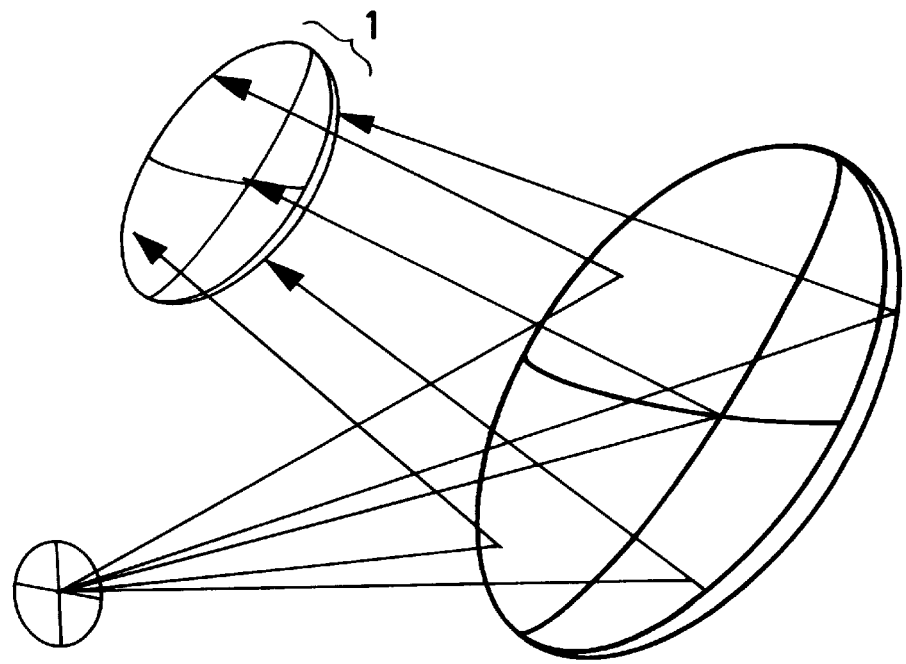
FIG. 1 is a diagram for illustrating the principles of the invention.
Figure 2:
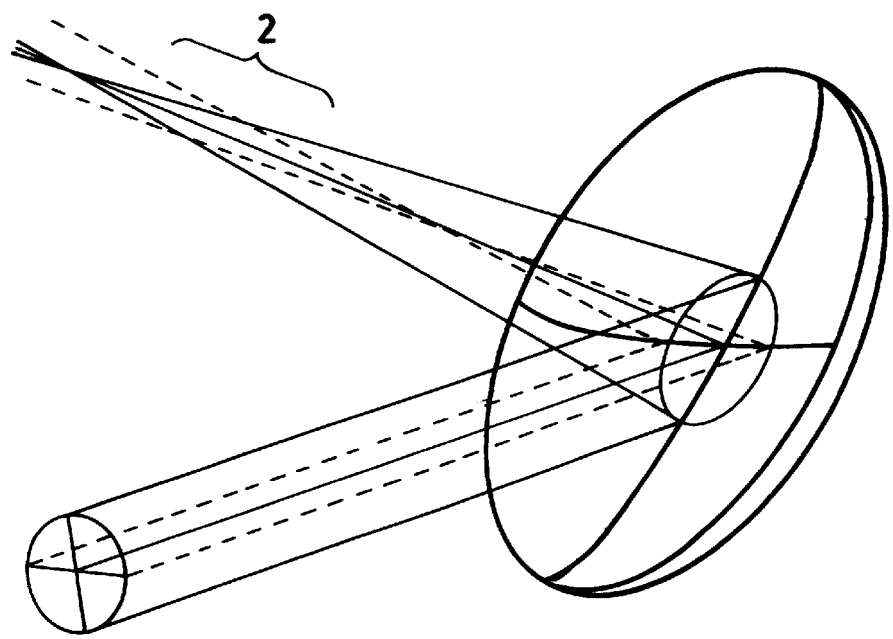
FIG. 2 is a diagram for illustrating the principles of the invention.
Figure 3:
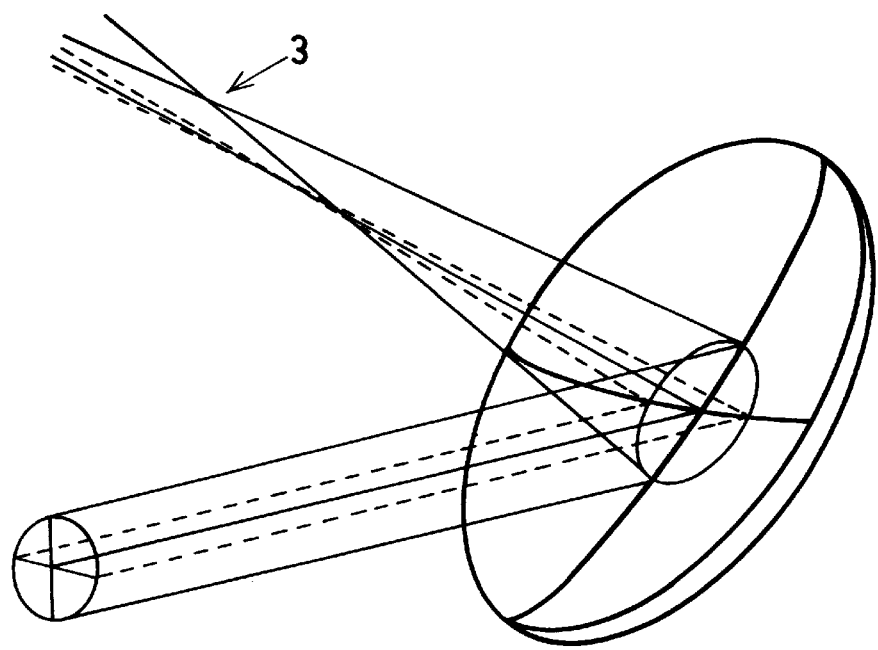
FIG. 3 is a diagram for illustrating the principles of the invention.
Figure 4:
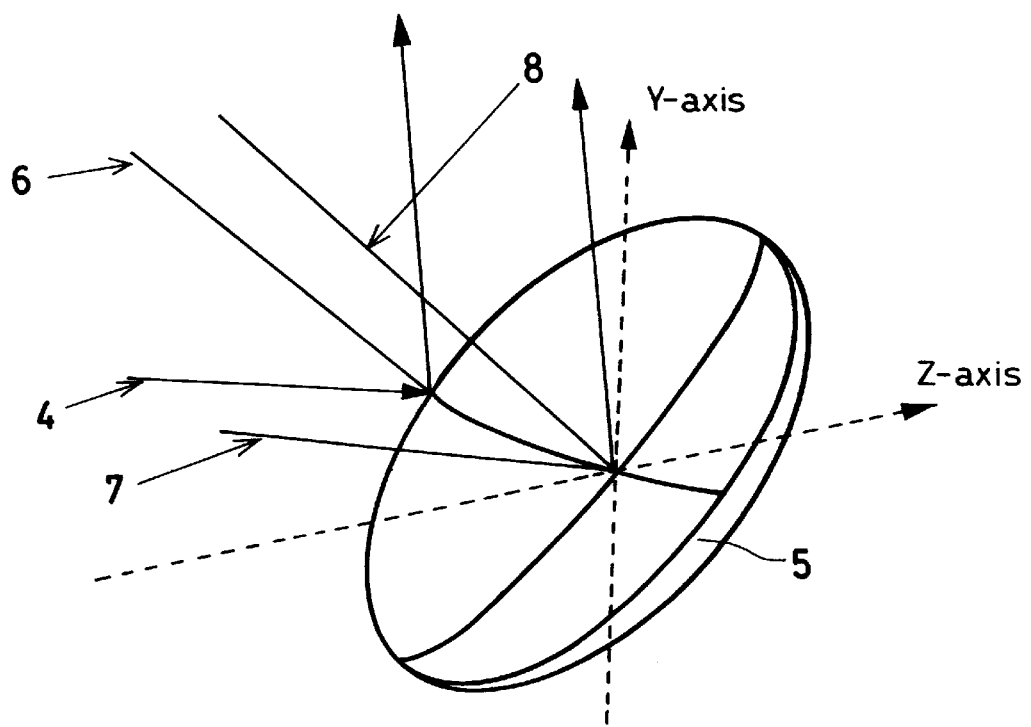
FIG. 4 is a diagram for illustrating the principles of the invention.
Figure 5:
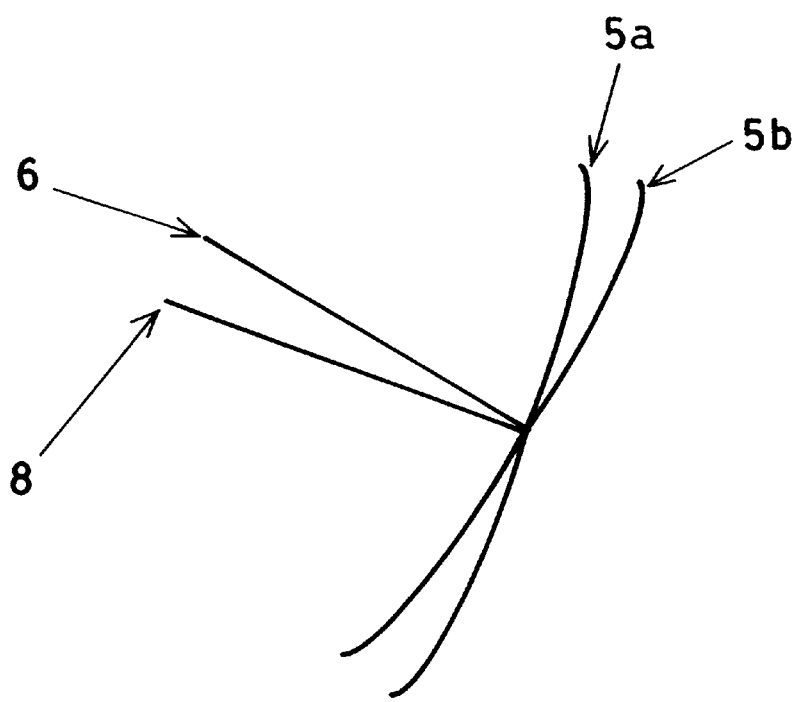
FIG. 5 is a diagram for illustrating the principles of the invention.
Figure 6:
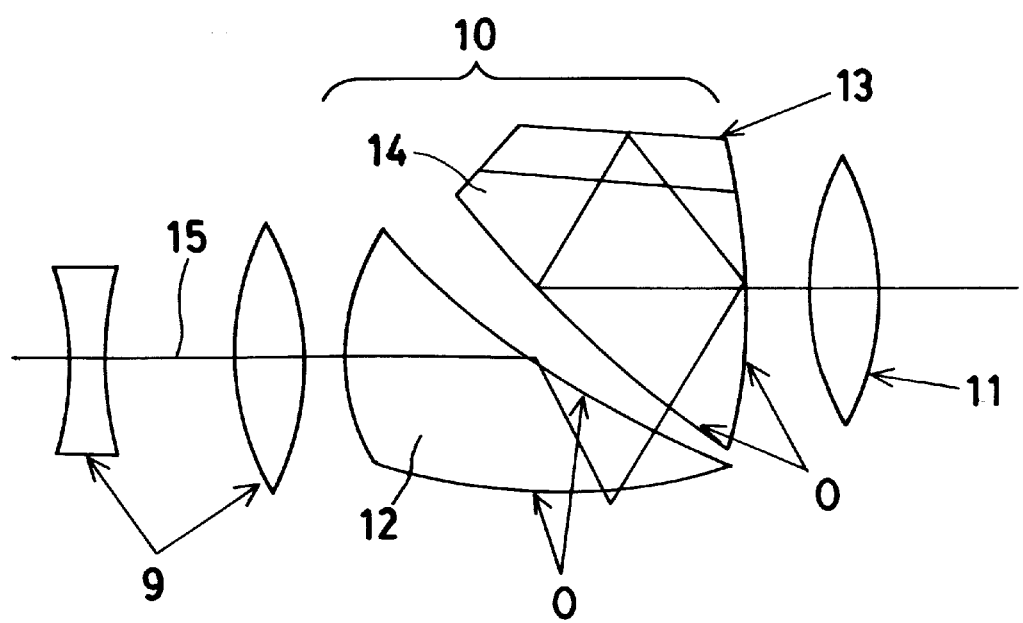
FIG. 6 is sectional schematics of Example 1 according to the first aspect of the invention and Example 44 according to the second aspect of the invention.
Figure 7:
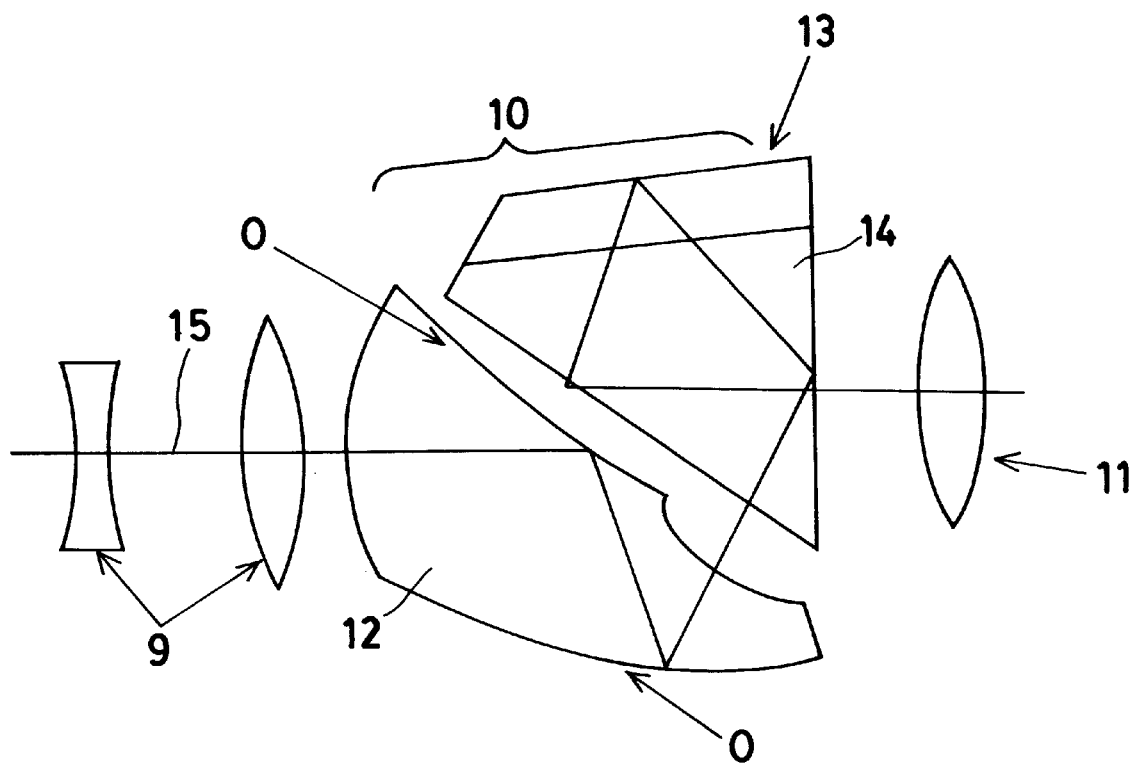
FIG. 7 is a sectional schematic of Example 2 according to the first aspect of the invention.

First (FIG. 6), and second (FIG. 7) example of the invention is directed to a single image formation type finder optical system for use on a lens shutter camera, comprising an objective 9, an image inversion optical subsystem 10 and an eyepiece 11.

It is noted that the objective 9 may be of either a single-focus or zoom type.

In the first example, the image inversion optical subsystem 10 comprises optical elements, a deflecting prism 12 located on an object side of the finder optical system, said prism having no image inversion action and having power, and a Pechan prism 14 having image erection action and having a roof surface 13. A primary image plane is positioned between and in the vicinity of the two prisms (12 and 14).

In the first example, the deflecting prism 12 consists of a first transmitting surface, a first reflecting surface, a second reflecting surface and a second transmitting surface in order from the propagation of axial chief ray 15 incident on the objective 9, with the first reflecting surface and second transmitting surface defined by a common surface. The Pechan prism 14 having roof surface 13 consists of a first transmitting surface, a first reflecting surface, a second reflecting surface, a third reflecting surface and a second transmitting surface, with the first transmitting surface and third reflecting surface defined by a common surface, and the first reflecting surface and second transmitting surface defined by a common surface. The roof surface 13 is defined by the second reflecting surface. The first reflecting surface, second reflecting surface and second transmitting surface of the deflecting prism 12, and the surfaces of the Pechan prism 14 other than the roof surface are defined by rotationally asymmetric surfaces 0. For this reason, the first reflecting surface (the second transmitting surface) and third reflecting surface (the first transmitting surface) are surfaces having power, so that the Pechan prism 14 can have power.

According to this arrangement, rotationally asymmetric decentration aberrations can be well corrected by the rotationally asymmetric surfaces 0. In addition, a subject can be reasonably observed because it is in alignment with the direction of line of sight.

As in the first example, an image inversion optical subsystem 10 in the second example comprises a deflecting prism 12 and a Pechan prism 14. However, the first reflecting surface and second transmitting surface, each having power and being incapable of image inversion, are so independently provided that the degree of freedom in making correction for rotationally asymmetric decentration aberrations can be increased thereby making sure of good performance. It is noted that the surfaces of the Pechan prism 14 used in the second example are all formed of plano surfaces and so have no power.

Figure 8:
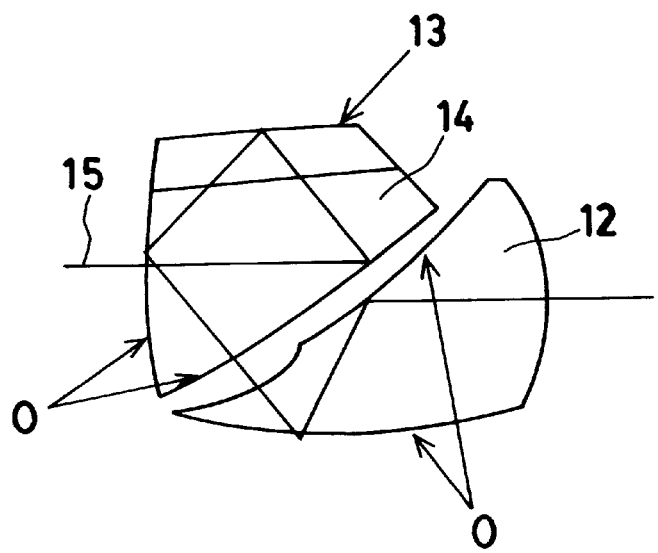
FIG. 8 is sectional schematics of Example 3 according to the first aspect of the invention and Example 46 of the second aspect of the invention.

In the third example (FIG. 8), too, an image inversion optical subsystem 10 comprises a deflecting prism 12 having the same power as in the first or second example and a Pechan prism 14 having a roof surface 13. However, this example is advantageous over the first and second examples because the Pechan prism 14 capable of making sure of some optical path length is located on the object side while the deflecting prism 12 is positioned on the eyepiece side, so that the focal length of the objective can be extended resulting in the achievement of an increase in the finder magnification and, at the same time, a size reduction of the finder optical system itself. As in the second example, the surfaces of the deflecting prism 12 that are incapable of image inversion are so independently provided that the degree of freedom in making correction for rotationally asymmetric decentration aberrations can be increased thereby making sure of good performance. A primary image plane is located between and in the vicinity of the two prisms (12 and 14).

Examples 4, 5, 6, 7, 8, 9, 10, 11, 12, 13, 14, 15, 16, 17, 18, 19, 20, 21, 22, 23, 24, 25 and 26, given below, are all directed to a single image formation type finder optical system, with only the image inversion optical subsystems illustrated. Throughout these examples, a primary image plane is located in the vicinity of a first transmitting surface of the prism located on the object side.

Figure 9:
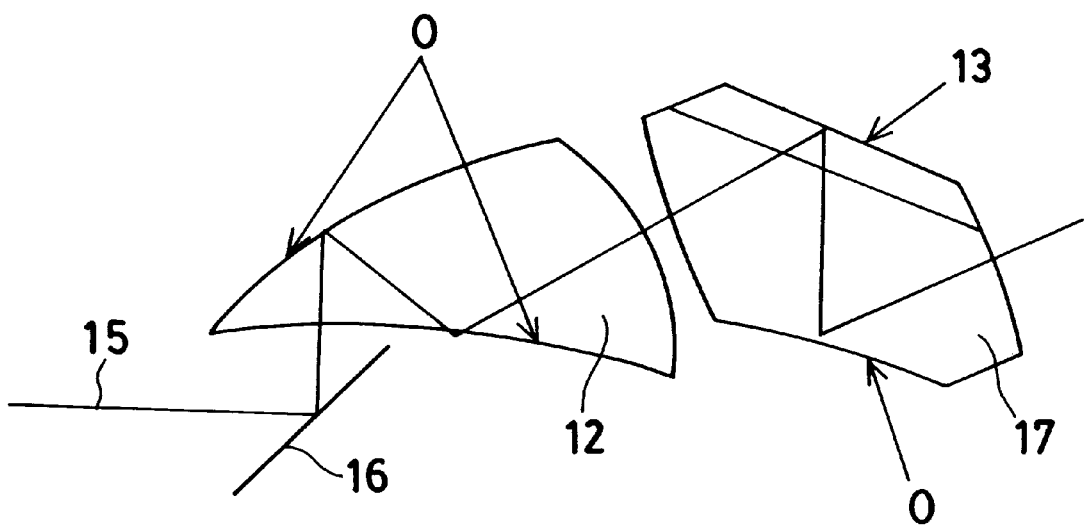
FIG. 9 is sectional schematics of Example 4 according to the first aspect of the invention and Example 47 according to the second aspect of the invention.

The image inversion optical subsystem according to Example 4 (FIG. 9) consists of a mirror 16 for guiding an inverted image of an object formed by an objective to the finder optical system, a deflecting prism 12 incapable of image inversion and having power, and a deflecting prism 17 has a roof surface 13. The deflecting prism 12 having power consists of a first transmitting surface, a first reflecting surface, a second reflecting surface and a second transmitting surface with the first transmitting surface and second reflecting surface defined by a common surface. The common surface and first reflecting surface are defined by rotationally asymmetric surfaces 0. The deflecting prism 17 having roof surface 13 consists of a first transmitting surface, a first reflecting surface, a second reflecting surface and a second transmitting surface, with the first reflecting surface being the roof surface 13. The surfaces of deflecting prism 17 are all formed of independent surfaces, with the second reflecting surface defined by a rotationally asymmetric surface 0.

According to this arrangement, rotationally asymmetric decentration aberrations can be well corrected by the rotationally asymmetric surfaces 0. In addition, the size of the finder optical system can be reduced in the height direction.

Figure 10:
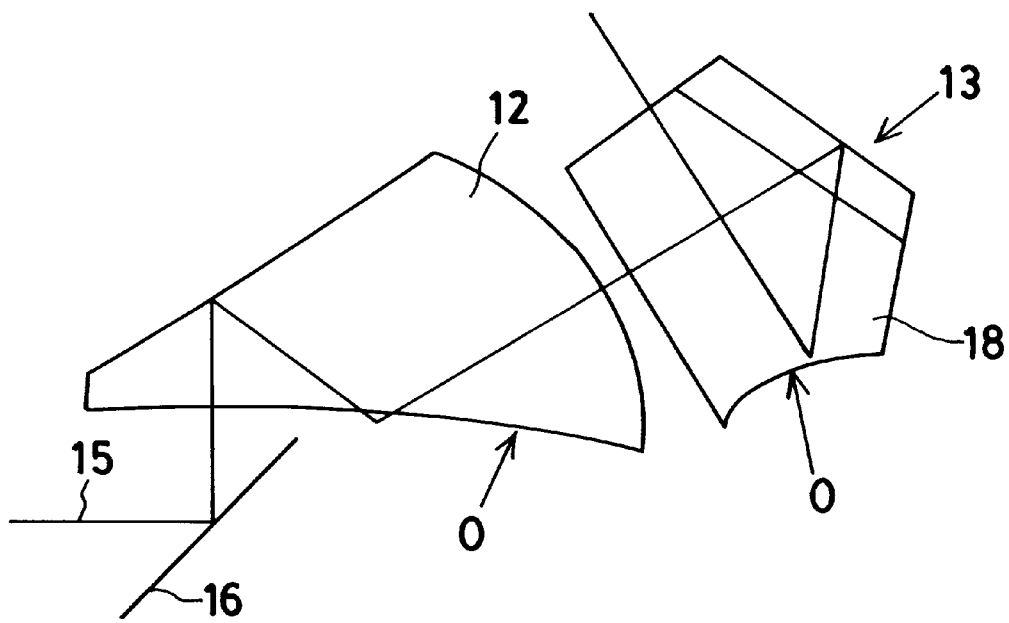
FIG. 10 is a sectional schematic of Example 6 according to the first aspect of the invention.

The image inversion optical subsystem according to Example 5 (not shown for reason of similarity to FIG. 10) or Example 6 (FIG. 10) consists of a mirror for guiding an inverted image of an object formed by an objective to the finder optical system, a deflecting prism 12 incapable of image inversion and having power, and a penta prism 18 having a roof surface 13. The deflecting prism 12 incapable of image inversion and having power consists of a first transmitting surface, a first reflecting surface, a second reflecting surface and a second transmitting surface, with the first transmitting surface and second reflecting surface defined by a common surface. It is the common surface that is defined by a rotationally asymmetric surface 0. The penta prism 18 having roof surface 13 consists of a first transmitting surface, a first reflecting surface, a second reflecting surface and a second transmitting surface, all independent. Whether or not the penta prism 18 having roof surface 13 has power is a difference between Example 5 and Example 6; the penta prism 18 has no power in Example 5 and power is imparted to the penta prism 18 in Example 6 by applying the rotationally asymmetric surface 0 to the second reflecting surface thereof.

According to these arrangements, rotationally asymmetric decentration aberrations can be well corrected by the rotationally asymmetric surfaces. In addition, the finder optical systems may be used in the form of a waist-level finder.

Figure 11:
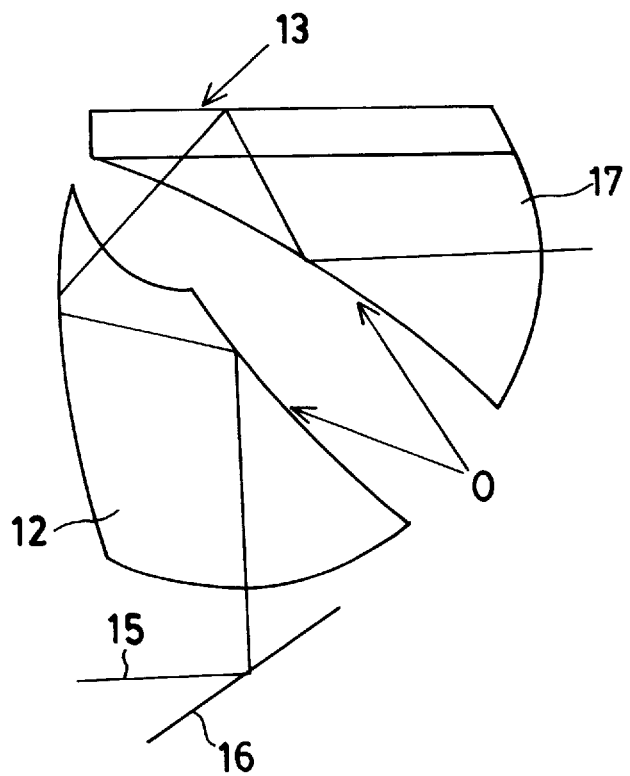
FIG. 11 is a sectional schematic of Example 8 according to the first aspect of the invention.

The image inversion optical subsystem according to Example 7 (not shown for reason of similarity to FIG. 11) or Example 8 (FIG. 11) consists of a mirror 16 and two deflecting prisms 12 and 17. Differences between Examples 7 and 8 are whether or not the surfaces of deflecting prism 12 incapable of image inversion and having power are independent, and whether or not the prism 17 having opposite roof surfaces 13 has power. The image inversion optical subsystem according to Example 7 consists of a mirror 16 for guiding an inverted image of an object formed by an objective to the finder optical system, a deflecting prism 12 that has a common surface, is incapable of image inversion and has power, and a deflecting prism 17 having no power and having a roof surface. The prism 12 incapable of image inversion and having power consists of a first transmitting surface, a first reflecting surface, a second reflecting surface and a second transmitting surface, with the first reflecting surface and second transmitting surface defined by a common surface. It is the common surface that is defined by a rotationally asymmetric surface 0. The deflecting prism 17 having a roof surface 13 and having no power as a whole consists of a first transmitting surface, a first reflecting surface defined by roof surface 13, a second reflecting surface and a second transmitting surface, with the first transmitting surface and second reflecting surface defined by a common surface. The image inversion optical subsystem according to Example 8 consists of a mirror 16 for guiding an inverted image of an object formed by an objective to the finder optical system, a deflecting prism 12 incapable of image inversion and having power, wherein axial chief ray do not intersect with each other because each surface is independent, and a deflecting prism 17 having power and including a roof surface 13. The deflecting prism 12 incapable of image inversion and having power consists of a first transmitting surface, a first reflecting surface, a second reflecting surface and a second transmitting surface, with the first reflecting surface and second transmitting surface defined by rotationally asymmetric surfaces 0. The deflecting prism 17 having power and including roof surface 13 consists of a first transmitting surface, a first reflecting surface defined by roof surface 13, a second reflecting surface and a second transmitting surface. This deflecting prism acts to change the angles of incident light rays and emerging light rays. If two deflecting prisms are used as in this example, however, it is then possible to bring the direction of line of sight in relative alignment with the subject direction. According to this arrangement, rotationally asymmetric decentration aberrations can be well corrected by rotationally asymmetric surfaces 0.

Figure 12:
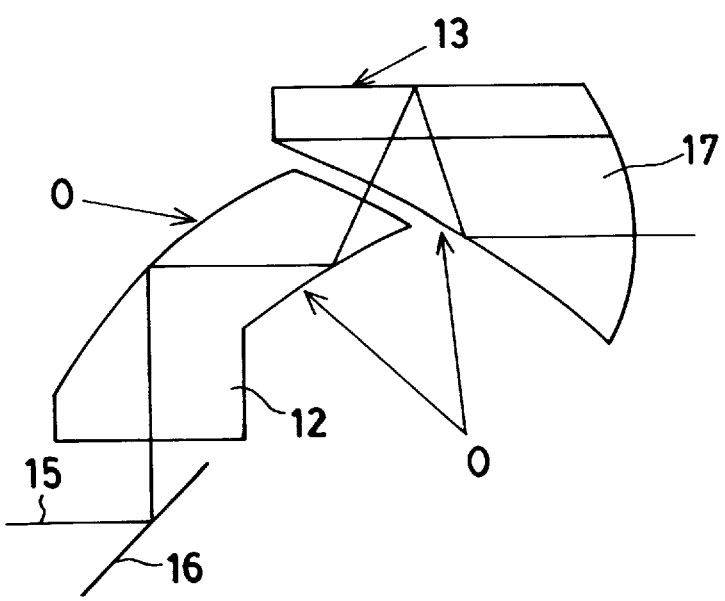
FIG. 12 is a sectional schematic of Example 10 according to the first aspect of the invention.

As in Example 7 and 8, the image inversion optical subsystem according to Example 9 (not shown for reason of similarity to FIG. 12), and Example 10 (FIG. 12) consists of a mirror 16 and two deflecting prisms 12 and 17. These examples are different from Examples 7 and 8 in terms of the direction of light rays reflected at a first reflecting surface of the deflecting prism 12 having power and incapable of image inversion. In Examples 7 and 8, light rays 15 reflected at the first reflecting surface propagate toward the object side while, in Examples 9 and 10, light rays 15 reflected at the first reflecting surface propagate toward the image side. In Example 9, and 10, the surfaces of the deflecting prism 12 having power and incapable of image inversion are so independently provided that the degree of freedom can be increased thereby making good correction for rotationally asymmetric decentration aberrations. Other features and advantages (actions) are the same as in Examples 7 and 8.

Figure 13:
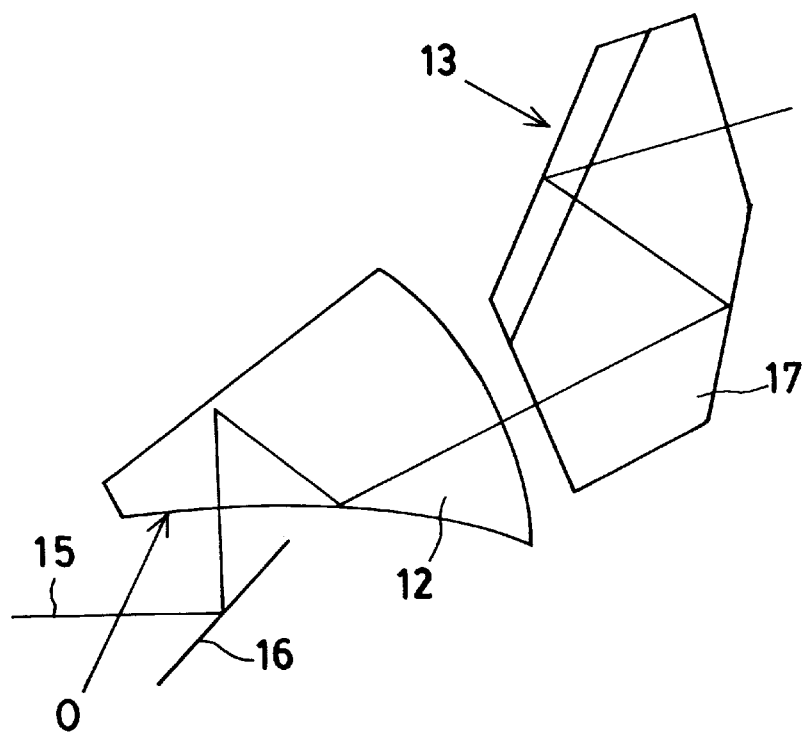
FIG. 13 is a sectional schematic of Example 12 according to the first aspect of the invention.

As in Examples 7 and 8, the image inversion optical subsystem according to Example 11 (not shown for reason of similarity to FIG. 13), and Example 12 (FIG. 13) consists of a mirror 16 and two deflecting prisms 12 and 17. These examples are different from Examples 7 and 8 in terms of the direction of two deflecting prisms 12 and 17. A difference between Example 11 and Example 12 is whether the deflecting prism 17 including a roof surface 13 has power, and whether or not a common surface exists. The image inversion optical subsystem according to Example 11 consists of a mirror 16 for guiding an inverted image of an object formed by an objective, a deflecting prism 12 having power and incapable of image inversion, and a deflecting prism 17 including a roof surface 13. The deflecting prism 12 having power and incapable of image inversion consists of a first transmitting surface, a first reflecting surface, a second reflecting surface and a second transmitting surface, with the second reflecting surface and first transmitting surfaces defined by a common surface. The common surface and the first reflecting surface are defined by rotationally asymmetric surfaces 0. The deflecting prism 17 including roof surface 13 consists of a first transmitting surface, a first reflecting surface, a second reflecting surface defined by roof surface 13 and a second transmitting surface. It is the first reflecting surface and second transmitting surface that are defined by a common, rotationally asymmetric surface having power. This feature (action and effect) is the same as in Example 7. In Example 12, the deflecting prism 17 located on the observer side has no power, with the second reflecting surface defined by roof surface 13. The surfaces of prism 17 are independently provided. The first transmitting surface and second reflecting surface of deflecting prism 12 located on the object side, said prism 12 having power and incapable of image inversion, are defined by a common, rotationally asymmetric surface 0. This feature (action and effect) is the same as in Example 7.

Figure 14:
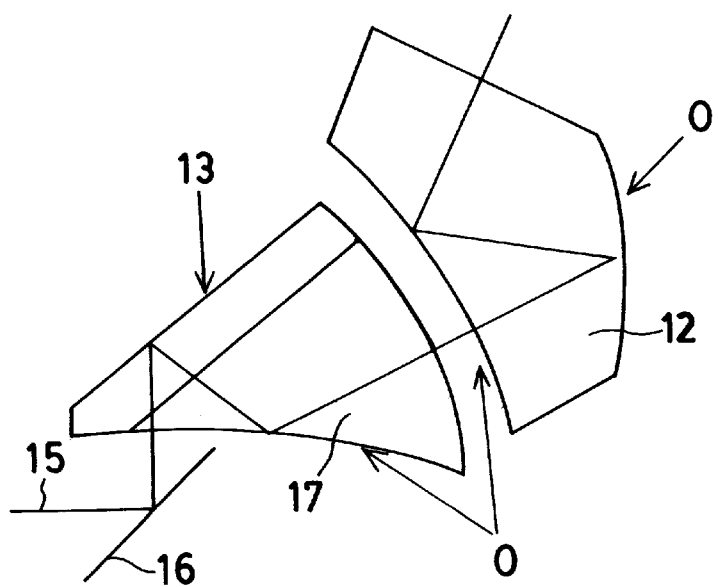
FIG. 14 is a sectional schematic of Example 14 according to the first aspect of the invention.

Example 13 (not shown for reason of similarity to FIG. 14), and Example 14 (FIG. 14) is much the same as Examples 11 and 12 with the exception that the order of deflecting prisms 12 and 17 are reverse. The features (action and effect) of these examples are the same as in Examples 11 and 12.

Figure 15:
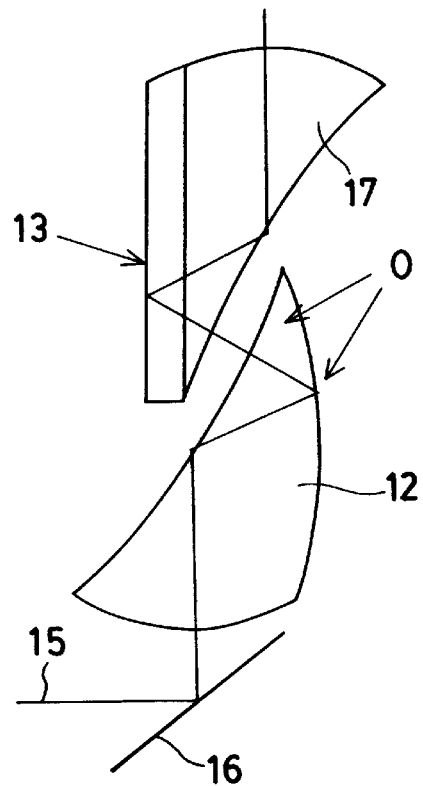
FIG. 15 is sectional schematics of Example 15 according to the first aspect of the invention and Example 59 according to the second aspect of the invention.

As in Examples 7 and 8, the image inversion optical subsystem according to Example 15 (FIG. 15), and Example 16 (not shown for reason of similarity to FIG. 15) consists of a mirror 16 and two deflecting prisms 12 and 17. Differences with Examples 7 and 8 are the direction of deflecting prisms 12 and 17, and the exit angle of light rays 15. These examples are suitable for waist-level finders where the subject is viewed from above with a sight held at waist level. A difference between Example 15 and Example 16 is whether the deflecting prism 12 having power and incapable of image inversion includes a common surface or consists of independent surfaces. According to Example 16 wherein the deflecting prism 12 consists of independent surfaces, the degree of freedom in making correction for rotationally asymmetric decentration aberrations can be so increased that the aberrations can be better corrected. The image inversion optical subsystem according to Example 15 consists of a mirror 16 for guiding an inverted image of an object formed by an objective to the finder optical system, a deflecting prism 12 incapable of image inversion and having power, and a deflecting prism 17 capable of image inversion and including a roof surface 13. The deflecting prism 12 incapable of image inversion and having power consists of a first transmitting surface, a first reflecting surface, a second reflecting surface and a second transmitting surface, with the first reflecting surface and second transmitting surface defined by a common, rotationally asymmetric surface 0. The second reflecting surface, too, is defined by a rotationally asymmetric surface 0. The deflecting surface 17 including roof surface 13, located on the observer side, consists a first transmitting surface, a first reflecting surface including roof surface 13, a second reflecting surface and a second transmitting surface, with the second reflecting surface and first transmitting surface defined by a common surface. This feature (action and effect) is the same as in Example 7. The image inversion optical subsystem according to Example 16 consists of a mirror 16 for guiding an inverted image of an object formed by an objective, a deflecting mirror 12 incapable of image inversion and having power, and a deflecting prism 17 capable of image inversion and including roof surface 13 consists of a first transmitting surface, a first reflecting surface, a second reflecting surface and a second transmitting surface, all independent. It is the first reflecting surface and second reflecting surface that are defined by rotationally asymmetric surfaces 0. The arrangement of the deflecting prism 17 including roof surface 13, located on the observer side, is the same as in Example 15, and has the same feature (action and effect) as in Example 7.

Figure 16:
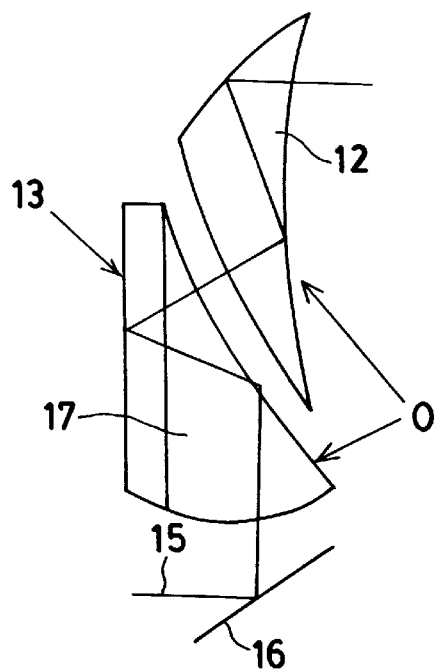
FIG. 16 is a sectional schematic of Example 18 according to the first aspect of the invention.

As in Examples 7 and 8, the image inversion optical subsystem according to Example 17 (FIG. 16), and Example 18 (not shown for reason of similarity to FIG. 16) consists of a mirror 16 and two deflecting prisms 12 and 17. Differences with Examples 7 and 8 are the direction of deflecting prisms 12 and 17, and the exit angle of light rays 15. A difference between Examples 17 and 18 is whether or not either of deflecting prisms 12 and 17 includes a roof surface 13. The image inversion optical subsystem according to Example 17 consists of a first transmitting surface, a first reflecting surface, a second reflecting surface and a second transmitting surface, with the first reflecting surface and second transmitting surface defined by a common, rotationally asymmetric surface 0. The deflecting surface 17 including roof surface 13, located on the observer side, consists of a first transmitting surface, a first reflecting surface, a second reflecting surface defined by roof surface 13 and a second transmitting surface, with the first reflecting surface and second transmitting surface defined by a common, rotationally asymmetric surface 0. This feature (action and effect) is the same as in Example 7. In Example 18, the deflecting prism 17 located on the object side includes a roof surface 13 and is capable of image inversion, with a second reflecting surface thereof defined by a roof surface 13. Two rotationally asymmetric surfaces are applied, one to a second transmitting surface of prism 17 and one to a first reflecting surface of prism 17, both surface being defined by a common surface. The deflecting prism 12 incapable of image inversion, located on the observer side, consists of a first transmitting surface, a first reflecting surface, a second reflecting surface and a second transmitting surface, with the first reflecting surface and second transmitting surface defined by a common, rotationally asymmetric surface 0. This feature (action and effect) is the same as in Example 7.

Figure 17:
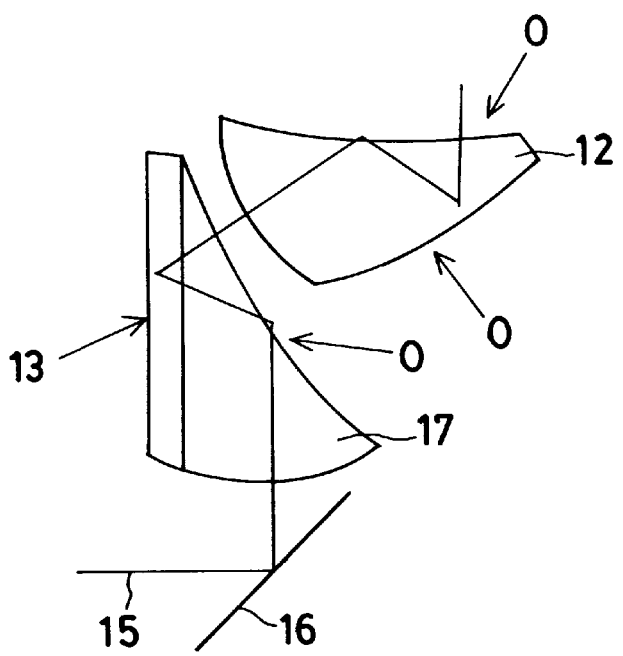
FIG. 17 is a sectional schematic of Example 20 according to the first aspect of the invention.
Figure 27:
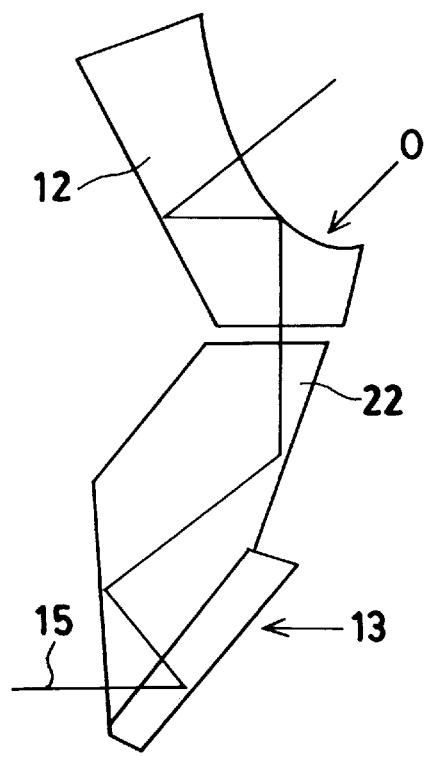
FIG. 27 is a sectional schematic of Example 38 according to the first aspect of the invention.

As in Examples 7 and 8, the image inversion optical subsystem according to Example 19 (not illustrated for similarity to FIG. 27), and Example 20 (illustrated in FIG. 17) consists of a mirror 16 and two deflecting prisms 12 and 17. Differences with Examples 7 and 8 are the direction of deflecting prisms 12 and 7, and the exit angle of light rays 15. These examples are suitable for waist-level finders where the subject is viewed from above with a sight held at waist level. In Examples 19 and 20 the deflecting prism 17 including a roof surface 13 differs. The image inversion optical subsystem according to Example 19 consists of a mirror 16 for guiding an inverted image of an object formed by an objective, a deflecting prism 12 incapable of image inversion and having power, and a deflecting prism 17 capable of image inversion and including roof surface 13. The deflecting prism 12 incapable of image inversion and having power consists of a first transmitting surface, a first reflecting surface, a second reflecting surface and a second transmitting surface, all defined by rotationally asymmetric surfaces 0. The deflecting prism 17 including roof surface 13, located on the image side, consists of a first transmitting surface, a first reflecting surface, a second reflecting surface including roof surface 13 and a second transmitting surface, with the first reflecting surface and second transmitting surface defined by a common, rotationally asymmetric surface 0. This feature (action and effect) is the same as in Example 7. In Example 20, the deflecting prism 17 located on the object side is capable of image inversion and includes a roof surface 13, with a second reflecting surface thereof defined by roof surface 13. The deflecting prism 12 having power and incapable of image inversion is located on the observer side. The first reflecting surface and second transmitting surface of deflecting prism 17 on the object side are defined by a common, rotationally asymmetric surface 0, and the first reflecting surface, second reflecting surface and transmitting surface of deflecting prism 12 on the observer side are defined by a common, rotationally asymmetric surface. This feature (action and effect) is the same as in Example 7.

Figure 18:
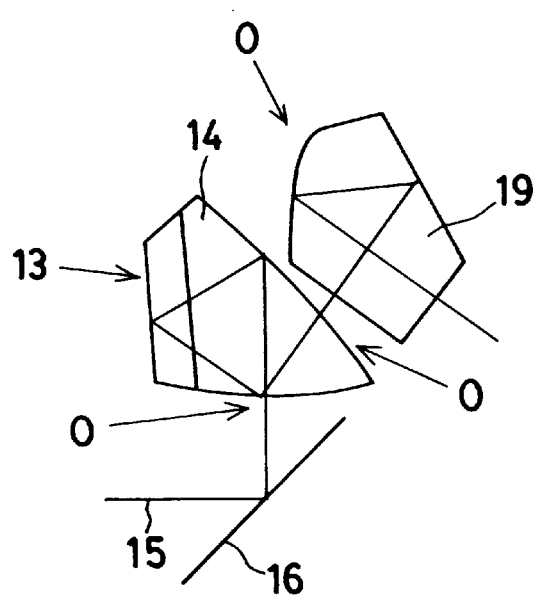
FIG. 18 is a sectional schematic of Example 21 according to the first aspect of the invention.

Example 21 (FIG. 18), and Example 22 (not illustrated for similarity to FIG. 18) is directed to an image inversion optical subsystem consisting of a mirror 16 capable of image inversion, a Pechan prism 14 including a roof surface 13 and a pentagonal prism 19 which is incapable of image inversion and has power, and in which an axial chief ray 15 crosses over itself. Differences between Examples 21 and 22 are whether or not the Pechan prism 14 includes roof surface 13, and whether or not the pentagonal prism 19 includes a common surface. The image inversion optical subsystem of Example 21 consists of a mirror 16 for guiding an inverted image of an object formed by an objective to the finder optical system, a Pechan prism 14 capable of image inversion, having power and including a roof surface 13, and a pentagonal prism 19 which is incapable of image inversion and has power and in which an axial chief ray 15 crosses over itself. The Pechan prism 14 including roof surface 13 consists of a first transmitting surface, a first reflecting surface, a second reflecting surface defined by roof surface 13, a third reflecting surface and a second transmitting surface, with the third reflecting surface and first transmitting surface defined by a common, rotationally asymmetric surface 0 and the first reflecting surface and second transmitting surface defined by a common, rotationally asymmetric surface 0. The pentagonal prism 19 which is incapable of image inversion and has power and in which the axial chief ray 15 crosses over itself consists of a first transmitting surface, a first reflecting surface, a second reflecting surface and a second transmitting surface, all independent. A rotationally asymmetric surface 0 is used at the second reflecting surface. According to Example 21, it is possible to reduce the size of the finder optical system itself and, at the same time, to increase the finder magnification because a long optical path can be turned back by the location of the three-reflection Pechan prism 15 on the objective side. If, in this case, more rotationally asymmetric surfaces are used, it is then possible to make better correction for rotationally asymmetric aberrations. Example 22 is different from Example 21 in that a Pechan prism 14 has no power, and a pentagonal prism 19 which is incapable of image inversion and has power and in which an axial chief ray 15 crosses over itself has a first transmitting surface and a second reflecting surface defined by a common surface. A rotationally asymmetric surface 0 is applied to such a common surface. The feature (action and effect) of Example 22 is much the same as in Example 21. However, Example 22 is lower in fabrication cost than Example 21 because the Pechan prism 14 used has no power.

Figure 19:
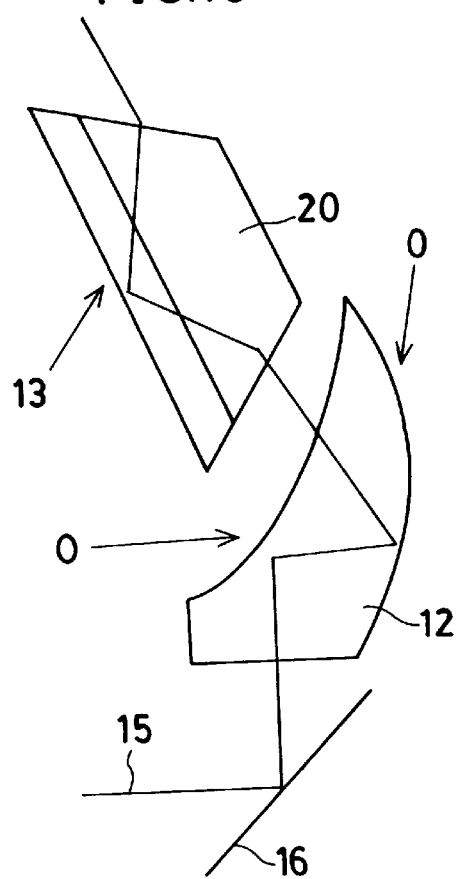
FIG. 19 is a sectional schematic of Example 23 according to the first aspect of the invention.

Example 23 (FIG. 19), and Example 24 (not illustrated for similarity to FIG. 19) is directed to an image inversion optical subsystem consisting of a mirror 16, a deflecting prism 12 which is incapable of image inversion and has power and in which an axial chief ray 15 does not cross over itself, and a single reflection type wedge prism 20. A difference between Examples 23 and 24 is whether or not the single reflection type wedge prism 20 capable of image inversion has power. The image inversion optical subsystem of Example 23 consists of a mirror 16 for guiding an inverted image of an object formed by an objective, a deflecting prism 12 which is incapable of image inversion and has power and in which an axial chief ray 15 does not cross over itself, and a single reflection type wedge prism 20 including a roof surface 13. The deflecting prism 12 consists of a first transmitting surface, a first reflecting surface, a second reflecting surface and a second transmitting surface, with the first reflecting surface and second transmitting surface defined by a common surface. Rotationally asymmetric surfaces 0 are used at the common surface and the first reflecting surface. The wedge prism 20 consists of a first transmitting surface, a first reflecting surface including roof surface 13 and a second transmitting surface, and has no power. By use of the wedge prism 20, it is possible to make sure of a relatively long optical path in the rear of mirror 16. Thus, the arrangement of this example is suitable for an electronic camera or digital camera having electronic parts built in the rear of a phototaking surface. This arrangement, albeit being of simple construction, can have high performance. In Example 24, rotationally asymmetric surfaces 0 are applied to first and second transmitting surfaces of a wedge prism 20 to impart powers to them, thereby improving performance. The advantages (action and effect) of this example are the same as in Example 23.

As in Examples 23 and 24, Example 25 (not illustrated for similarity to FIG. 19), and Example 26 (not illustrated for similarity to FIG. 19) is directed to an image inversion optical subsystem consisting of a mirror 16, a deflecting prism 12 which is incapable of image inversion and has power and in which an axial chief ray 15 does not cross over itself and a single reflection type wedge prism 20. A difference with Examples 23 and 24 is whether or not the deflecting prism 12—which is incapable of image inversion and has power and in which the axial chief ray 15 does not cross over itself—consists of independent surfaces. A difference between Examples 25 and 26 is whether or not the single reflection type wedge prism 20 capable of image inversion has power. The advantages (action and effect) of each example are the same as in Examples 23 and 24. Since the respective surfaces of deflecting prism 12 are independent, the degree of freedom in making correction for rotationally asymmetric aberrations is much more increased with an improved performance.

Examples 27, 28, 29, 30, 31, 32, 33, 44, 45, 36, 37, 38, 39, 40, 41, 42 and 43 according to the first aspect of the invention, given below, are each directed to a single image formation type finder optical system for use on a lens shutter camera. In this regard, it is noted that only the image inversion optical subsystem is illustrated (with the left side of each figure defining an object side). It is also noted that when two prisms are used, a primary image plane is located between and in the vicinity of a prism located nearest to the object side and a prism adjacent thereto. In the case of an integrated Porro prism, however, the primary image plane is located in the vicinity of a first transmitting surface. When the prism is divided into two parts, the primary image plane is located between and in the vicinity of the two parts.

Figure 20:
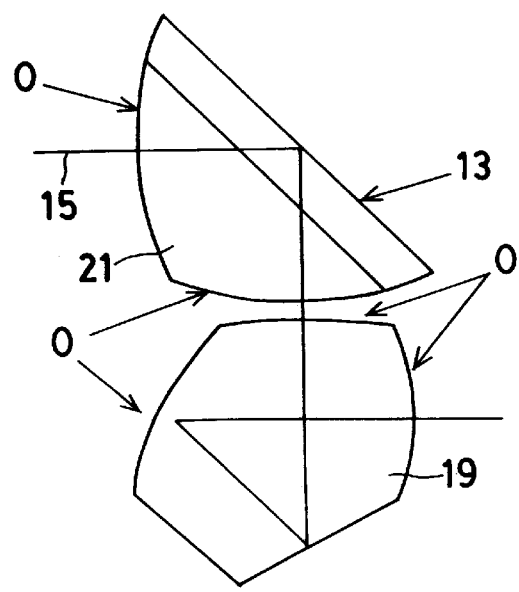
FIG. 20 is a sectional schematic of Example 27 according to the first aspect of the invention.

Example 27 (FIG. 20), and Example 28 (not illustrated for similarity to FIG. 20) is directed to an image inversion optical subsystem consisting a singe reflection type image inversion element 21 including a roof surface 13 and a pentagonal prism 19 which has power and is incapable of image inversion and in which an axial chief ray 15 crosses over itself. The objective used herein may be either a single-focus lens or a zoom lens. In the image inversion optical subsystem of Example 27, the image inversion element 21 is a single reflection type prism including a roof surface 13 and is positioned on the object side and the pentagonal prism 19—which is incapable of image inversion, has power and provides two reflections—is located on an observer side. The single reflection type prism including roof surface 13 consists of a first transmitting surface, a first reflecting surface defined by roof surface 13 and a second transmitting surface, with the first and second transmitting surfaces defined by rotationally asymmetric surfaces 0. The pentagonal prism 19—which is located on the observer side, is incapable of image inversion, has power and provides two reflections—consists of a first transmitting surface, a first reflecting surface, a second reflecting surface and a second transmitting surface, all independent. Rotationally asymmetric surfaces are applied to the surfaces other than the first reflecting surface. Example 28 is different from Example 27 in that the first reflecting surface and second transmitting surface of a pentagonal prism 19—which is incapable of image inversion, has power and provides two reflections—are defined by a common surface. In either case, rotationally asymmetric decentration aberrations are well corrected by the rotationally asymmetric surfaces 0. In addition, the erected image can be reasonably observed because the direction of line of sight is substantially parallel with the subject.

Figure 21:
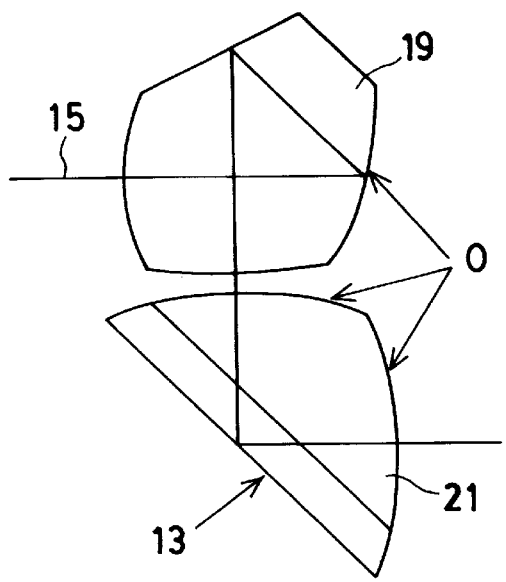
FIG. 21 is a sectional schematic of Example 29 according to the first aspect of the invention.

In Example 29 (FIG. 21), the order of prisms 19 and 21 in Examples 27 and 28 is reversed. That is, a pentagonal prism 19—which is incapable of image inversion, has power and provides two reflections—is positioned on an objective side and a single reflection type prism 21 including a roof surface 13 is located on an image side. It is noted that both the prisms comprise independent surfaces. The arrangement of each example achieves size reductions and high finder magnifications because an optical path on the objective side is turned back over a long distance.

Example 30 (not illustrated for similarity to FIG. 21) is directed to an image inversion optical subsystem consisting of a pentagonal prism 18 which includes a roof surface 13 and provides two reflections and in which an axial chief ray 15 crosses over itself and a pentagonal prism 19 which has power, is incapable of image inversion and provides two reflections and in which the axial chief ray 15 crosses over itself. The objective used may be either a single-focus lens or a zoom lens. The pentagonal prism 19 having power consists of a first transmitting surface, a first reflecting surface, a second reflecting surface and a second transmitting surface, with the first reflecting surface and second transmitting surface defined by a common, rotationally asymmetric surface 0. The pentagonal prism 18 including roof surface 13 consists of a first transmitting surface, a first reflecting surface, a second reflecting surface including roof surface 13 and a second transmitting surface, with a rotationally asymmetric surface 0 used at the first reflecting surface. By use of the optical element providing two reflections in either example, it is possible to reduce the size of the finder optical system because an optical path is turned back over a long distance.

Figure 22:
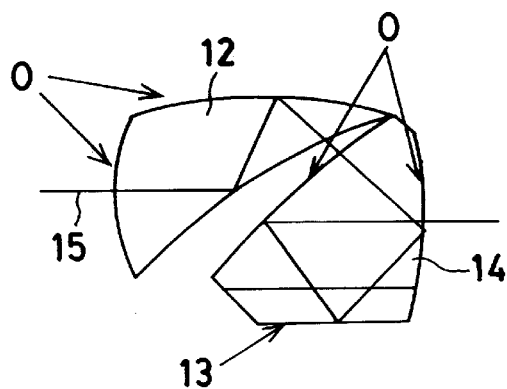
FIG. 22 is a sectional schematic of Example 31 according to the first aspect of the invention.
Figure 23:
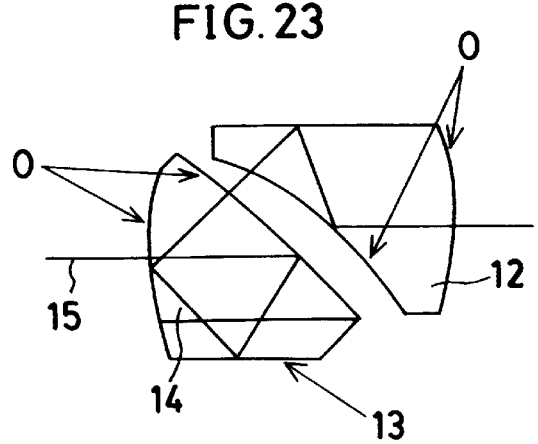
FIG. 23 is a sectional schematic of Example 33 according to the first aspect of the invention.

Example 31 (FIG. 22), Example 32 (not illustrated for similarity to FIG. 23), and Example 33 (FIG. 23) is directed to a combination of a Pechan prism 14 with a deflecting prism 12 incapable of image inversion and having power. In each example, a roof surface 13 is included in the Pechan prism 14. The advantages (action and effect) of each example are the same as in Examples 1 and 2. The objective used may be either a single-focus lens or a zoom lens. In these examples, it is noted that embodiments are made to the location of prisms and the presence or absence of a common prism. In any case, it is possible to make good correction for rotationally asymmetric decentration aberrations by use of a rotationally asymmetric surface 0.

Figure 24A:
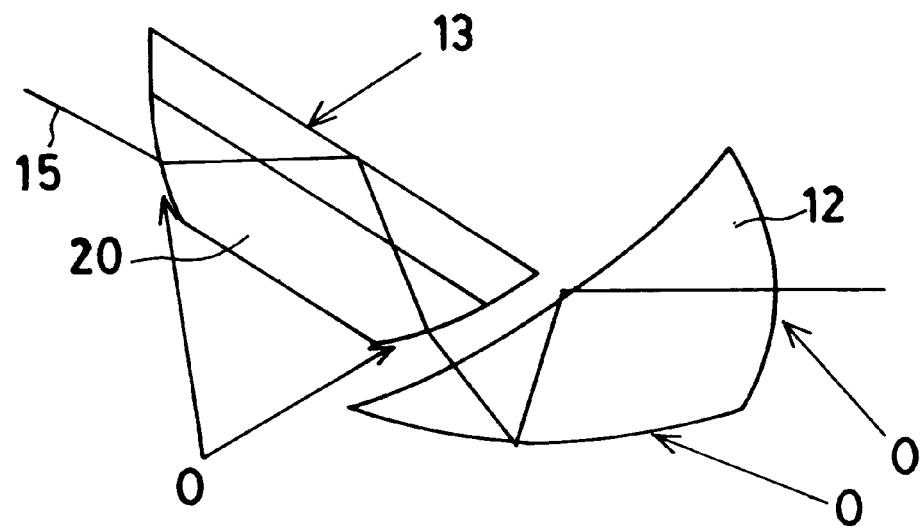
FIGS. 24a and 24b are sectional schematics of Examples 34 and 35 according to the first aspect of the invention.
Figure 24B:
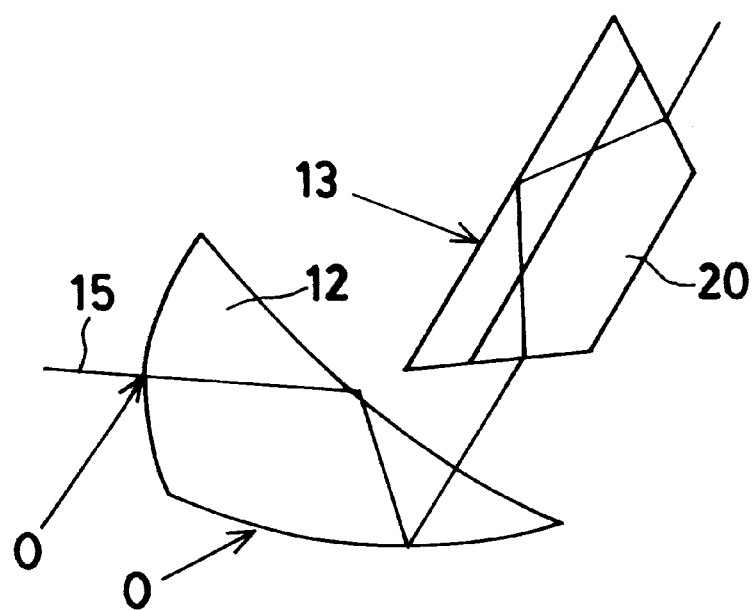
Figure 25:
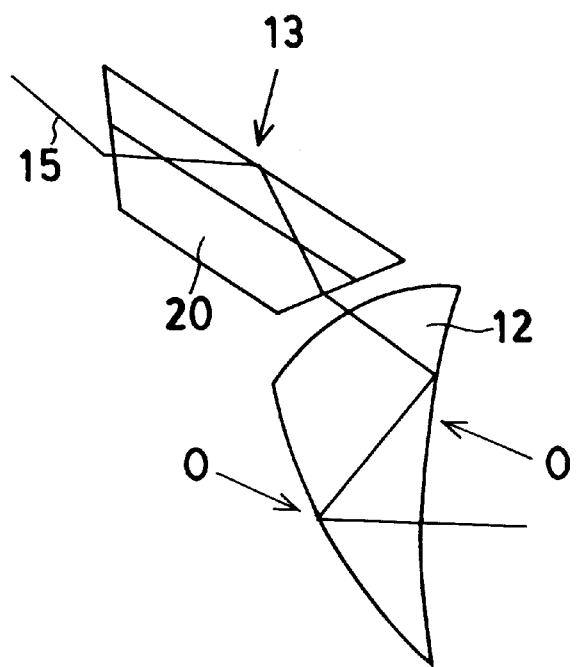
FIG. 25 is a sectional schematic of Example 36 according to the first aspect of the invention.
Figure 26:
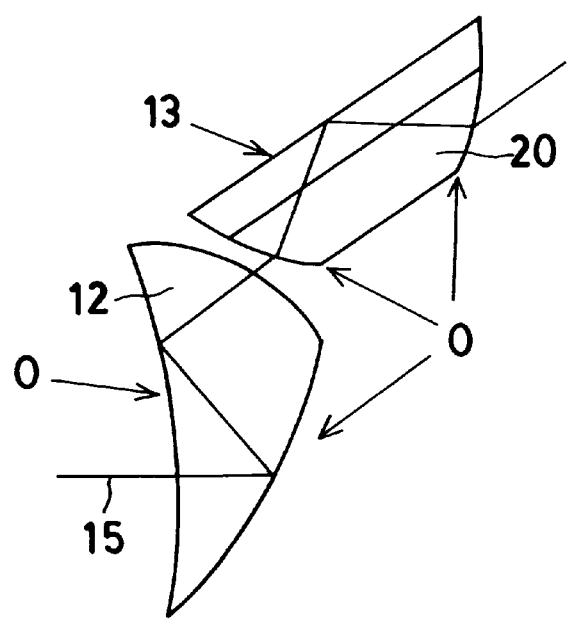
FIG. 26 is a sectional schematic of Example 37 according to the first aspect of the invention.

Example 34 (FIG. 24*a*), Example 35 (FIG. 24*b*), Example 36 (FIG. 25), and Example 37 (FIG. 26) is directed to a combination of a single reflection type wedge prism 20 with a deflecting prism 12 incapable of image inversion and having power. In each example, a roof surface 13 is included in the single reflection type wedge prism 20. The objective used may be either a single-focus lens or a zoom lens. In these examples, it is noted that embodiments are made to the location of prisms and the presence or absence of the power of the single reflection type wedge prism 20. In Example 34, and Example 35, the deflecting prism 12 incapable of image inversion and having power consists of a first transmitting surface, a first reflecting surface, a second reflecting surface and a second transmitting surface, with the second reflecting surface and first transmitting surface defined by a common surface. In Example 34, and Example 35 the size of the finder optical system can be reduced in the height direction while in Example 36, and Example 37 the size of the finder optical system can be reduced in the thickness direction. The arrangement of each example is also preferable for prevention of of light losses because the total number of reflecting surfaces is small. It is here noted that the angle of light reflected at the single reflection type reflecting surface must always be obtuse with respect to incident light; it is otherwise impossible to form an erected image by the combination of the single reflection type prism with the deflecting prism 12.

Example 38 (FIG. 27), Example 39 (not illustrated for similarity to FIG. 27), and Example 40 (not illustrated for similarity to FIG. 27) is directed to an image inversion optical subsystem consisting of a triple reflection type prism 22 which includes a roof surface 13 and in which an axial chief ray does not cross over itself and a deflecting prism 12 having power and incapable of image inversion. The objective used may be either a single-focus lens or a zoom lens. Differences among these examples are whether or not there is a common surface in the deflecting prism 12 having power and incapable of image inversion, and whether or not the triple reflection type prism 22 has power. In any case, rotationally asymmetric decentration aberrations can be well corrected by use of a rotationally asymmetric surface 0. Especially when the triple reflection type prism 22 is located on the objective side, it is possible to make sure of an optical path of sufficient length so that size reductions can be achieved simultaneously with a high finder magnification.

Figure 28:
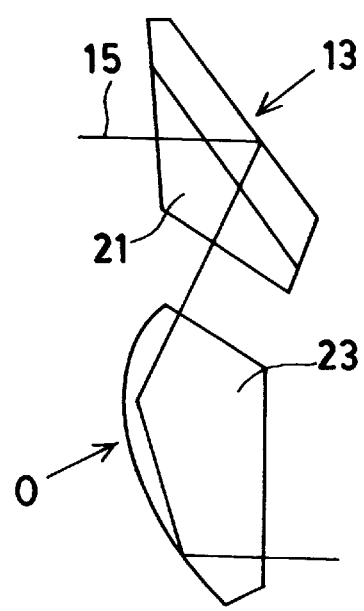
FIG. 28 is a sectional schematic of Example 41 according to the first aspect of the invention.

Example 41 (FIG. 28), and Example 42 (not illustrated for similarity to FIG. 28) is directed to an image inversion optical subsystem consisting of a single reflection type prism 21 including a roof surface 13 and a double reflection type prism 23 in which an axial chief ray 15 does not cross over itself. The objective used may be either a single-focus lens or a zoom lens. It is noted that a difference between these examples is whether or not there is a common surface in the double reflection type prism 23 having power and incapable of image inversion. In either case, rotationally asymmetric decentration aberrations can be well corrected by use of a rotationally asymmetric surface 0. The arrangement of each example is also favorable for preventing light losses because the total number of reflecting surfaces is small.

Figure 29:
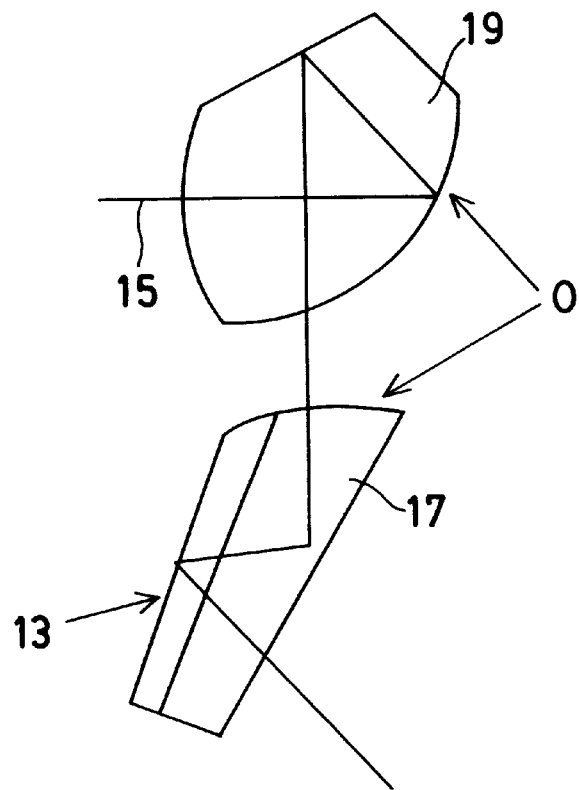
FIG. 29 is a sectional schematic of Example 43 according to the first aspect of the invention.

Example 43 (FIG. 29) is directed to an image inversion optical subsystem consisting of a pentagonal prism 19 which has power, is incapable of image inversion and provides two reflections and in which an axial chief ray 15 crosses over itself and a deflecting prism 17 including a roof surface 13. The objective used may be either a single-focus lens or a zoom lens. The pentagonal prism 19—which is incapable of image inversion, has power and provides two reflections—consists of a first transmitting surface, a first reflecting surface, a second reflecting surface and a second transmitting surface, with the first reflecting surface and second transmitting surface defined by a common surface, at which a rotationally asymmetric surface 0 is used. The deflecting surface 17 including roof surface 13 consists of a first transmitting surface, a first reflecting surface, a second reflecting surface defined by roof surface 13 and a second transmitting surface, with the first reflecting surface and second transmitting surface defined by a common surface. The rotationally asymmetric surface 0 ensures to make good correction for rotationally asymmetric decentration aberrations, and the deflecting prism 17 ensures the degree of freedom in layout, so that the size of the finder optical system can be further reduced.

It is understood that high performance and size reductions are achievable even when rotationally asymmetric surfaces are applied to an image inversion optical subsystem comprising a combination of a Porro prism with a pentagonal prism which has power, is incapable of image inversion and provides two reflections and in which an axial chief ray crosses over itself, and an image inversion optical subsystem comprising a combination of a Porro prism with a deflecting prism which has power, is incapable of image inversion and provides two reflections and in which an axial chief ray does not cross over itself.

Throughout the examples described above, the more the number of rotationally asymmetric surfaces 0 used, the more increased the degree of freedom in making correction for rotationally asymmetric decentration aberrations is, resulting in the achievement of higher performance. Weight reductions may also be achieved by using mirrors in place of prisms.

Examples of the second aspect of the invention are described below.

Example 44 (the same as FIG. 6 for the first aspect of the invention) is directed to a single image formation type finder optical system for use on a lens shutter camera, which consists of an objective 9, an image inversion optical subsystem 10 and an eyepiece 11. The objective 9 may be either a single-focus lens or a zoom lens. The image inversion optical subsystem of Example 44 consists of an optical element or deflecting prism 12 which is incapable of image inversion and located on an object side and an image direction-converting element or Pechan prism 14 which is located on an observer side to form an erected image by itself and includes a roof surface 13. A primary image plane is located between and in the vicinity of two prisms 12 and 14. The deflecting prism 12 consists of a first transmitting surface, a first reflecting surface, a second reflecting surface and a second transmitting surface, with the first reflecting surface and second transmitting surface defined by a common surface. The image direction-converting element or Pechan prism 14 including rood surface 13 consists of a first transmitting surface, a first reflecting surface, a second reflecting surface, a third reflecting surface and a second transmitting surface, with the first transmitting surface and third reflecting surface defined by a common surface and the first reflecting surface and second transmitting surface defined by a common surface. In this case, the second reflecting surface is defined by the roof surface. Rotationally asymmetric surfaces 0 are used at the first reflecting, second reflecting surface and second transmitting surface of the deflecting prism 12 and the surfaces of the image direction-converting element or Pechan prism 14 other than roof surface 13. According to this arrangement, rotationally asymmetric decentration aberrations are well corrected by the rotationally asymmetric surfaces 0 and the subject is reasonably observed because the subject is substantially in alignment with the direction of line of sight.

Figure 30:
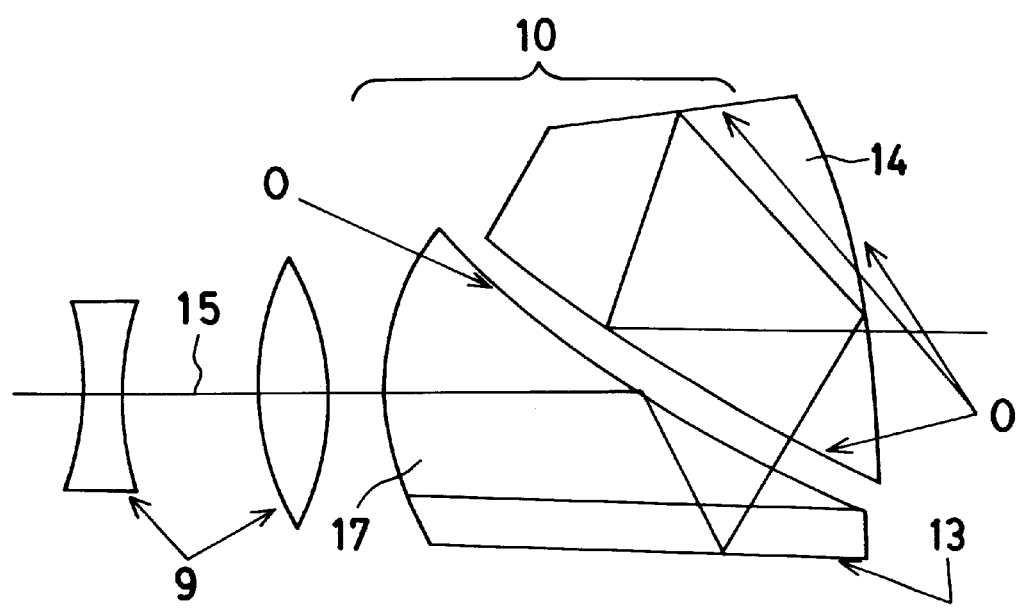
FIG. 30 is a sectional schematic of Example 45 according to the second aspect of the invention.

Example 45 (FIG. 30) is directed to a single image formation type finder optical system for use on a lens shutter camera, which consists of an objective lens 9 and an image inversion optical subsystem 10 which also acts as an eyepiece 11. The objective 9 may be either a single-focus lens or a zoom lens. The image inversion optical subsystem 10 of Example 45 consists of an image direction-converting element or deflecting prism 17 which is located on an object side and includes a roof surface 13 and an image direction-converting element or Pechan prism 14 which has power and is located on an observer side. A primary image plane is located between and in the vicinity of two prisms 17 and 14. The deflecting prism 17 consists of a first transmitting surface, a first reflecting surface, a second reflecting surface, a third reflecting surface and a second transmitting surface, with the first transmitting surface and third reflecting surface defined by a common surface and the second reflecting surface and second transmitting surface defined by a common surface. Rotationally asymmetric surfaces 0 are used at the first reflecting surface and second transmitting surface of deflecting prism 17 and all the surfaces of Pechan prism 14. According to this arrangement, rotationally asymmetric decentration aberrations are well corrected by the rotationally asymmetric surfaces 0 and the subject is reasonably observed because the subject is substantially in alignment with the direction of line of sight. In addition, since the image inversion function is allocated to the two image direction-converting elements, limitations imposed on the accuracy of parts are relatively gentle.

Example 46 (the same as in FIG. 8) is directed to a single image formation type finder optical system for use on a lens shutter camera. For simplicity, only an image inversion optical subsystem is illustrated. The objective used may be either a single-focus lens or a zoom lens. The image inversion optical subsystem of Example 46 consists of an image direction-converting element or Pechan prism 14 which includes a roof surface 13 and is located on an object side and an optical element or deflecting prism 12 which is located on an observer side and incapable of image inversion. A primary image plane is formed between and in the vicinity of two prisms 12 and 14. The image direction-converting element or Pechan prism 14 including roof surface 13 consists of a first transmitting surface, a first reflecting surface, a second reflecting surface, a third reflecting surface and a second transmitting surface, with the first transmitting surface and third reflecting surface defined by a common surface and the second reflecting surface and second transmitting surface defined by a common surface. In this case, the second reflecting surface is defined by roof surface 13. The deflecting prism 12 consists of a first transmitting surface, a first reflecting surface, a second reflecting surface and a second transmitting surface, with the second reflecting surface and first transmitting surface defined by a common surface. Rotationally asymmetric surfaces 0 are used at the surfaces of the image direction-converting element or Pechan prism 14 other than roof surface 13 and the first reflecting surface, second reflecting surface and first transmitting surface of the deflecting prism 12. According to this arrangement, rotationally asymmetric decentration aberrations are well corrected by the rotationally asymmetric surfaces 0 and the subject is reasonably observed because the subject is substantially in alignment with the direction of line of sight. In addition, since the Pechan prism 15 including roof surface 13 is located on the image side to ensure an optical path of sufficient length on the objective side, it is possible to increase the finder magnification while the size of the finder optical system itself is reduced.

Examples 47 to 72, given below, are each directed to a single image formation type finder optical system for use on a single lens reflex camera. For simplicity, only an image inversion optical subsystem is illustrated. A primary image plane is formed in the vicinity of a first transmitting surface of a prism located on an object side of the finder optical system.

An image inversion optical subsystem of Example 47 (the same as in FIG. 9) consists of an image direction-converting element or mirror 16 for guiding an inverted image of an object formed by an objective to the finder optical system, an optical element or deflecting prism 12 incapable of image inversion and an image direction-converting element or deflecting prism 17 including a roof surface 13. The image directiont conversion element or deflecting prism 17 including roof surface 13 consists of a first transmitting surface, a first reflecting surface, a second reflecting surface and a second transmitting surface, all independent surfaces, with the second reflecting surface defined by a rotationally asymmetric surface. The optical element or deflecting prism 12 incapable of image inversion consists of a first transmitting surface, a first reflecting surface, a second reflecting surface and a second transmitting surface, with the second reflecting surface and first transmitting surface defined by a common surface. Rotationally asymmetric surfaces 0 are used at the first reflecting surface, second reflecting surface and first transmitting surface. According to this arrangement, rotationally asymmetric decentration aberrations are well corrected by the rotationally asymmetric surfaces 0. In addition, the size of the finder optical system can be reduced in the height direction.

Figure 31:
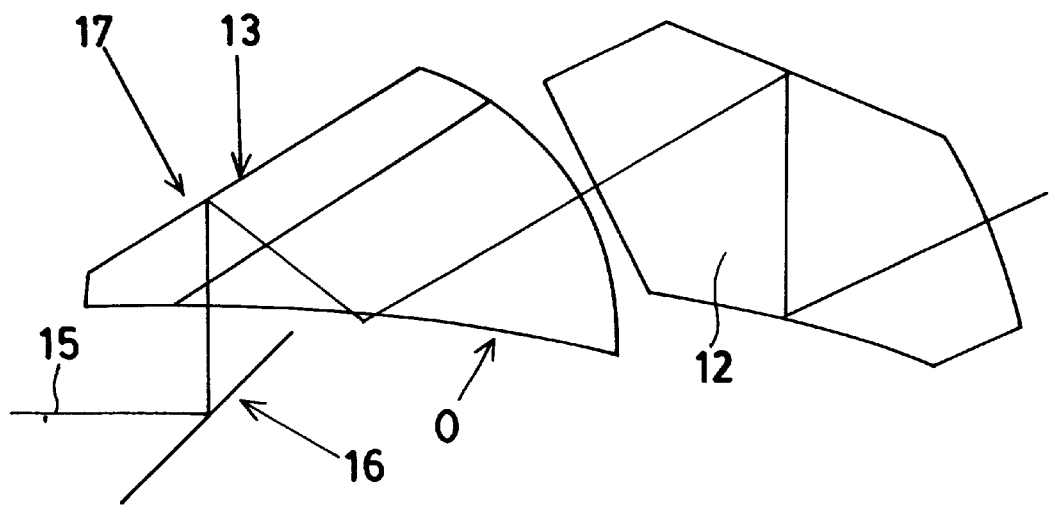
FIG. 31 is a sectional schematic of Example 48 according to the second aspect of the invention.

An image inversion optical subsystem of Example 48 (FIG. 31) consists of an image direction-converting element or mirror 16 for guiding an inverted image of an object formed by an objective to the finder optical system, an image direction-converting element or deflecting prism 17 including a roof surface 13 and an optical element or deflecting prism 17 incapable of image inversion. The image direction-converting element or deflecting prism 17 including roof surface 13 consists of a first transmitting surface, a first reflecting surface, a second reflecting surface and a second transmitting surface, with the first reflecting surface defined by roof surface 13. In this case, the first transmitting surface and second reflecting surface are defined by a common surface at which a rotationally asymmetric surface 0 is used. The optical element or deflecting prism 12 incapable of image inversion consists of a first transmitting surface, a first reflecting surface, a second reflecting surface and a second transmitting surface, all independent surfaces. According to this arrangement, rotationally asymmetric decentration aberrations are well corrected by the rotationally asymmetric surface 0. In addition, the size of the finder optical system can be reduced in the height direction.

Figure 32:
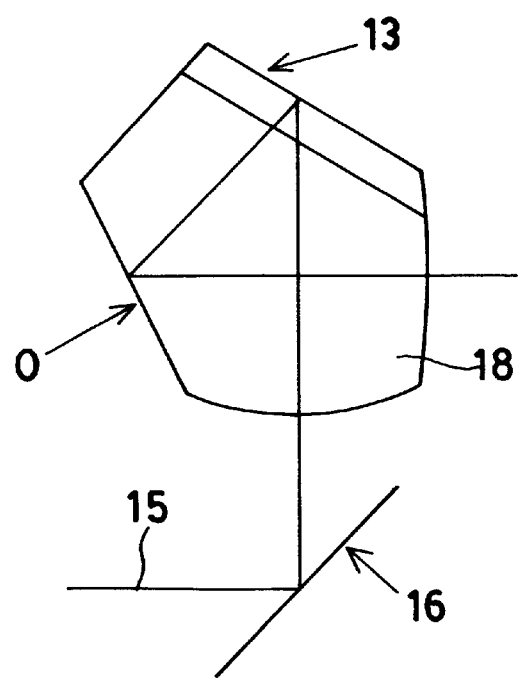
FIG. 32 is a sectional schematic of Example 49 according to the second aspect of the invention.

Example 49 (FIG. 32), and Example 50 (not illustrated for similarity to FIG. 32) is directed to an image inversion optical subsystem consisting of a mirror 16 and a pentagonal roof prism 18. A difference between these examples is where the roof surface 13 is located. The image inversion optical subsystem of Example 49 consists of a mirror 16 for guiding an inverted image of an object formed by an objective to the finder optical system and a pentagonal roof prism 18. The pentagonal roof prism 18 consists of a first transmitting surface, a first reflecting surface including a roof surface 13, a second reflecting surface and a second transmitting surface. The image inversion optical subsystem of Example 50 consists of a mirror 16 for guiding an inverted image of an object formed by an objective and a pentagonal roof prism 18. The pentagonal roof prism 18 consists of a first transmitting surface, a first reflecting surface, a second reflecting surface including a roof surface 13 and a second transmitting surface. A rotationally asymmetric surface 0 is used at the second reflecting surface in Example 49, and at the first reflecting surface in Example 50, respectively, thereby making good correction for rotationally asymmetric decentration aberrations. Each arrangement has a merit of reducing the number of parts because the element other than mirror 16 is made up of a prism. The location of the first reflecting surface near to the primary image plane for the object is best suited for size reductions because image inversion takes place before light rays diverge.

Figure 33:
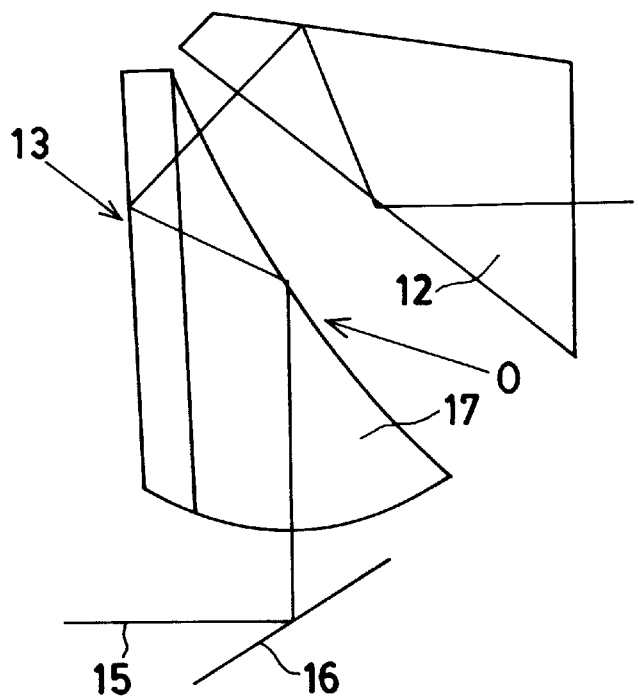
FIG. 33 is a sectional schematic of Example 51 according to the second aspect of the invention.

Example 51 (FIG. 33), and Example 52 (not illustrated for similarity to FIG. 33) is directed to an image inversion optical subsystem consisting of a mirror 16 and two deflecting prisms 12 and 17. In this case, image direction-converting elements are mirror 16 and deflecting prism 17 including a roof surface 13. A difference between these examples resides in the deflecting prism 17 using a roof surface 13. The image inversion optical subsystem of Example 51 consists of a mirror 16 for guiding an inverted image of an object formed by an objective, an image direction-converting element or deflecting prism 17 including roof surface 13 and a deflecting prism 12 having no power. The deflecting prism 17 including roof surface 13 consists of a first transmitting surface, a first reflecting surface, a second reflecting surface defined by roof surface 13 and a second transmitting surface, with the first reflecting surface and second transmitting surface defined by a common surface. The deflecting prism 12 having no power consists of a first transmitting surface, a first reflecting surface, a second reflecting surface and a second transmitting surface, with the second reflecting surface and first transmitting surface defined by a common surface. A rotationally asymmetric surface 0 is used at the first reflecting surface of deflecting prism 17 including roof surface 13. The deflecting prism acts to change the angles of incident light rays and emerging light rays. If two deflecting prisms are used as in this example, however, it is possible to bring the direction of line of sight in relative alignment with the subject direction. According to the arrangement of this example, rotationally asymmetric decentration aberrations are well corrected by the rotationally asymmetric surface 0. In Example 52, the image direction-converting element located on an observer side is a deflecting prism 17 including roof surface 13 with a first reflecting surface defined by roof surface 13. Rotationally asymmetric surfaces 0 are used at the first transmitting surface and second reflecting surface of a deflecting prism located on an image side, which are defined by a common surface. The advantages (action and effect) of this example are the same as in Example 51.

Figure 34:
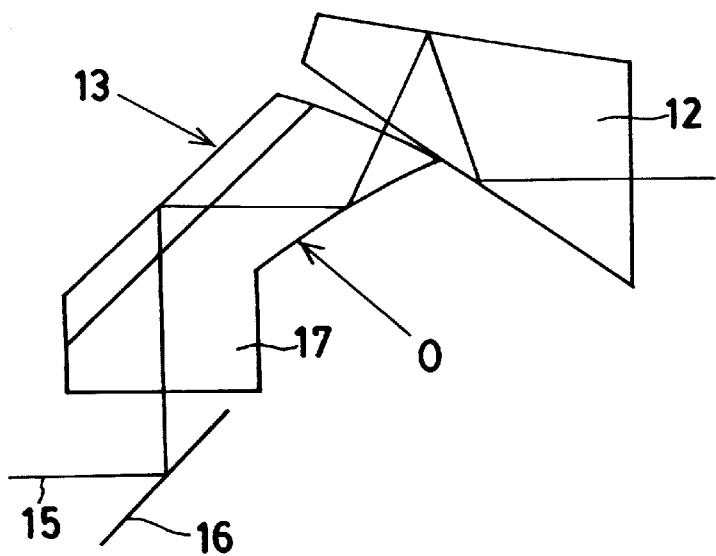
FIG. 34 is a sectional schematic of Example 53 according to the second aspect of the invention.

Example 53 (FIG. 34), and Example 54 (not illustrated for similarity to FIG. 34) is directed to an image inversion optical subsystem which, as in Examples 51 and 52, consists of a mirror 16 and two deflecting prisms 12 and 17. In this case, image direction-converting elements are mirror 16 and deflecting prism 17 including a roof surface 13. A difference with Examples 51 and 52 is that all surfaces of one deflecting prism are independent. This increases the degree of freedom, and so it is possible to make much better correction for rotationally asymmetric decentration aberrations. A difference between Examples 53 and 54 again resides in the deflecting prism 17 using roof surface 13. The image inversion optical subsystem of Example 53 consists of a mirror 16 for guiding an inverted image of an object formed by an objective, an image direction-converting element or deflecting mirror 17 including roof surface 13 and a deflecting prism 12 having no power. The deflecting prism 17 including roof surface 13 consists of a first transmitting surface, a first reflecting surface defined by roof surface 13, a second reflecting surface and a second transmitting surface, with a rotationally asymmetric surface 0 used at the second reflecting surface. The deflecting prism 12 having no power consists of a first transmitting surface, a first reflecting surface, a second reflecting surface and a second transmitting surface, with the second reflecting surface and first transmitting surface defined by a common surface. The advantages (action and effect) of this example are the same as in Example 51. In Example 54, the image direction-converting element located on an observer side is a deflecting prism 17 including a roof surface 13, which is used at a first reflecting surface thereof. Rotationally asymmetric surfaces 0 are used at the first transmitting surface and second reflecting surface of the deflecting surface 17 on the observer side, which are defined by a common surface. The advantages (action and effect) of this example are the same as in Example 51.

Figure 35:
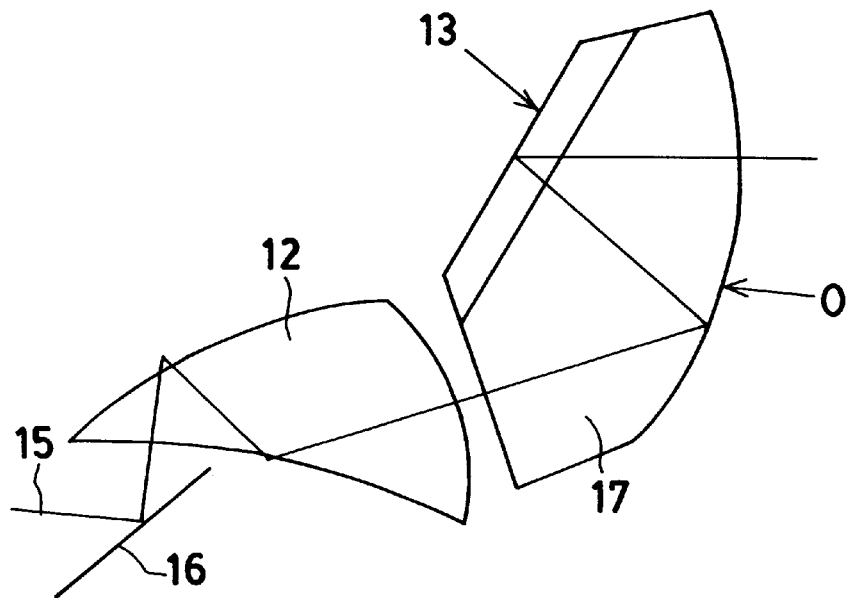
FIG. 35 is sectional schematics of Example 55 according to the second aspect of the invention.

Example 55 (FIG. 35), and Example 56 (not illustrated for similarity to FIG. 35) is directed to an image inversion optical subsystem which, as in Examples 51 and 52, consists of a mirror 16 and two deflecting prisms 12 and 17. In this case, image direction-converting elements are mirror 16 and deflecting prism 17 including a roof surface 13. A difference with Examples 51 and 52 resides in the direction of the deflecting prisms, and a difference between Examples 55 and 56 resides in the deflecting prism 17 including roof surface 13. The image inversion optical subsystem of Example 55 consists of an image direction-converting element or mirror 16 for guiding an inverted image of an object formed by an objective, an image direction-converting element or deflecting prism 17 including roof surface 13 and a deflecting prism 12 incapable of image inversion. The deflecting prism 17 including roof surface 13 consists of a first transmitting surface, a first reflecting surface, a second reflecting surface defined by roof surface 13 and a second transmitting surface, with the first reflecting surface and second transmitting surface defined by a common surface, at which a rotationally asymmetric surface 0 is used. The deflecting prism 12 incapable of image inversion consists of a first transmitting surface, a first reflecting surface, a second reflecting surface and a second transmitting surface, with the second reflecting surface and first transmitting surface defined by a common surface. The advantages (action and effect) of this example are the same as in Example 51. In Example 56, a deflecting prism 17 on an object side is an image direction-converting element including a roof surface 13 used at a first reflecting surface thereof. Rotationally asymmetric surfaces 0 are used at the first transmitting surface and second reflecting surfaces of the deflecting prism on the object side, which are defined by a common surface. The advantages (action and effect) of this example are again the same as in Example 51.

Figure 36:
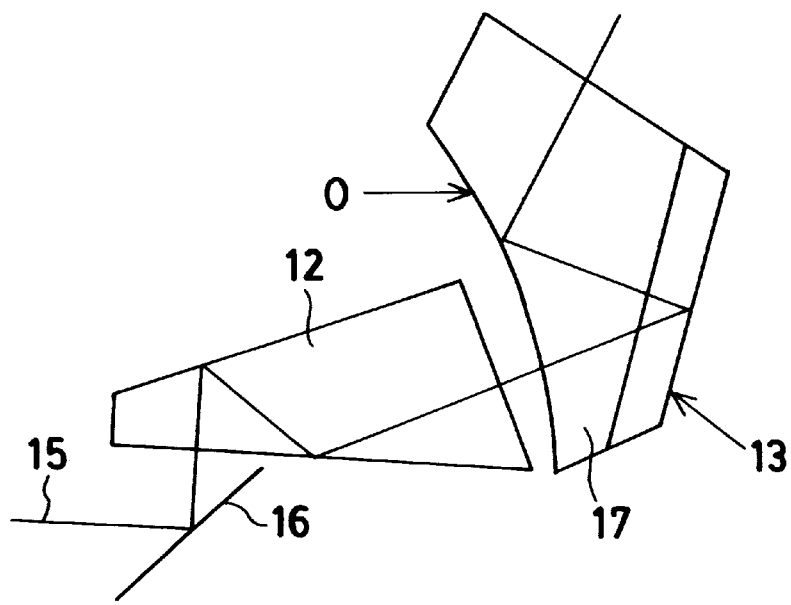
FIG. 36 is a sectional schematic of Example 57 according to the second aspect of the invention.

Example 57 (FIG. 36), and Example 58 (not illustrated for similarity to FIG. 36) is directed to an image inversion optical subsystem which, as in Examples 51 and 52, consists of a mirror 16 and two deflecting prisms 12 and 17. In this case, image direction-converting elements are mirror 16 and deflecting prism 17 including a roof surface 13. A difference with Examples 51 and 52 resides in the direction of the deflecting prisms, and a difference between Examples 55 and 56 resides in the deflecting prism 17 including roof surface 13. The image inversion optical subsystem of Example 57 consists of an image direction-converting element or mirror 16 for guiding an inverted image of an object formed by an objective, an image direction-converting element or deflecting prism 17 including roof surface 13 and a deflecting prism 12 incapable of image inversion. The deflecting prism 17 located on an observer side and including roof surface 13 consists of a first transmitting surface, a first reflecting surface defined by roof surface 13, a second reflecting surface and a second transmitting surface, with the second reflecting surface and first transmitting surface defined by a common surface, at which a rotationally asymmetric surface 0 is used. The deflecting prism 12 incapable of image inversion consists of a first transmitting surface, a first reflecting surface, a second reflecting surface and a second transmitting surface, with the second reflecting surface and first transmitting surface defined by a common surface. The advantages (action and effect) of this example are the same as in Example 51. In Example 58, a deflecting prism 17 on an object side is an image direction-converting element including a roof surface 13 used at a first reflecting surface thereof. Rotationally asymmetric surfaces 0 are used at the first transmitting surface and second reflecting surfaces of the deflecting prism 17 on the object side, which are defined by a common surface. The advantages (action and effect) of this example are again the same as in Example 51.

Figure 37:
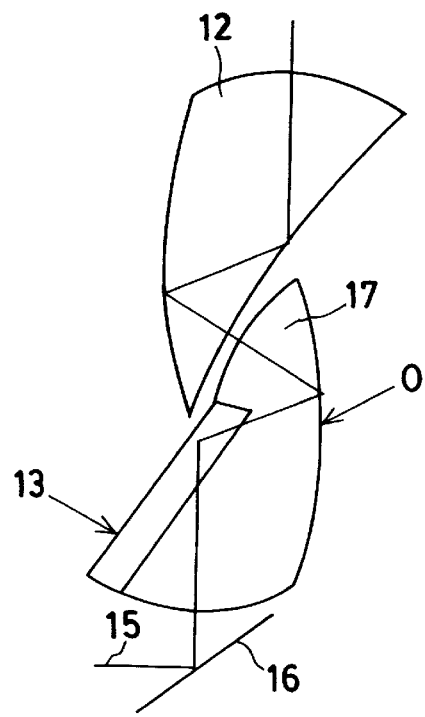
FIG. 37 is a sectional schematic of Example 60 according to the second aspect of the invention.

Example 59 (the same as in FIG. 15), and Example 60 (FIG. 37) is directed to an image inversion optical subsystem which, as in Examples 51 and 52, consists of a mirror 16 and two deflecting prisms 12 and 17. In this case, image direction-converting elements are mirror 16 and deflecting prism 17 including a roof surface 13. Differences with Examples 51 and 52 reside in the direction of the deflecting prisms and the exit angle of a light ray 15. The arrangement of each example is suitable for a waist-level finder where the subject is observed from above with a sight held at waist level. A difference between Examples 59 and 60 resides in the deflecting prism 17 using roof surface 13. The image inversion optical subsystem of Example 59 consists of a mirror 16 for guiding an inverted image of an object formed by an objective, an image direction-converting element or deflecting prism 17 including roof surface 13 and a deflecting prism 12 incapable of image inversion. The deflecting prism 17 located on an observer side and including roof surface 13 consists of a first transmitting surface, a first reflecting surface defined by roof surface 13, a second reflecting surface and a second transmitting surface, with the second reflecting surface and first transmitting surface defined by a common surface, at which a rotationally asymmetric surface 0 is used. The deflecting prism 12 incapable of image inversion consists of a first transmitting surface, a first reflecting surface, a second reflecting surface and a second transmitting surface, with the first reflecting surface and second transmitting surface defined by a common surface. The advantages (action and effect) of this example are the same as in Example 51. In Example 60, a deflecting prism 17 on an object side is an image direction-converting element including a roof surface 13 used at a first reflecting surface thereof. All surfaces of this prism are independent. A rotationally asymmetric surface 0 is used at the second reflecting surface of the deflecting prism 17 on the object side. The advantages (action and effect) of this example are again the same as in Example 51.

Figure 38:
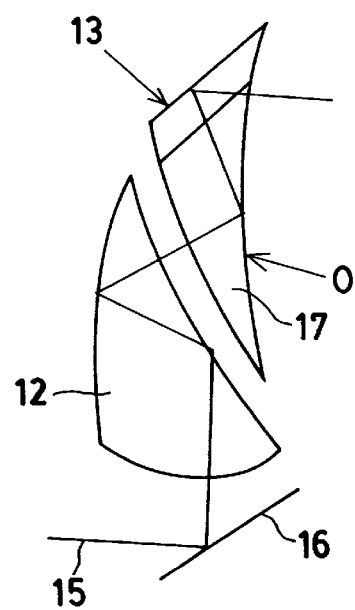
FIG. 38 is a sectional schematic of Example 61 according to the second aspect of the invention.

Example 61 (FIG. 38), and Example 62 (not illustrated for similarity to FIG. 38) is directed to an image inversion optical subsystem which, as in Examples 51 and 52, consists of a mirror 16 and two deflecting prisms 12 and 17. In this case, image direction-converting elements are mirror 16 and deflecting prism 17 including a roof surface 13. A difference with Examples 51 and 52 resides in the direction of the deflecting prisms, and a difference between Examples 61 and 62 resides in the deflecting prism 17 including roof surface 13. The image inversion optical subsystem of Example 61 consists of an image direction-converting element or mirror 16 for guiding an inverted image of an object formed by an objective, an image direction-converting element or deflecting prism 17 including roof surface 13 and a deflecting prism 12 incapable of image inversion. The deflecting prism 17 located on an observer side and including roof surface 13 consists of a first transmitting surface, a first reflecting surface, a second reflecting surface defined by roof surface 13 and a second transmitting surface, with the first reflecting surface and second transmitting surface defined by a common surface, at which a rotationally asymmetric surface 0 is used. The deflecting prism 12 incapable of image inversion consists of a first transmitting surface, a first reflecting surface, a second reflecting surface and a second transmitting surface, with the first reflecting surface and second transmitting surface defined by a common surface. The advantages (action and effect) of this example are the same as in Example 51. In Example 62, a deflecting prism 17 on an object side is an image direction-converting element including a roof surface 13 used at a second reflecting surface thereof. Rotationally asymmetric surfaces 0 are used at the second transmitting surface and first reflecting surfaces of the deflecting prism 17 on the object side, which are defined by a common surface. The advantages (action and effect) of this example are again the same as in Example 51.

Figure 39:
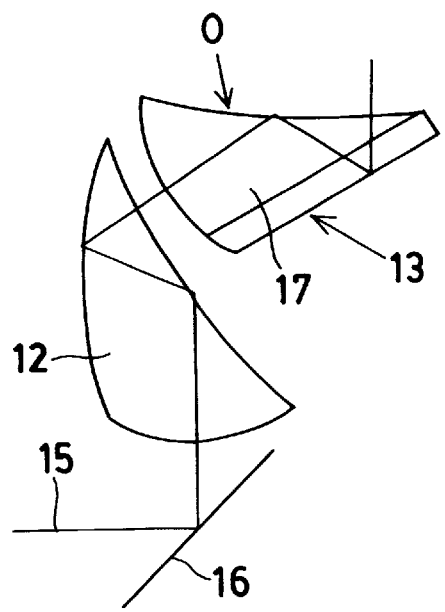
FIG. 39 is a sectional schematic of Example 63 according to the second aspect of the invention.

Example 63 (FIG. 39), and Example 64 (not illustrated for similarity to FIG. 39) is directed to an image inversion optical subsystem which, as in Examples 51 and 52, consists of a mirror 16 and two deflecting prisms 12 and 17. In this case, image direction-converting elements are mirror 16 and deflecting prism 17 including a roof surface 13. Differences with Examples 51 and 52 reside in the direction of the deflecting prisms and the exit angle of a light ray 15. The arrangement of each example is suitable for a waist-level finder where the subject is observed from above with a sight held at waist level. A difference between Examples 63 and 64 resides in the deflecting prism 17 using roof surface 13. The image inversion optical subsystem of Example 63 consists of an image direction-converting element or mirror 16 for guiding an inverted image of an object formed by an objective, an image direction-converting element or deflecting prism 17 including roof surface 13 and a deflecting prism 12 incapable of image inversion. The deflecting prism 17 located on an observer side and including roof surface 13 consists of a first transmitting surface, a first reflecting surface, a second reflecting surface defined by roof surface 13 and a second transmitting surface, with the reflecting surface and second transmitting surface defined by a common surface, at which a rotationally asymmetric surface 0 is used. The deflecting prism 12 incapable of image inversion consists of a first transmitting surface, a first reflecting surface, a second reflecting surface and a second transmitting surface, with the first reflecting surface and second transmitting surface defined by a common surface. The advantages (action and effect) of this example are the same as in Example 51. In Example 64, a deflecting prism 17 on an object side is an image direction-converting element including a roof surface 13 used at a second reflecting surface thereof. Rotationally asymmetric surfaces 0 are used at the first reflecting surface and second transmitting surface of the deflecting prism 17 on the object side. The advantages (action and effect) of this example are again the same as in Example 51.

Figure 40:
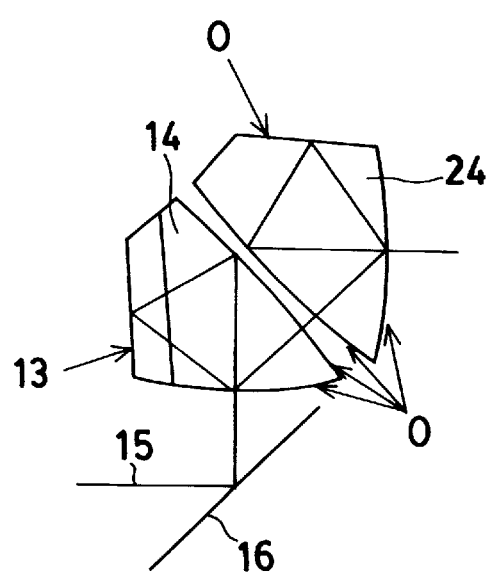
FIG. 40 is a sectional schematic of Example 65 according to the second aspect of the invention.

Example 65 (FIG. 40), and Example 66 (not illustrated for similarity to FIG. 40) is directed to an image inversion optical subsystem consisting of a mirror 16 and two Pechan prisms 14 and 24, all being image direction-converting elements. A difference between Examples 65 and 66 is whether or not the Pechan prism includes a roof surface 13. The image inversion optical subsystem of Example 65 consists of an image direction-converting element or mirror 16 for guiding an inverted image of an object formed by an objective, an image direction-converting element or Pechan prism 14 including a roof surface 13 and an image direction-converting element or Pechan prism 24. The Pechan prism 14 located on an object side and including roof surface 13 consists of a first transmitting surface, a first reflecting surface, a second reflecting surface defined by roof surface 13, a third reflecting surface and a second transmitting surface, with the third reflecting surface and first transmitting surface defined by a common surface and the first reflecting surface and second transmitting surface defined by a common surface. Used at these common surfaces are rotationally asymmetric surfaces 0. The Pechan prism located on an observer side and free of roof surface 13 consists of a first transmitting surface, a first reflecting surface, a second reflecting surface, a third reflecting surface and a second transmitting surface, with the first reflecting surface and second transmitting surface defined by a common surface and the third reflecting surface and first transmitting surface defined by a common surface. Used at all these surfaces are rotationally asymmetric surfaces 0. According to this example wherein a long optical path can be turned back by use of Pechan prisms providing three reflections, it is possible to reduce the size of the finder optical system itself. In addition, rotationally asymmetric aberrations can be well corrected by many rotationally asymmetric surfaces. Example 66 differing from Example 65 in the layout of Pechan prisms has the same advantages (action and effect) as in Example 65.

Figure 41:
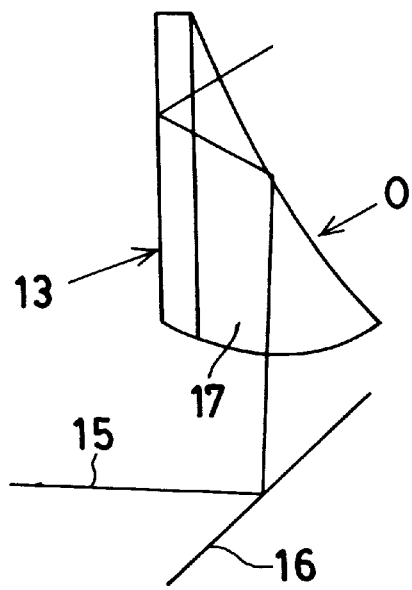
FIG. 41 is a sectional schematic of Example 67 according to the second aspect of the invention.

Example 67 (FIG. 41), and Example 69 (not illustrated for similarity to FIG. 41) is directed to an image inversion optical system consisting only of a mirror 16 and a deflecting prism 17, all being image direction-converting elements. A difference between Examples 67 and 68 resides in the direction of the deflecting prism. The image inversion optical system of Example 67 consists of an image direction-converting element or mirror 16 for guiding an inverted image of an object formed by an objective and an image direction-converting element or deflecting prism 17 including a roof surface 13. The deflecting prism 17 including roof surface 13 consists of a first transmitting surface, a first reflecting surface, a second reflecting surface defined by roof surface 13 and a second transmitting surface, with the first reflecting surface and second transmitting surface defined by a common surface, at which a rotationally asymmetric surface 0 is used. This example achieves good performance although its arrangement is relatively simple. In Example 68, all surfaces of the deflecting surface are independent, with a first reflecting surface defined by a roof surface 13. This enables the degree of freedom in making correction of rotationally symmetric aberrations to be increased with the achievement of ever-higher performance.

Figure 42:
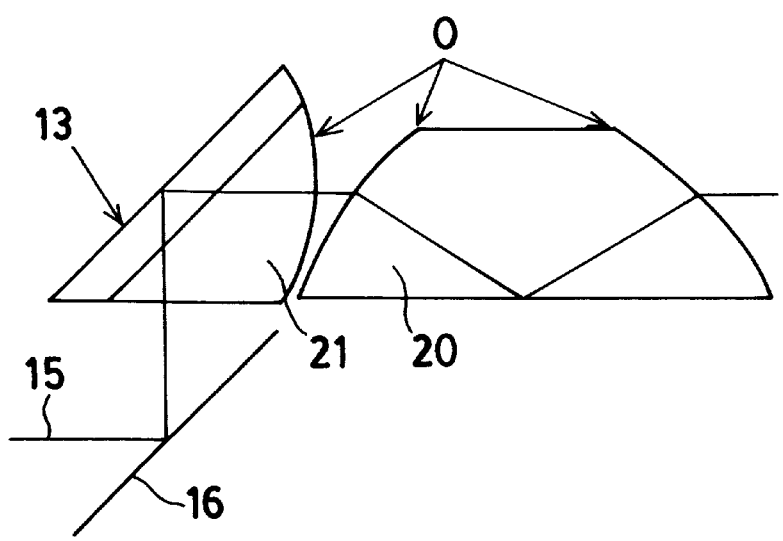
FIG. 42 is a sectional schematic of Example 69 according to the second aspect of the invention.

Example 69 (FIG. 42), and Example 70 (not illustrated for similarity to FIG. 42) is directed to an image inversion optical system consisting of a mirror 16, a single reflection type prism 21 and a wedge prism 20, all being image direction-converting elements. A difference between Examples 69 and 70 is where a roof surface 13 is located. The image inversion optical subsystem of Example 69 consists of an image direction-converting element or mirror 16 for guiding an inverted image of an object formed by an objective to the finder optical system, an image direction-converting element or a single reflection type of prism 21 including a roof surface 13 and an image direction-converting element or wedge prism 20. The single reflection type prism 21 including roof surface 13 consists of a first transmitting surface, a first reflecting surface defined by roof surface 13, and a second transmitting surface at which a rotationally asymmetric surface 0 is used. The wedge prism 20 consists of a first transmitting surface, a first reflecting surface and a second transmitting surface, with rotationally asymmetric surfaces 0 used at the first and second transmitting surfaces. The arrangement of this example is suitable for use on an electronic camera or digital camera having electronic parts built in the rear of a phototaking surface, because an optical path of relatively long length is obtained in the rear of the mirror. This arrangement, albeit being of simple construction, achieves good performance. In Example 72, a roof surface is used at a first reflecting surface of a wedge prism 20. The advantages (action and effect) of Example 70 are the same as in Example 71.

Figure 43:
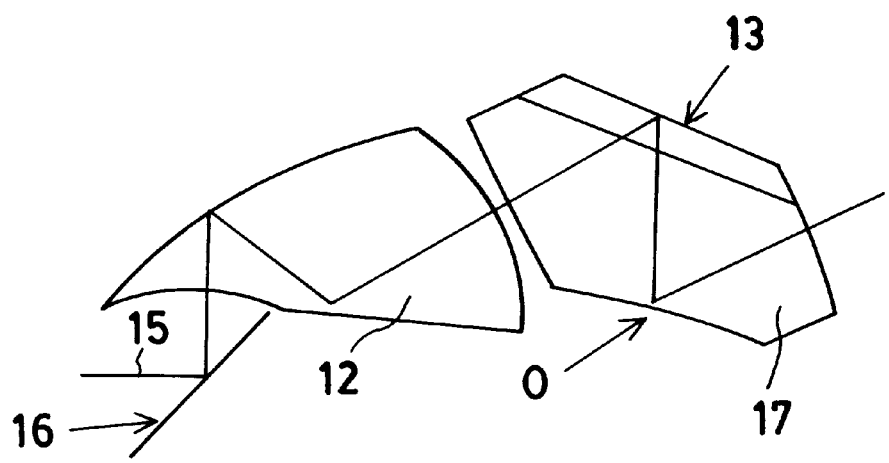
FIG. 43 is a sectional schematic of Example 71 according to the second aspect of the invention.

Example 71 (FIG. 43), and Example 72 (not illustrated for similarity to FIG. 43) is directed to an image inversion optical subsystem which, as in Examples 51 and 52, consists of a mirror 16 and two deflecting prisms 12 and 17. In this case, image direction-converting elements are mirror 16 and deflecting prism 17 including a roof surface 13. A difference with Examples 51 and 52 resides in the direction of the deflecting prisms and a difference between Examples 71 and 72 is where in the deflecting prism the roof surface 13 is located. The image inversion optical system of Example 71 consists of an image direction-converting element or mirror 16 for guiding an inverted image of an object formed by an objective to the finder optical system, a deflecting prism 12 incapable of image inversion and an image direction-converting element or deflecting prism 17 including a roof surface 13. The deflecting mirror 17 located on an observer side and including roof surface 13 consists of a first transmitting surface, a first reflecting surface defined by roof surface 13, a second reflecting surface and a second transmitting surface, all independent, with a rotationally asymmetric surface 0 used at the second reflecting surface. The deflecting prism 12 consists of a first transmitting surface, a first reflecting surface, a second reflecting surface and a second transmitting surface, all independent. The advantages (action and effect) of this example are the same as in Example 51. In Example 72, a deflecting prism located on an image side is an image direction-converting element including a roof surface 13, said roof surface 13 being used at a second reflecting surface of the prism. A rotationally asymmetric surface 0 is used at a first reflecting surface of the deflecting prism on the image side. The advantages (action and effect) of this example are the same as in Example 51.

Examples 73 to 107, given below, are each directed to a single image formation type finder optical system for use on a lens shutter camera. For simplicity, only an image inversion optical subsystem is illustrated. It is noted that when two prisms are used, a primary image plane is located between and in the vicinity of a prism located nearest to the object side and a prism adjacent thereto. In the case of an integrated Porro prism, however, the primary image plane is located in the vicinity of a first transmitting surface. When the prism is divided into two parts, the primary image plane is located between and in the vicinity of the two parts.

Figure 44:
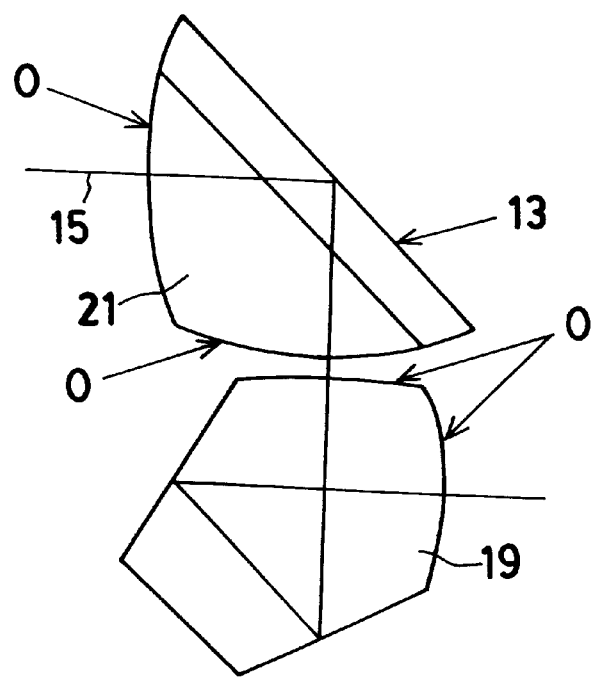
FIG. 44 is sectional schematics of Example 73 according to the second aspect of the invention.
Figure 45:
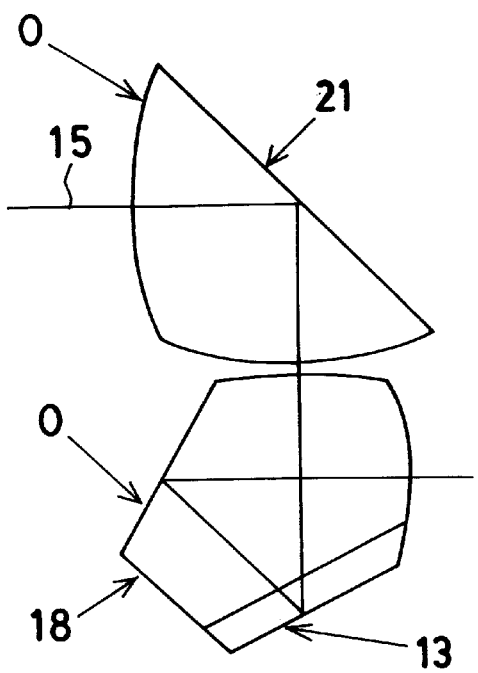
FIG. 45 is a sectional schematic of Example 74 according to the second aspect of the invention.

Example 73 (FIG. 44), Example 74 (FIG. 45), and Example 75 (not illustrated for similarity to FIG. 45) is directed to an image inversion optical subsystem consisting of a single reflection type image direction-converting element 21 and a double reflection type penta prism, each including a roof surface 13. The objective used may be either a single-focus lens or a zoom lens. The image inversion optical subsystem of Example 73 consists of an image direction-converting element or a single reflection type prism 21 located on an object side and including a roof surface 13, and a double reflection type penta prism 19 located on an observer side and incapable of image inversion. The image direction-converting element or the single reflection type prism 21 including roof surface 13 consists of a first transmitting surface, a first reflecting surface defined by roof surface 13 and a second transmitting surface, with rotationally asymmetric surfaces 0 used at the first and second transmitting surfaces. The double reflection type penta prism 19 consists of a first transmitting surface, a first reflecting surface, a second reflecting surface and a second transmitting surface, all independent. In Example 74 a roof surface 13 is used at a first reflecting surface of a penta prism 18, and in Example 75 a roof surface is used at a second reflecting surface of a penta prism 18. In any case, rotationally asymmetric decentration aberrations are well corrected by rotationally asymmetric surfaces 0. In addition, the subject is reasonably observed because the direction of light of sight is substantially parallel with the subject.

Figure 46:
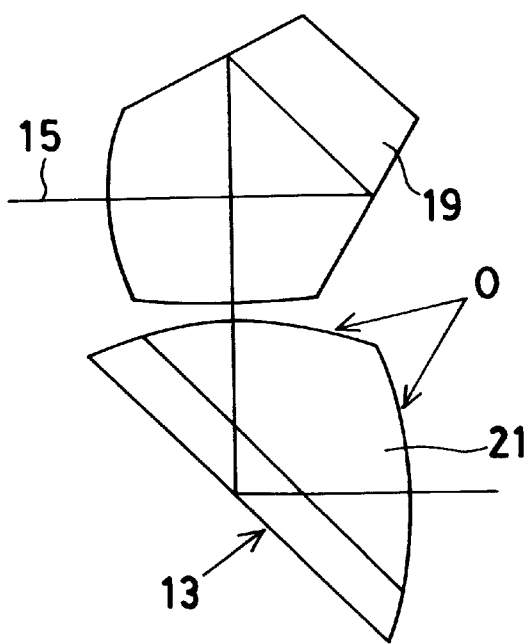
FIG. 46 is a sectional schematic of Example 76 according to the second aspect of the invention.

Example 76 (FIG. 46), Example 77 (not illustrated for similarity to FIG. 46), and Example 78 (not illustrated for similarity to FIG. 46) is directed to an image inversion optical subsystem consisting of a double reflection type penta prism and a single reflection type image direction-converting element 21, each including a roof surface 13. The objective may be either a single-focus lens or a zoom lens. In these examples the order of the prisms in Examples 73, 74 and 75 is reversed; that is, the advantages (action and effect) of these examples are the same as in Examples 73, 74 and 75. However, it is noted that since the penta prism making sure of a long optical path is located on the object side so that the focal length of the objective can be long, it is possible to achieve size reductions simultaneously with an increase in the finder magnification.

Figure 47:
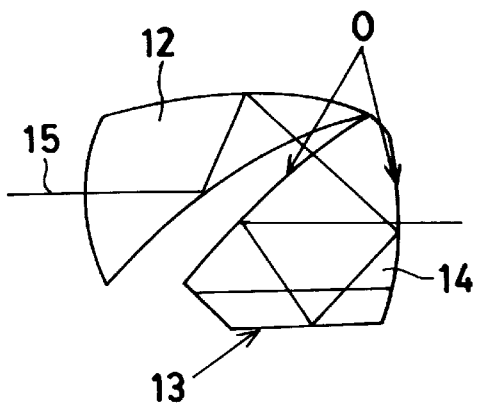
FIG. 47 is a sectional schematic of Example 79 according to the second aspect of the invention.
Figure 48:
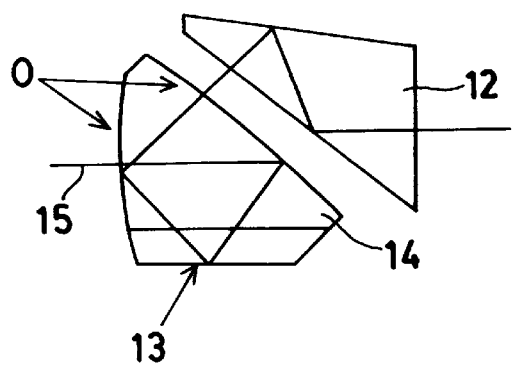
FIG. 48 is a sectional schematic of Example 81 according to the second aspect of the invention.
Figure 49:
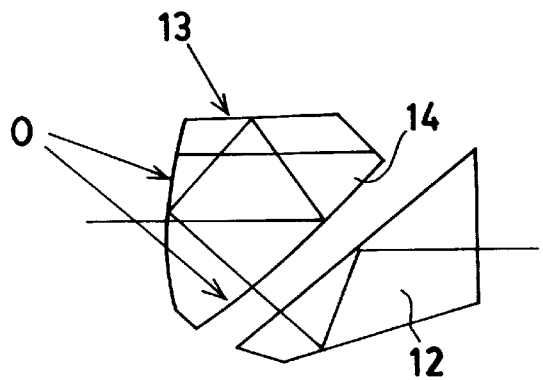
FIG. 49 is a sectional schematic of Example 83 according to the second aspect of the invention.
Figure 50:
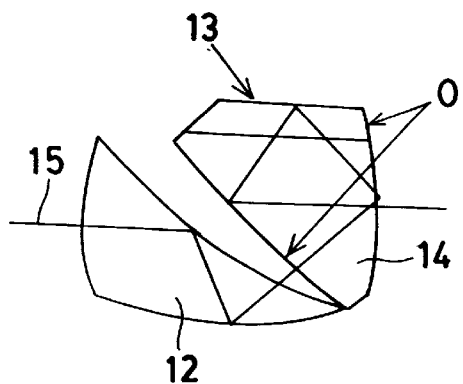
FIG. 50 is a sectional schematic of Example 85 according to the second aspect of the invention.
Figure 51:
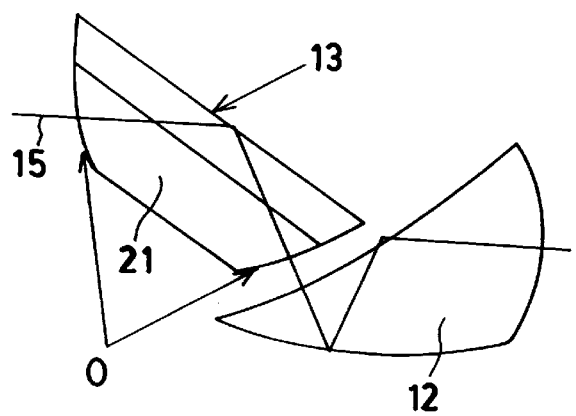
FIG. 51 is a sectional schematic of Example 87 according to the second aspect of the invention.
Figure 52:
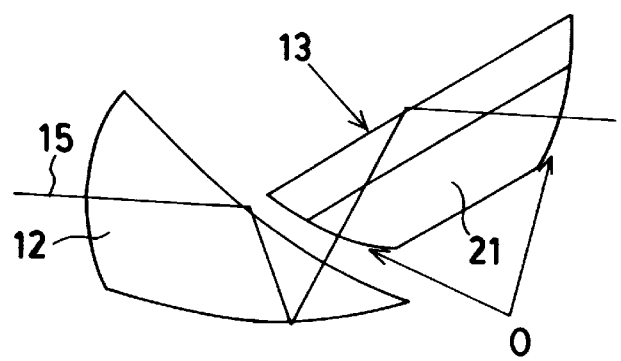
FIG. 52 is a sectional schematic of Example 88 according to the second aspect of the invention.
Figure 53:
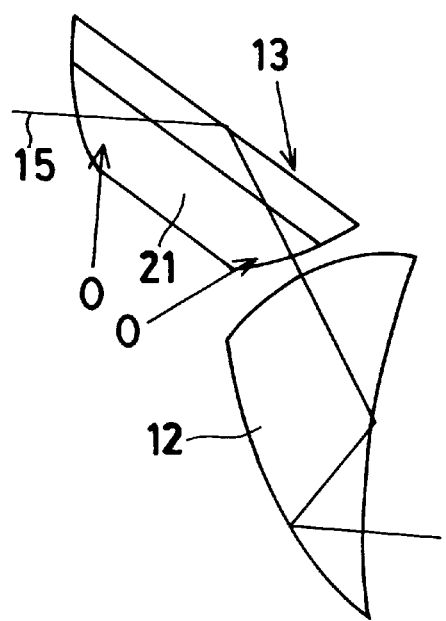
FIG. 53 is a sectional schematic of Example 91 according to the second aspect of the invention.
Figure 54:
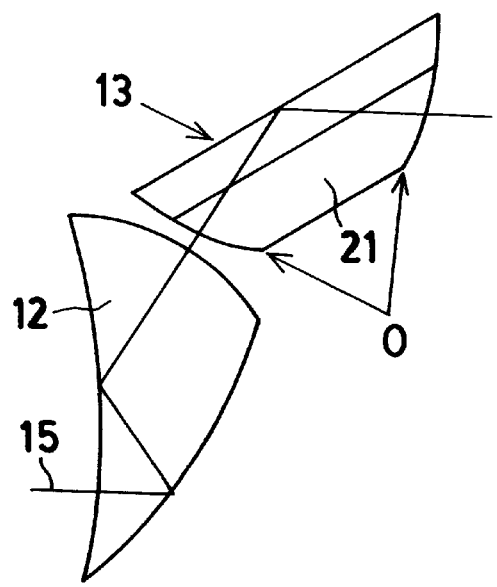
FIG. 54 is a sectional schematic of Example 92 according to the second aspect of the invention.

Example 79 (FIG. 47), Example 80 (not illustrated for similarity to FIG. 47), Example 81 (FIG. 48), Example 82 (not illustrated for similarity to FIG. 48), Example 83 (FIG. 49), Example 84 (not illustrated for similarity to FIG. 49), Example 85 (FIG. 50), and Example 86 (not illustrated for similarity to FIG. 50) is directed to a combination of a Pechan prism with a deflecting prism, one of which includes a roof surface 13. The advantages (action and effect) of each example are the same as in Examples 44 and 45. Example 87 (FIG. 51), Example 88 (FIG. 52), Example 89 (not illustrated for similarity to FIG. 52), Example 90 (not illustrated for similarity to FIG. 51), Example 91 (FIG. 53), Example 92 (FIG. 54), Example 93 (not illustrated for similarity to FIG. 53), and Example 94 (not illustrated for similarity to FIG. 54) is directed to an image inversion optical subsystem consisting of an image direction-inverting element or a single reflection type prism 21 and a deflecting prism, one of which includes a roof surface 13. The objective used may be either a single-focus lens or a zoom lens. In these examples, the layout of the prism and the location of the roof surface are varied. In any case, rotationally asymmetric decentration aberrations are well corrected by use of a rotationally asymmetric surface 0. In addition, since the total number of reflecting surfaces is reduced, light loss can be prevented. In these examples, a wedge prism may be used in place of the single reflection type prism. The angle of light reflected at this single reflection type of prism must be obtuse with respect to the angle of light incident thereon. Otherwise, it is impossible to form an erected image even when such a prism is used in combination with a deflecting prism.

Figure 55:
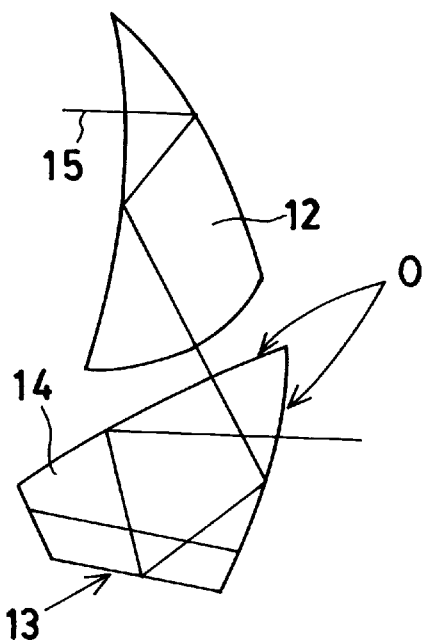
FIG. 55 is a sectional schematic of Example 95 according to the second aspect of the invention.
Figure 56:
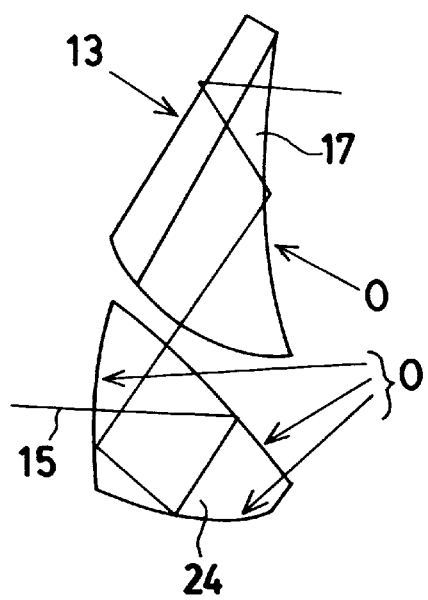
FIG. 56 is a sectional schematic of Example 97 according to the second aspect of the invention.

Example 95 (FIG. 55), Example 96 (not illustrated for similarity to FIG. 55), Example 97 (FIG. 56), and Example 98 (not illustrated for similarity to FIG. 56) is directed to an image inversion optical subsystem consisting of an image direction-inverting element or a Pechan prism and a deflecting prism, one of which includes a roof surface 13. The objective used may be either a single-focus lens or a zoom lens. In these examples, the layout of the prism and the location of the roof surface are varied. In any case, rotationally asymmetric decentration aberrations can be well corrected by use of a rotationally asymmetric surface 0. Especially when the Pechan prism is located on an objective side, an optical path of some considerable length can be so ensured that size reductions can be achieved simultaneously with an increase in the finder magnification.

Figure 57:
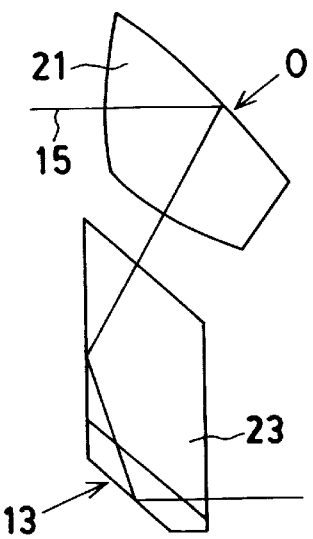
FIG. 57 is a sectional schematic of Example 100 according to the second aspect of the invention.

Example 99 (not illustrated for similarity to FIG. 56), Example 100 (FIG. 57), and Example 101 (not illustrated for similarity to FIG. 57) is directed to an image inversion optical subsystem consisting of an image direction-inverting element or a single reflection type prism 21 and a double reflection type prism 23 in which an axial chief ray does not cross over itself. The objective used may be either a single-focus lens or a zoom lens. In these examples, the layout of the prism and the location of the roof surface are varied. In any case, rotationally asymmetric decentration aberrations can be well corrected by use of a rotationally asymmetric surface 0. In addition, these examples are favorable because light loss can be avoided due to a reduction in the total number of reflecting surfaces.

Figure 58:
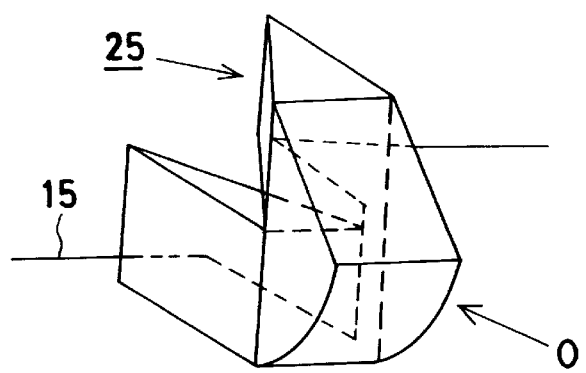
FIG. 58 is sectional schematics of Example 102 according to the second aspect of the invention.
Figure 59:
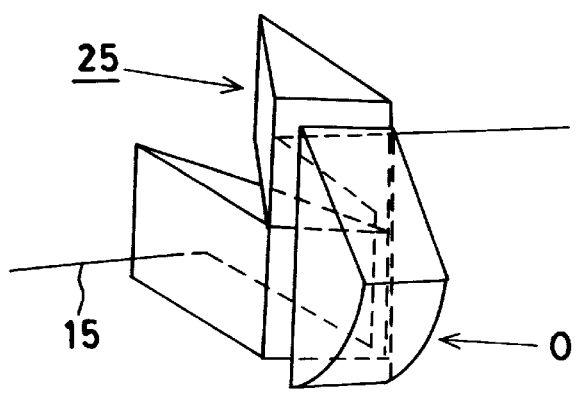
FIG. 59 is a sectional schematic of Example 103 according to the second aspect of the invention.

In Example 102 (FIG. 58), and Example 103 (FIG. 59), a rotationally asymmetric surface 0 is applied to a Porro prism 25. In Example 102 the Porro prism 25 is formed as one singe part, and in Example 103 the Porro prism 25 is formed of two parts. In either example, it is possible to bring incident light rays in substantial alignment with emerging light rays. In both examples, light rays are reflected horizontally at a first reflecting surface, vertically at a second reflecting surface, horizontally at a third reflecting surface, and horizontally at a fourth reflecting surface, thereby forming an erected image. In either example, the rotationally asymmetric surface 0 is used at the second reflecting surface, so that rotationally asymmetric decentration aberrations can be well corrected.

Figure 60:
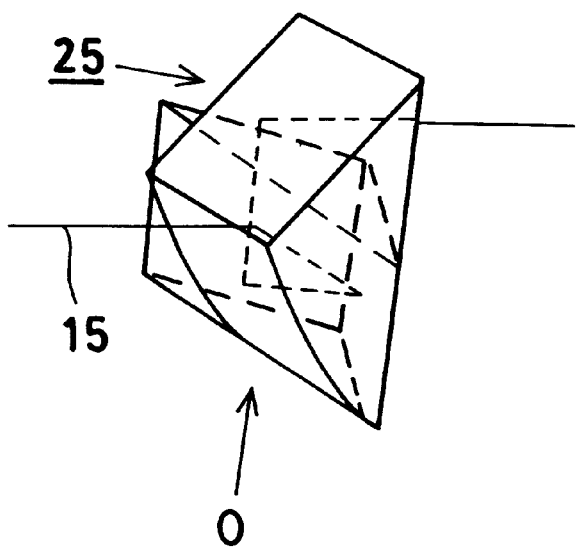
FIG. 60 is a sectional schematic of Example 104 according to the second aspect of the invention.
Figure 61:
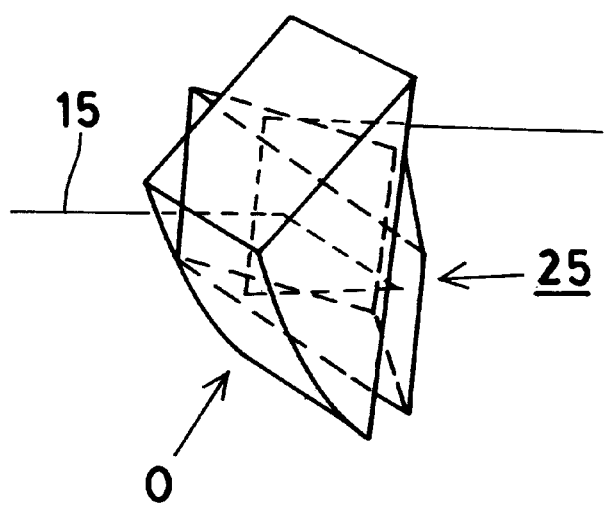
FIG. 61 is a sectional schematic of Example 105 according to the second aspect of the invention.

In Example 104 (FIG. 60), and Example 105 (FIG. 61), too, a rotationally asymmetric surface 0 is applied to a Porro prism 25. In Example 104 the Porro prism 25 is formed as one singe part, and in Example 105 the Porro prism 25 is formed of two parts. In both examples, light rays are reflected horizontally at a first reflecting surface, at a second reflecting surface in a direction vertical to the drawing sheet, vertically at a third reflecting surface, and at a fourth reflecting surface in a direction vertical to the drawing sheet, thereby forming an erected image. According to the arrangement of each example, the size of the Porro prism itself can be reduced. In addition, rotationally asymmetric decentration aberrations can be well corrected.

Figure 62:
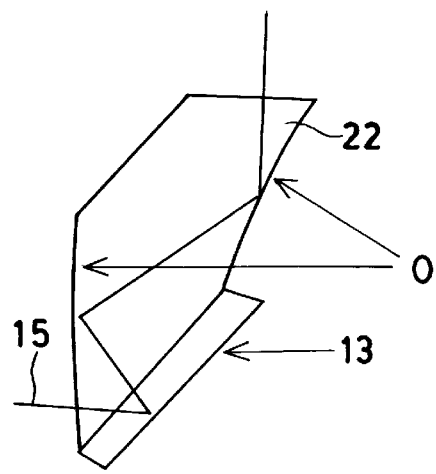
FIG. 62 is a sectional schematic of Example 106 according to the second aspect of the invention.
Figure 63:
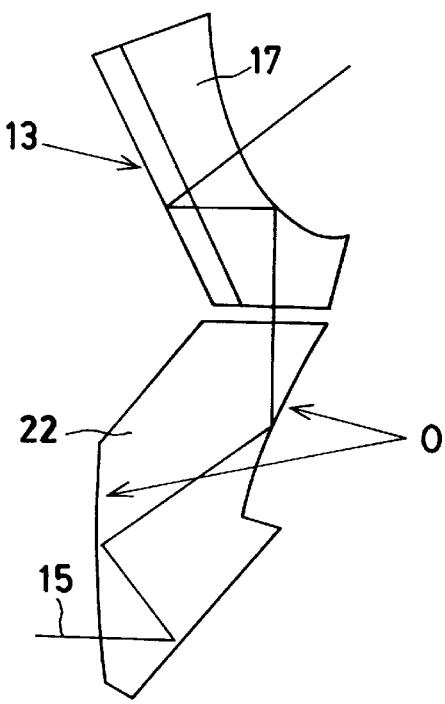
FIG. 63 is a sectional schematic of Example 107 according to the second aspect of the invention.

Example 106 (FIG. 62), and Example 107 (FIG. 63) is directed to an image inversion optical subsystem comprising an image direction-inverting element or a triple reflection type prism 22 wherein an axial chief ray does not cross over itself. In Example 106 a roof surface 13 is used for the prism to enable an erected image to be inverted by that prism alone. In either example, the first transmitting surface and second reflecting surface of the triple reflection type prism are defined by a common surface at which a rotationally asymmetric surface 0 is used, whereby rotationally asymmetric decentration aberrations can be well corrected. In either example, the more the rotationally asymmetric surfaces, the more increased the degree of freedom in making correction for rotationally asymmetric decentration aberrations is and, hence, the higher the performance can be. If a mirror is used in place of the prism, weight reductions can then be achieved.

Set out below are numerical examples of the invention.

Figure 64:
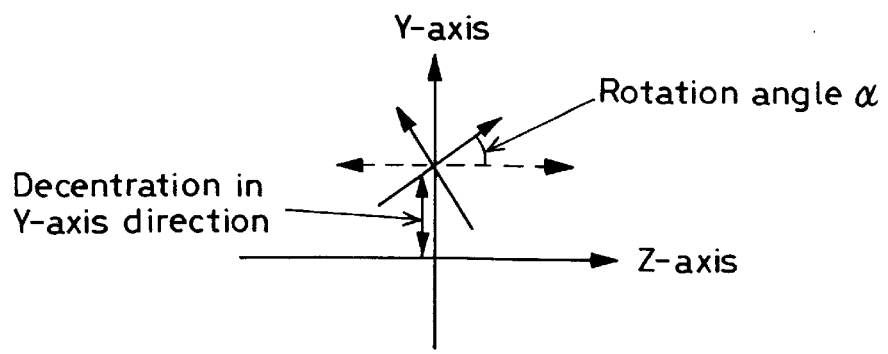
FIG. 64 is a diagram used for explaining the coordinates in the numerical examples of the invention.

In Numerical Examples 1 to 6, surface Nos. follow back-tracing from a pupil side. For coaxial parts, a certain surface is represented by its radius of curvature, an axial separation between that surface and adjacent surface, and a refractive index and Abbe's number of the medium subsequent to that surface, as ordinarily used in the art. Letters x, y and z are the amounts of decentration in the X-, Y- and Z-axis directions, respectively, and α, β and γ are the amounts (degrees) of rotation from surface apexes around the X-, Y-and Z-axes, respectively. An example of decentration is explained with reference to FIG. 64. The value of y is the amount of shift in the Y-direction, and the angle α of rotation is the amount of rotation around the X-axis in the Y-Z surface. The shape of a rotationally asymmetric surface is determined by the aforesaid defining polynomial (a) with the Z-axis defining an axis of the rotationally asymmetric surface.

It is noted that the term with respect to an aspheric surface on which no data is given is zero. For refractive indices, d-line (587.56 nm) refractive indices are given. Length is given in mm.

Figure 65:
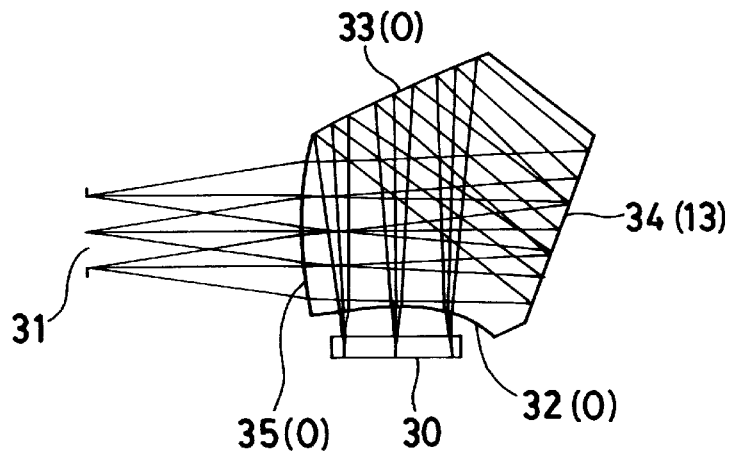
FIG. 65 is a schematic showing Numerical Example 1 of the invention.
Figure 66:
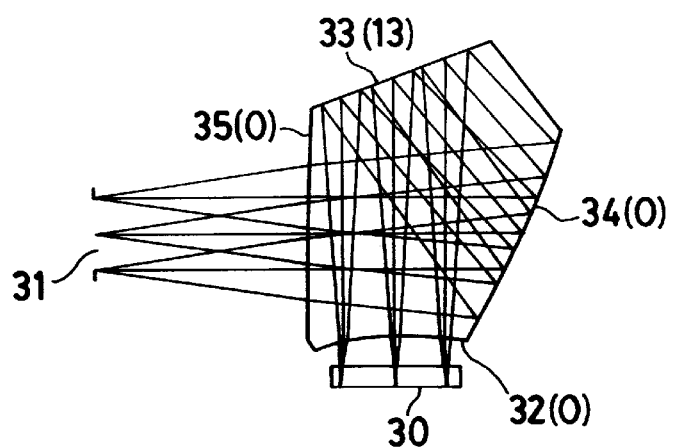
FIG. 66 is a schematic showing Numerical Example 2 of the invention.

Both Numerical Examples 1 (FIG. 65) and 2 (FIG. 66) correspond to the second aspect of the invention, with each image direction-converting element consisting of a pentagonal prism. A primary image plane 30 for an object to a pupil plane 31 are described. Numerical Example 1 consists of, in order from the primary image plane 30, a first transmitting surface 32 concave toward the primary image plane 3, a first reflecting surface 33 having a concave shape and a convex power, a second reflecting surface 34 including a roof surface 13 and a second transmitting surface 35 convex toward a pupil side, with rotationally asymmetric surfaces 0 used at all the surfaces but the second reflecting surface. In this example, the action of an eyepiece is incorporated in the prism by giving powers to all the surfaces but the roof surface. This example satisfies the conditions defined herein.

Numerical Example 2 is much the same in construction as Numerical Example 3 with the exception that the roof surface 13 is used at the first reflecting surface 33. This example consists of a first transmitting surface 32 concave toward a primary image plane 30, a first reflecting surface 33 defined by the roof surface, a second reflecting surface 34 having a concave shape and a convex power and a second transmitting surface 35 convex toward a pupil side, with rotationally asymmetric surfaces 0 used at all the surfaces but the first reflecting surface. In this example, too, the action of an eyepiece is incorporated in the prism by giving powers to all the surfaces but the roof surface. This example satisfies the conditions defined herein. Size reductions are achievable in the height direction in Numerical Example 1, and in the thickness direction in Numerical Example 2.

Figure 67:
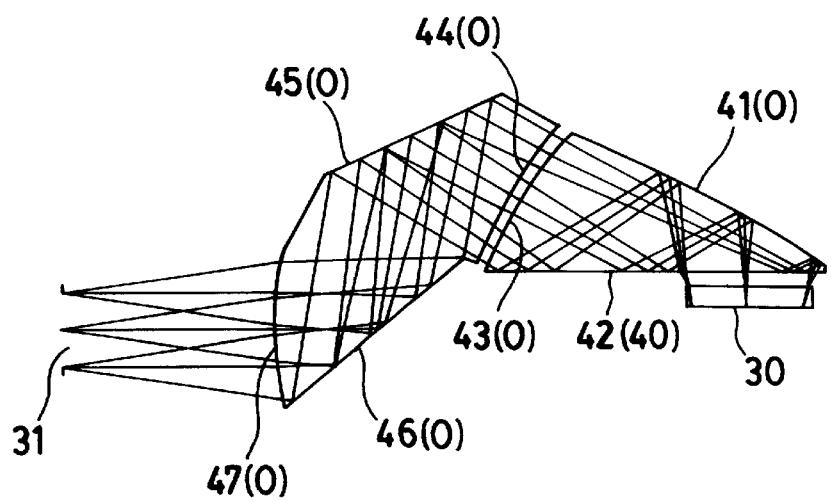
FIG. 67 is a schematic showing Numerical Example 3 of the invention.

Numerical Example 3 (FIG. 67) embodies both the first and second aspect of the invention, and is directed to a single image formation type finder optical system consisting of an image direction-converting element or a deflecting prism including a roof surface 13 and having power, and a deflecting prism having power. It is here noted that FIG. 67 is a Y-Z sectional view including an optical axis. In this example, too, a primary image plane for an object to a pupil plane are described. This finder optical system consists of a deflecting prism having power, which consists of, in order from a primary image plane 30, a first transmitting surface 40, a first reflecting surface 41 having a concave shape and a convex power, a second reflecting surface 42 and a second transmitting surface 43, with the second reflecting surface 42 and first transmitting surface 40 defined by a common surface and rotationally asymmetric surfaces 0 used at the first reflecting surface 41 and second transmitting surface 43, and a deflecting prism having power, which consists a first transmitting surface 44, a first reflecting surface 45 defined by a roof surface 13, a second reflecting surface 46 and a second transmitting surface 47, all independent, with rotationally asymmetric surfaces 0 used at all the surfaces but roof surface 13. In this example, too, the action of an eyepiece is incorporated in the prism by giving power to the prism while rotationally asymmetric decentration aberrations remain well corrected. This arrangement enables size reductions to be achieved in the height direction. This example, too, satisfies the conditions defined herein.

Figure 68:
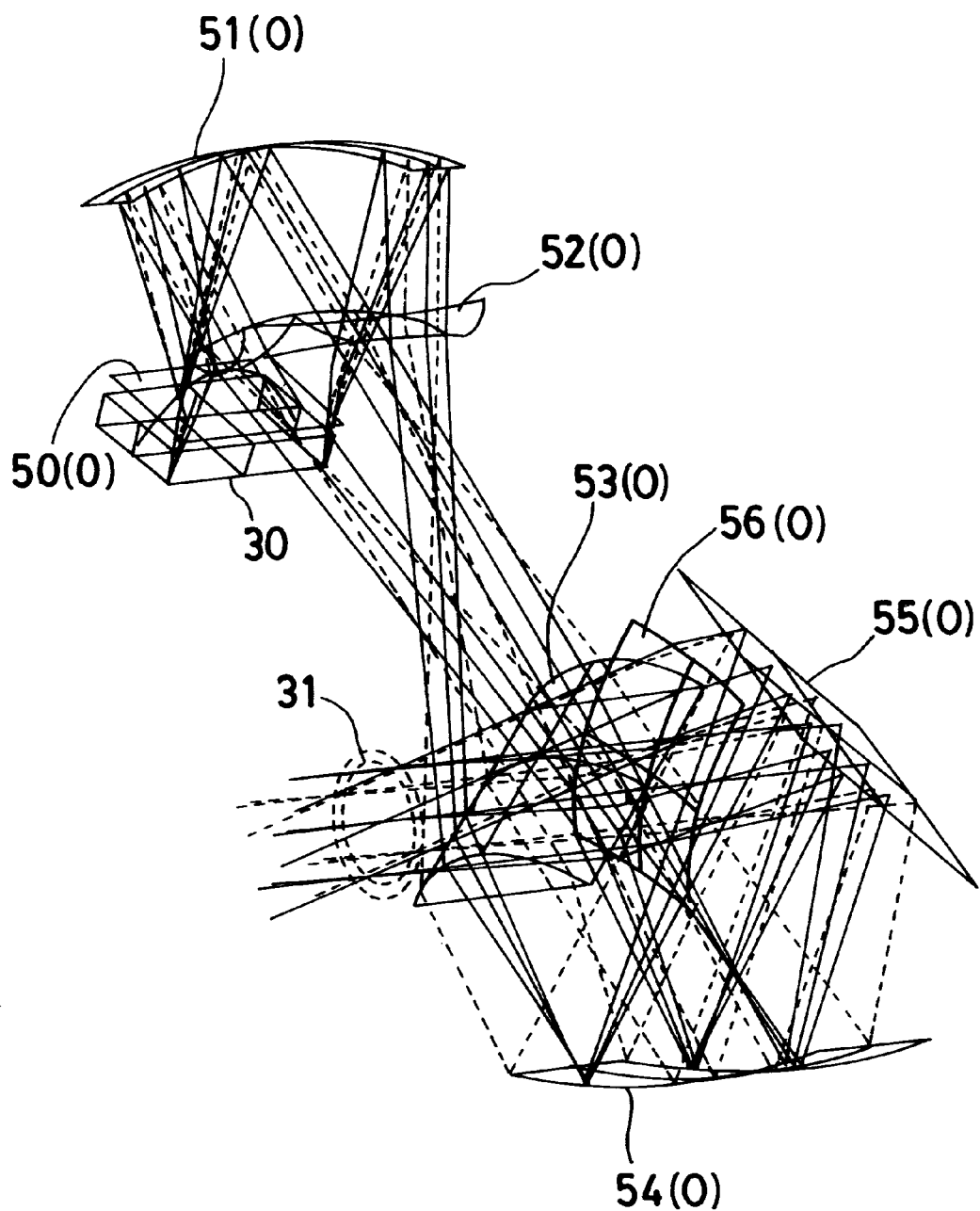
FIG. 68 is a schematic showing Numerical Example 4 of the invention.

Numerical Example 4 (FIG. 68) embodies the second aspect of the invention, and is directed to a single image formation type finder optical system consisting of a single reflection type prism and a double reflection type prism. It is here noted that FIG. 68 is a stereographic view showing prism surfaces alone, and that the horizontal direction is given by half field angle and the vertical direction is given by field angle. In this example, too, a primary image plane 30 for an object to a pupil plane 31 are described. This finder optical system consists of a single reflection type prism having power, which consists of, in order from the primary image plane 30, a first transmitting surface 50, a first reflecting surface 51 having a concave shape and a convex power and a second transmitting surface 52, with rotationally asymmetric surfaces 0 used at all the surfaces, and a double reflection type prism having power, which consists of a first transmitting surface 53, a first reflecting surface 54, a second reflecting surface 55 located at an angle of about 90° with respect to the first reflecting surface 54, and a second transmitting surface 56, all independent, with rotationally asymmetric surfaces 0 used at all the surfaces. In this example, both the prisms act as image direction-converting elements. In this example, too, the action of an eyepiece is incorporated in the prisms by giving power to the prisms while rotationally asymmetric decentration aberrations remain well corrected. This arrangement enables size reductions to be achieved in the height direction, and the directions of the primary image plane and pupil plane to be varied. Thus, it is possible to increase the degree of freedom in the layout of the finder optical system in an optical apparatus and, hence, reduce the size of the optical apparatus itself. This example, too, satisfies the conditions defined herein.

Figure 69:
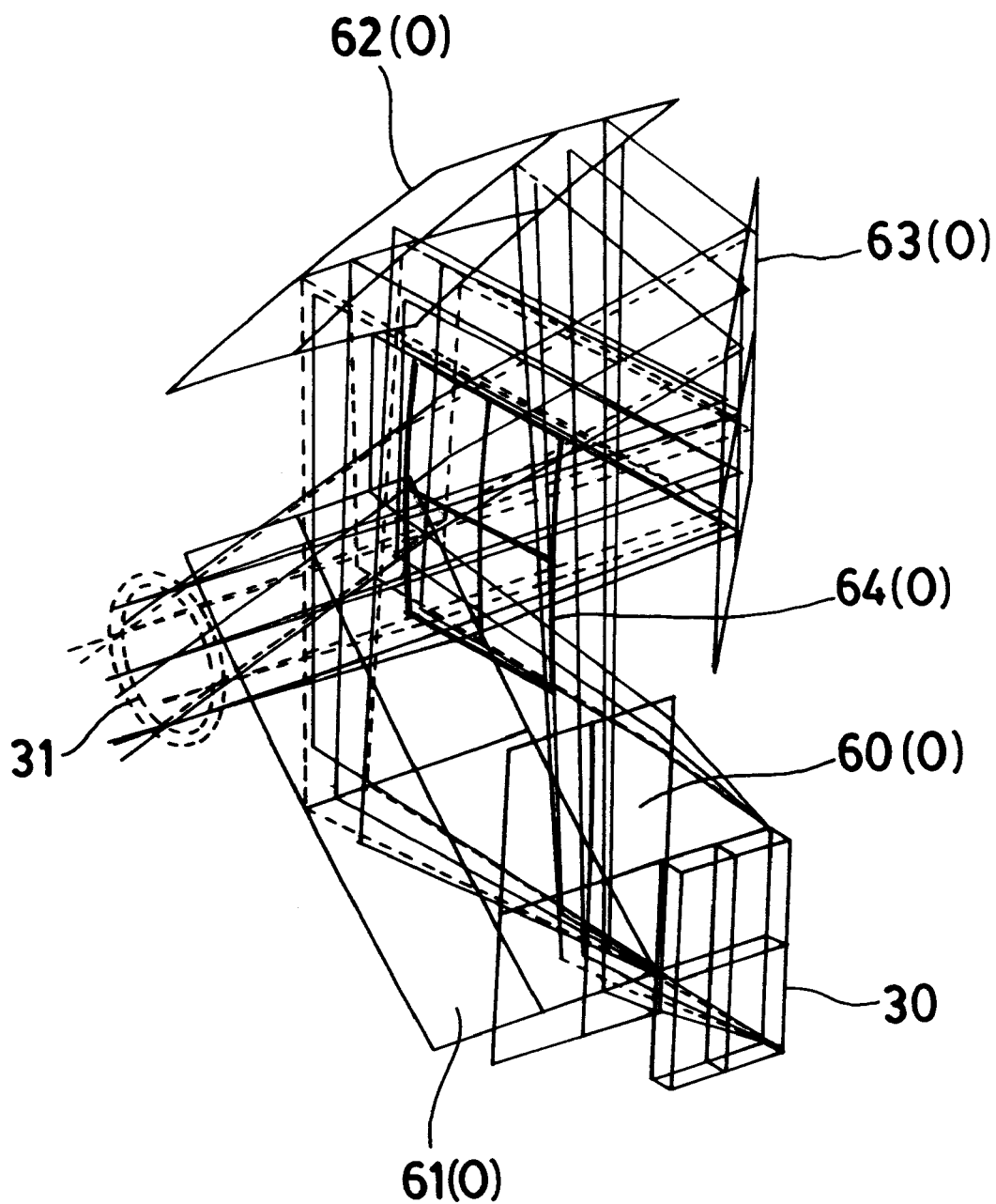
FIG. 69 is a schematic showing Numerical Example 5 of the invention.

Numerical Example 5 (FIG. 69) embodies the second aspect of the invention, and is directed to a single image formation type finder optical system using a Porro prism. As in FIG. 68 for the aforesaid Numerical Example 4, this example is illustrated in the form of a stereographic view. In this example, too, a primary image plane 30 for an object to a pupil plane 31 are described. In this example, a display member such as a field frame is located in the Porro prism which provides a total of four reflections to invert an image vertically and horizontally. Consequently, the Porro prism is divided into two parts so that the image is inverted between the primary image plane and an objective side, and three reflections take place between the primary image plane and a pupil side. Only portions of the prism that provides three reflections are illustrated. More specifically, the prism having power according to this example consists of, in order from the primary image plane 30, a first transmitting surface 60, a first reflecting surface 61 providing vertical reflection, a second reflecting surface 62 providing reflection in a direction vertical to the drawing sheet, a third reflecting surface 63 providing horizontal reflection and a second transmitting surface 64, with rotationally asymmetric surfaces 0 used at all the surfaces. In this example, too, the action of an eyepiece is incorporated in the prism by giving power to the prism while rotationally asymmetric decentration aberrations remain well corrected. This example, too, satisfies the conditions defined herein.

Figure 70:
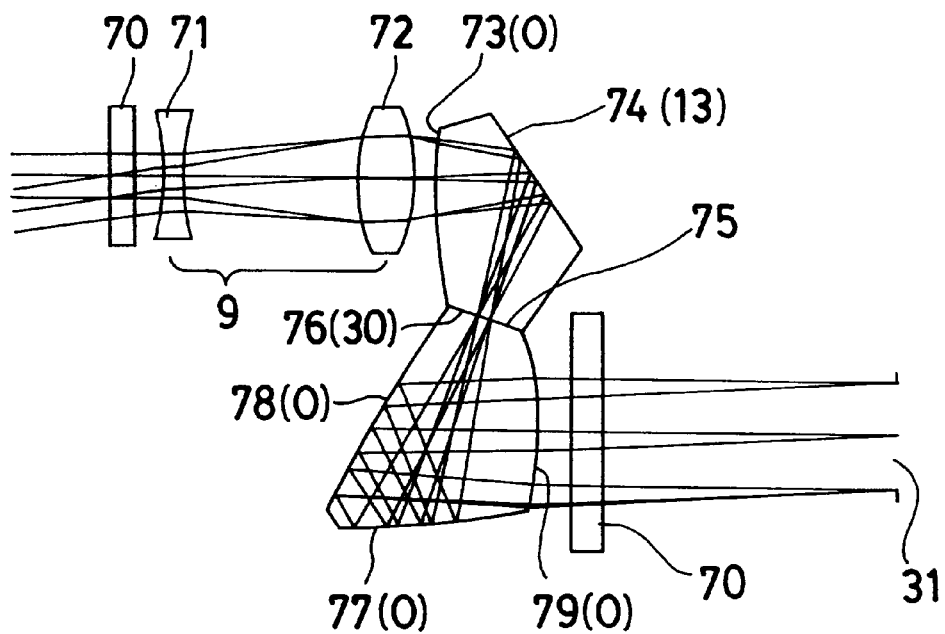
FIG. 70 is a schematic showing an wide-angle end of Numerical Example 6 of the invention.
Figure 71:
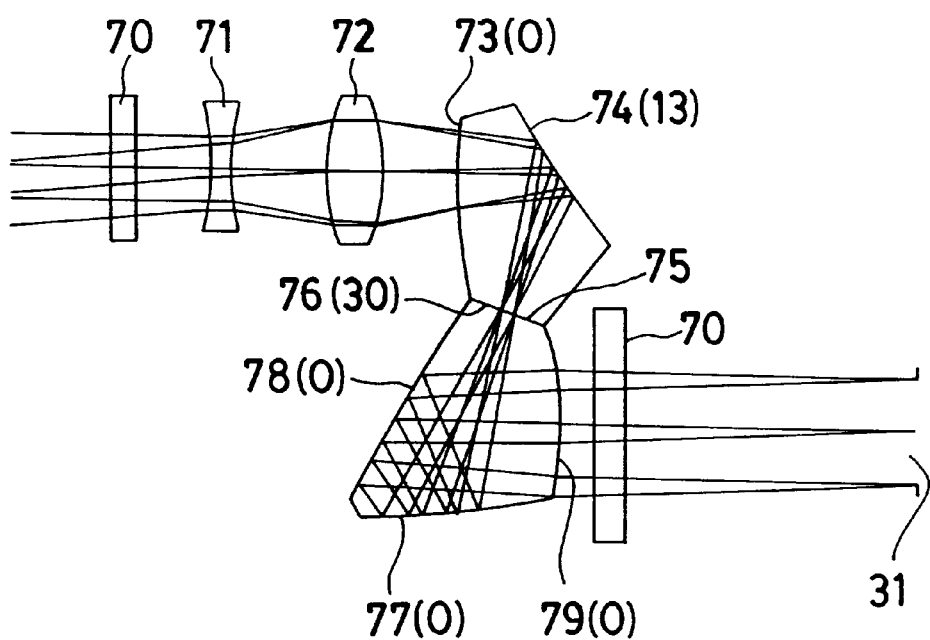
FIG. 71 is a schematic showing a standard setting of Numerical Example 6 of the invention.
Figure 72:
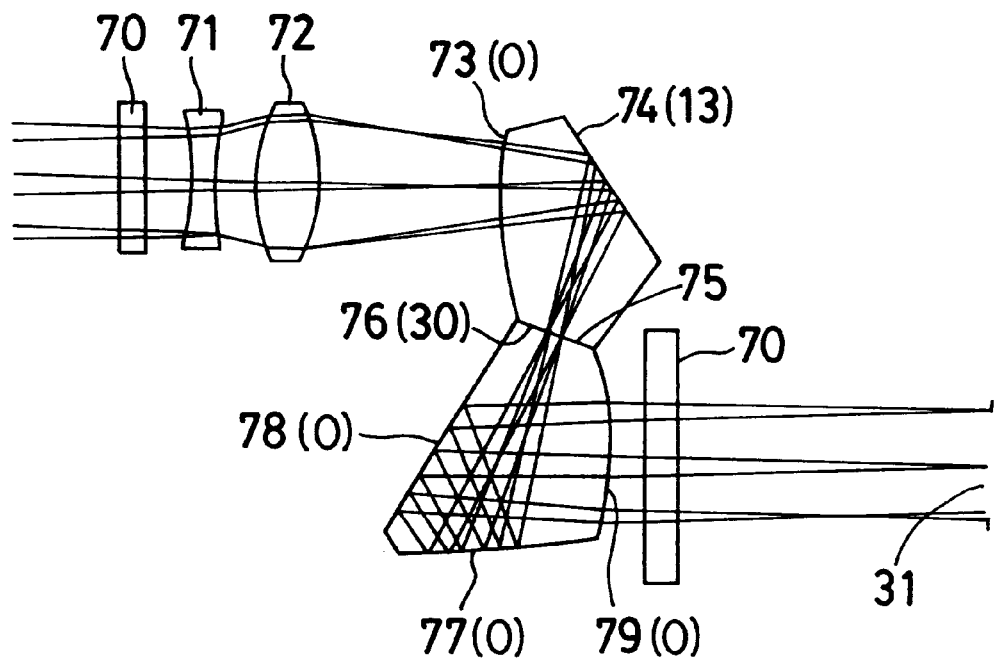
FIG. 72 is a schematic showing a telephoto end of Numerical Example 6 of the invention.

Numerical Example 6 (FIGS. 70, 71 and 72) embodies the first and second aspects of the invention, and is directed to a single image formation type zoom finder optical system consisting of a single reflection type prism and a double reflection type pentagonal prism. In the example directed to a system consisting of an objective and an image inversion optical subsystem, the action of an eyepiece is incorporated in the prisms by giving powers thereto. An objective 9 in the rear of a filter 70 comprises two lens groups, a negative lens 71 and a positive lens 72, with a separation between both the groups being varied for zooming. In this example, the single reflection type prism consists of, in order from the objective 9, a first transmitting surface 73, a first reflecting surface 74 including a roof surface 13 and a second transmitting surface 75, with a rotationally asymmetric surface 0 used at the first transmitting surface 73 to give power thereto. The second transmitting surface 75 of the single reflection type prism is cemented to a first transmitting surface 76 of the pentagonal prism located adjacent thereto, with a primary image plane 30 located on the thus cemented surface (the second transmitting surface 75 and first transmitting surface 76). The next pentagonal prism consists of a first transmitting surface 76, a first reflecting surface 77, a second reflecting surface 78 and a second transmitting surface 79. An axial chief ray crosses over itself in the pentagonal prism in which rotationally asymmetric surfaces 0 are used at all the surfaces but the first transmitting surface. Thus, an eyepiece can be dispensed with while rotationally asymmetric decentration aberrations remain well corrected. In addition, the total length is reduced. This example, too, satisfies the conditions defined herein.

In Numerical Examples 1 to 6 given below, the rotationally asymmetric surfaces are denoted by free form surfaces (FFS for short) and decentration is defined by a surface separation along a chief ray upon reflection at each surface. In these examples, a plane-parallel plate is located at a primary image plane.

In Numerical Example 1, the horizontal half field angle, vertical half field angle and entrance pupil diameter are 10.649°, 8.526° and 5, respectively.

In Numerical Example 2, the horizontal half field angle, vertical half field angle and entrance pupil diameter are 10.649°, 8.526° and 5, respectively.

In Numerical Example 3, the horizontal half field angle, vertical half field angle and entrance pupil diameter are 10.649°, 8.526° and 5, respectively.

In Numerical Example 4, the horizontal half field angle, vertical half field angle and entrance pupil diameter are 10.649°, 8.526° and 5, respectively.

In Numerical Example 5, the horizontal half field angle, vertical half field angle and entrance pupil diameter are 10.649°, 8.526° and 5, respectively.

In Numerical Example 6, the horizontal half field angle, vertical half field angle and entrance pupil diameter are 12.02 to 5.035°, 8.35 to 3.375° and 2 to 4.5, respectively.

NUMERICAL EXAMPLE 1

| Surface No. | Radius of curvature | Surface separation | Displacement and tilt | Refractive index | Abbe's No. |
|---|---|---|---|---|---|
| Pupil plane | ∞ | 15.00 | | | |
| 2 | FFS [1] | 18.00 | | 1.5163 | 64.2 |
| | | Three-dimensional surface (1) | | | |
| 3 | ∞ | −15.00 | (1) | 1.5163 | 64.2 |
| 4 | FFS [2] | 15.00 | (2) | 1.5163 | 64.2 |
| 5 | FFS [3] | 2.00 | | | |
| 6 | ∞ | 1.50 | (3) | 1.5163 | 64.2 |
| Primary image plane | ∞ | | | | |

FFS [1]

| | | | | | |
|---|---|---|---|---|---|
| $C_5$ | 2.0733×10$^{-2}$ | $C_7$ | 2.6375×10$^{-2}$ | $C_8$ | −2.5586 × 10$^{-6}$ |
| $C_{10}$ | −2.2634×10$^{-4}$ | | | | |

FFS [2]

| | | | | | |
|---|---|---|---|---|---|
| $C_5$ | 5.7753×10$^{-3}$ | $C_7$ | 1.2690×10$^{-3}$ | $C_8$ | −5.0639×10$^{-5}$ |
| $C_{10}$ | 1.9674×10$^{-4}$ | | | | |

FFS [3]

| | | | | | |
|---|---|---|---|---|---|
| $C_5$ | 3.0592×10$^{-2}$ | $C_7$ | −4.0264×10$^{-2}$ | $C_8$ | 2.1588×10$^{-3}$ |

-continued

| | | | | | |
|---|---|---|---|---|---|
| $C_{10}$ | 2.1349×10$^{-3}$ | | | | |

Displacement and tilt (1)

| x | 0.000 | y | 0.000 | z | 0.000 |
|---|---|---|---|---|---|
| α | −20.00 | β | 0.00 | γ | 0.00 |

Displacement and tilt (2)

| x | 0.000 | y | 0.000 | z | 0.000 |
|---|---|---|---|---|---|
| α | −25.00 | β | 0.00 | γ | 0.00 |

Displacement and tilt (3)

| x | 0.000 | y | 0.000 | z | 0.000 |
|---|---|---|---|---|---|
| α | 0.00 | β | 0.00 | γ | 0.00 |

NUMERICAL EXAMPLE 2

| Surface No. | Radius of curvature | Surface separation | Displacement and tilt | Refractive index | Abbe's No. |
|---|---|---|---|---|---|
| Pupil plane | ∞ | 15.00 | | | |
| 2 | FFS [1] | 15.00 | | 1.5163 | 64.2 |
| 3 | FFS [2] | −14.00 | (1) | 1.5163 | 64.2 |
| 4 | ∞ | 18.00 | (2) | 1.5163 | 64.2 |
| 5 | FFS [3] | 2.00 | | | |
| 6 | ∞ | 1.50 | (3) | 1.5163 | 64.2 |
| Primary image plane | ∞ | | | | |

FFS [1]

| | | | | | |
|---|---|---|---|---|---|
| $C_5$ | 1.7894 × 10$^{-3}$ | $C_7$ | 2.4778 × 10$^{-2}$ | $C_8$ | 5.0789×10$^{-4}$ |
| $C_{10}$ | 5.9496 × 10$^{-4}$ | | | | |

FFS [2]

| | | | | | |
|---|---|---|---|---|---|
| $C_5$ | −5.9405 × 10$^{-3}$ | $C_7$ | −1.0985 × 10$^{-3}$ | $C_8$ | 4.2161 × 10$^{-5}$ |
| $C_{10}$ | 1.3850 × 10$^{-4}$ | | | | |

FFS [3]

| | | | | | |
|---|---|---|---|---|---|
| $C_5$ | 1.6358 × 10$^{-2}$ | $C_7$ | −4.1246 × 10$^{-2}$ | $C_8$ | −2.7104 × 10$^{-3}$ |
| $C_{10}$ | −1.0022 × 10$^{-3}$ | | | | |

Displacement and tilt (1)

| x | 0.000 | y | 0.000 | z | 0.000 |
|---|---|---|---|---|---|
| α | −25.00 | β | 0.00 | γ | 0.00 |

Displacement and tilt (2)

| x | 0.000 | y | 0.000 | z | 0.000 |
|---|---|---|---|---|---|
| α | −20.00 | β | 0.00 | γ | 0.00 |

Displacement and tilt (3)

| x | 0.000 | y | 0.000 | z | 0.000 |
|---|---|---|---|---|---|
| α | 0.00 | β | 0.00 | γ | 0.00 |

NUMERICAL EXAMPLE 3

| Surface No. | Radius of curvature | Surface separation | Displacement and tilt | Refractive index | Abbe's No. |
|---|---|---|---|---|---|
| Pupil plane | ∞ | 15.00 | | | |
| 2 | FFS [1] | 7.00 | | 1.5163 | 64.2 |
| 3 | FFS [2] | −14.00 | (1) | 1.5163 | 64.2 |
| 4 | ∞ | 8.00 | (2) | 1.5163 | 64.2 |
| 5 | FFS [3] | 1.00 | (3) | | |
| 6 | FFS [4] | 10.00 | (3) | 1.5163 | 64.2 |

-continued

| Surface No. | Radius of curvature | Surface separation | Displacement and tilt | Refractive index | Abbe's No. |
|---|---|---|---|---|---|
| 7 | ∞ | −8.00 | (4) | 1.5163 | 64.2 |
| 8 | FFS [5] | 4.00 | (5) | 1.5163 | 64.2 |
| 9 | ∞ | 1.00 | (3) | | |
| 10 | ∞ | 1.50 | (3) | 1.5163 | 64.2 |
| Primary image plane | ∞ | | | | |

FFS [1]

| | | | | | |
|---|---|---|---|---|---|
| $C_5$ | $1.3954 \times 10^{-2}$ | $C_7$ | $1.7486 \times 10^{-2}$ | $C_8$ | $2.2047 \times 10^{-4}$ |
| $C_{10}$ | $3.4101 \times 10^{-4}$ | | | | |

FFS [2]

| | | | | | |
|---|---|---|---|---|---|
| $C_5$ | $-1.7229 \times 10^{-3}$ | $C_7$ | $-5.6449 \times 10^{-5}$ | $C_8$ | $-6.7664 \times 10^{-6}$ |
| $C_{10}$ | $9.0908 \times 10^{-5}$ | | | | |

FFS [3]

| | | | | | |
|---|---|---|---|---|---|
| $C_5$ | $1.5132 \times 10^{-2}$ | $C_7$ | $-1.0242 \times 10^{-2}$ | $C_8$ | $6.1973 \times 10^{-4}$ |
| $C_{10}$ | $-6.7138 \times 10^{-5}$ | | | | |

FFS [4]

| | | | | | |
|---|---|---|---|---|---|
| $C_5$ | $6.8395 \times 10^{-3}$ | $C_7$ | $1.9752 \times 10^{-2}$ | $C_8$ | $3.3282 \times 10^{-4}$ |
| $C_{10}$ | $3.9128 \times 10^{-4}$ | | | | |

FFS [5]

| | | | | | |
|---|---|---|---|---|---|
| $C_5$ | $1.1379 \times 10^{-2}$ | $C_7$ | $1.0162 \times 10^{-4}$ | $C_8$ | $1.9090 \times 10^{-4}$ |
| $C_{10}$ | $-1.3712 \times 10^{-4}$ | | | | |

Displacement and tilt (1)

| x | 0.000 | y | 0.000 | z | 0.000 |
|---|---|---|---|---|---|
| α | −50.00 | β | 0.00 | γ | 0.00 |

Displacement and tilt (2)

| x | 0.000 | y | 0.000 | z | 0.000 |
|---|---|---|---|---|---|
| α | 35.00 | β | 0.00 | γ | 0.00 |

Displacement and tilt (3)

| x | 0.000 | y | 0.000 | z | 0.000 |
|---|---|---|---|---|---|
| α | −60.00 | β | 0.00 | γ | 0.00 |

Displacement and tilt (4)

| x | 0.000 | y | 0.000 | z | 0.000 |
|---|---|---|---|---|---|
| α | 30.00 | β | 0.00 | γ | 0.00 |

NUMERICAL EXAMPLE 4

| Surface No. | Radius of curvature | Surface separation | Displacement and tilt | Refractive index | Abbe's No. |
|---|---|---|---|---|---|
| Pupil plane | ∞ | 15.00 | | | |
| 2 | FFS [1] | 10.00 | | 1.5163 | 64.2 |
| 3 | FFS [2] | −14.00 | (1) | 1.5163 | 64.2 |
| 4 | FFS [3] | 20.00 | (2) | 1.5163 | 64.2 |
| 5 | FFS [4] | 20.00 | | | |
| 6 | FFS [5] | 10.00 | | 1.5163 | 64.2 |
| 7 | FFS [6] | −10.00 | (3) | 1.5163 | 64.2 |
| 8 | FFS [7] | −1.00 | (4) | | |
| 9 | ∞ | −1.50 | (4) | 1.5163 | 64.2 |
| Primary image plane | ∞ | | | | |

FFS [1]

| | | | | | |
|---|---|---|---|---|---|
| $C_5$ | $4.6781 \times 10^{-2}$ | $C_6$ | $6.1965 \times 10^{-3}$ | $C_7$ | $-5.2188 \times 10^{-2}$ |
| $C_8$ | $-1.4951 \times 10^{-4}$ | $C_9$ | $-6.8782 \times 10^{-4}$ | $C_{10}$ | $4.4948 \times 10^{-4}$ |
| $C_{11}$ | $4.4756 \times 10^{-3}$ | | | | |

FFS [2]

| | | | | | |
|---|---|---|---|---|---|
| $C_5$ | $-1.2442 \times 10^{-3}$ | $C_6$ | $5.3960 \times 10^{-4}$ | $C_7$ | $-5.5870 \times 10^{-4}$ |
| $C_8$ | $8.3321 \times 10^{-6}$ | $C_9$ | $6.4891 \times 10^{-5}$ | $C_{10}$ | $9.2911 \times 10^{-5}$ |

-continued

| Surface No. | Radius of curvature | Surface separation | Displacement and tilt | Refractive index | Abbe's No. |
|---|---|---|---|---|---|
| $C_{11}$ | $4.4591 \times 10^{-5}$ | | | | |

FFS [3]

| | | | | | |
|---|---|---|---|---|---|
| $C_5$ | $-2.4003 \times 10^{-3}$ | $C_6$ | $-3.9420 \times 10^{-4}$ | $C_7$ | $8.4519 \times 10^{-3}$ |
| $C_8$ | $-3.7064 \times 10^{-6}$ | $C_9$ | $-4.0629 \times 10^{-4}$ | $C_{10}$ | $4.4390 \times 10^{-5}$ |
| $C_{11}$ | $-3.8782 \times 10^{-5}$ | | | | |

FFS [4]

| | | | | | |
|---|---|---|---|---|---|
| $C_5$ | $-1.0329 \times 10^{-1}$ | $C_6$ | $-3.0332 \times 10^{-3}$ | $C_7$ | $3.1482 \times 10^{-3}$ |
| $C_8$ | $-6.1763 \times 10^{-5}$ | $C_9$ | $-6.8096 \times 10^{-4}$ | $C_{10}$ | $2.0677 \times 10^{-4}$ |
| $C_{11}$ | $-2.2350 \times 10^{-4}$ | | | | |

FFS [5]

| | | | | | |
|---|---|---|---|---|---|
| $C_5$ | $-1.1017 \times 10^{-3}$ | $C_6$ | $-1.3903 \times 10^{-2}$ | $C_7$ | $2.8337 \times 10^{-1}$ |
| $C_8$ | $-2.8495 \times 10^{-4}$ | $C_9$ | $-1.1519 \times 10^{-2}$ | $C_{10}$ | $-1.6546 \times 10^{-3}$ |
| $C_{11}$ | $2.9591 \times 10^{-2}$ | | | | |

FFS [6]

| | | | | | |
|---|---|---|---|---|---|
| $C_5$ | $-2.3422 \times 10^{-2}$ | $C_6$ | $-1.4201 \times 10^{-3}$ | $C_7$ | $-9.5737 \times 10^{-3}$ |
| $C_8$ | $-4.7775 \times 10^{-5}$ | $C_9$ | $6.7646 \times 10^{-4}$ | $C_{10}$ | $-8.4024 \times 10^{-5}$ |
| $C_{11}$ | $1.0122 \times 10^{-4}$ | | | | |

FFS [7]

| | | | | | |
|---|---|---|---|---|---|
| $C_5$ | $-1.1727 \times 10^{-1}$ | $C_6$ | $-1.3664 \times 10^{-2}$ | $C_7$ | $1.2916 \times 10^{-1}$ |
| $C_9$ | $2.3417 \times 10^{-2}$ | $C_{11}$ | $-7.6494 \times 10^{-3}$ | | |

Displacement and tilt (1)

| x | 0.000 | y | 0.000 | z | 0.000 |
|---|---|---|---|---|---|
| α | 45.00 | β | 0.00 | γ | 0.00 |

Displacement and tilt (2)

| x | 0.000 | y | 0.000 | z | 0.000 |
|---|---|---|---|---|---|
| α | 0.00 | β | −35.00 | γ | 0.00 |

Displacement and tilt (3)

| x | 0.000 | y | 0.000 | z | 0.000 |
|---|---|---|---|---|---|
| α | 0.00 | β | 35.00 | γ | 0.00 |

Displacement and tilt (4)

| x | 0.000 | y | 0.000 | z | 0.000 |
|---|---|---|---|---|---|
| α | 0.00 | β | 0.00 | γ | 0.00 |

NUMERICAL EXAMPLE 5

| Surface No. | Radius of curvature | Surface separation | Displacement and tilt | Refractive index | Abbe's No. |
|---|---|---|---|---|---|
| Pupil plane | ∞ | 15.00 | | | |
| 2 | FFS [1] | 10.00 | | 1.5163 | 64.2 |
| 3 | FFS [2] | −20.00 | (1) | 1.5163 | 64.2 |
| 4 | FFS [3] | 20.00 | (2) | 1.5163 | 64.2 |
| 5 | FFS [4] | −10.00 | (2) | 1.5163 | 64.2 |
| 6 | FFS [5] | −7.00 | | | |
| 7 | ∞ | −1.00 | | 1.5163 | 64.2 |
| Primary image plane | ∞ | | | | |

FFS [1]

| | | | | | |
|---|---|---|---|---|---|
| $C_5$ | $8.9516 \times 10^{-3}$ | $C_7$ | $4.9412 \times 10^{-4}$ | | |

FFS [2]

| | | | | | |
|---|---|---|---|---|---|
| $C_5$ | $2.6250 \times 10^{-5}$ | $C_7$ | $-9.0467 \times 10^{-4}$ | $C_9$ | $-1.1504 \times 10^{-6}$ |
| $C_{11}$ | $1.0591 \times 10^{-5}$ | | | | |

FFS [3]

| | | | | | |
|---|---|---|---|---|---|
| $C_5$ | $2.0269 \times 10^{-3}$ | $C_7$ | $4.7410 \times 10^{-3}$ | $C_8$ | $-1.9657 \times 10^{-5}$ |
| $C_{10}$ | $-2.6442 \times 10^{-5}$ | | | | |

-continued

| Surface No. | Radius of curvature | Surface separation | Displacement and tilt | Refractive index | Abbe's No. |
|---|---|---|---|---|---|
| FFS [4] | | | | | |
| $C_5$ $-2.4040 \times 10^{-3}$ | | $C_7$ $-4.5566 \times 10^{-3}$ | | $C_8$ $-6.1646 \times 10^{-5}$ | |
| $C_{10}$ $-9.6855 \times 10^{-5}$ | | | | | |
| FFS [5] | | | | | |
| $C_5$ $1.1833 \times 10^{-2}$ | | $C_7$ $5.9163 \times 10^{-3}$ | | | |
| Displacement and tilt (1) | | | | | |
| x 0.000 | | y 0.000 | | z 0.000 | |
| α 0.00 | | β 45.00 | | γ 0.00 | |
| Displacement and tilt (2) | | | | | |
| x 0.000 | | y 0.000 | | z 0.000 | |
| α −45.00 | | β 0.00 | | γ 0.00 | |

NUMERICAL EXAMPLE 6

| Surface No. | Radius of curvature | Surface separation | Displacement and tilt | Refractive index | Abbe's No. |
|---|---|---|---|---|---|
| Object plane | ∞ | ∞ | | | |
| 1 | ∞ (Filter) | 1.20 | | 1.4924 | 57.7 |
| 2 | ∞ | 1.35 | | | |
| 3 | −12.110 | 1.00 | | 1.5842 | 30.5 |
| 4 | 10.632 | (Variable space 1) | | | |
| 5 | 7.573 | 2.80 | | 1.5256 | 56.4 |
| (Rotatinaly symmetric aspheric surface 1) | | | | | |
| 6 | −7.753 | (Variable space 2) | | | |
| (Rotatinaly symmetric aspheric surface 2) | | | | | |
| 7 | FFS [1] | 5.00 | | 1.5256 | 56.4 |
| 8 | ∞ | −7.00 | (1) | 1.5256 | 56.4 |
| 9 | ∞ | −10.00 | | 1.4526 | 56.4 |
| 10 | FFS [2] | 5.00 | (2) | 1.4526 | 56.4 |
| 11 | FFS [3] | −8.00 | (3) | 1.4526 | 56.4 |
| 12 | FFS [4] | −1.54 | | | |
| 13 | ∞ (Filter) | −1.50 | | 1.4924 | 57.7 |
| 14 | ∞ | −13.96 | | | |
| Pupil plane | ∞ | | | | |

ASPHERIC SURFACE 1

K: 0.086700
A: $-0.640200 \times 10^{-3}$  B: $0.739810 \times 10^{-6}$  C: $-0.0249480 \times 10^{-5}$
D: $0.108710 \times 10^{-6}$

ASPHERIC SURFACE 2

K: 0.000000
A: $0.485540 \times 10^{-3}$  B: $-0.346580 \times 10^{-4}$  C: $0.164790 \times 10^{-5}$
D: $-0.286620 \times 10^{-7}$

FFS [1]

$C_5$ $3.5269 \times 10^{-2}$  $C_7$ $3.1737 \times 10^{-2}$  $C_{10}$ $6.5581 \times 10^{-5}$
$C_{19}$ $4.7238 \times 10^{-5}$ -continued

FFS [2]

$C_5$ $7.0840 \times 10^{-3}$  $C_7$ $7.4402 \times 10^{-3}$  $C_{10}$ $-2.0282 \times 10^{-4}$
$C_{19}$ $-6.1077 \times 10^{-5}$

FFS [3]

$C_5$ $-4.5395 \times 10^{-3}$  $C_7$ $-5.3310 \times 10^{-3}$  $C_{10}$ $-1.0935 \times 10^{-4}$
$C_{19}$ $-1.6964 \times 10^{-5}$

FFS [4]

$C_5$ $3.9732 \times 10^{-2}$  $C_7$ $4.6336 \times 10^{-2}$

Displacement and tilt (1)

x 0.000  y 0.000  z 0.000
α 36.00  β 0.00  γ 0.00

Displacement and tilt (2)

x 0.000  y 0.000  z 0.000
α 24.00  β 0.00  γ 0.00

Displacement and tilt (3)

x 0.000  y 0.000  z 0.000
α 30.00  β 0.00  γ 0.00

| | Wide end | Standard | Telephoto end |
|---|---|---|---|
| Zooming Variable space 1 | 8.12729 | 4.45007 | 1.85003 |
| Zooming Variable space 2 | 0.87509 | 3.49859 | 8.07038 |

It is noted that the rotationally asymmetric aspheric surfaces used in these numerical examples are defined by the following equation:

$$Z=(Y^2/R)/[1+[1-(K+1)(Y/R)^2]^{(1/2)}]+AY^4+BY^6+CY^8+DY^{10}+\ldots$$

Here Z is an optical axis (axial chief ray) with the proviso that the direction of propagation of light is positive, Y is a direction vertical to the optical axis, R is a paraxial radius of curvature, K is a conical coefficient, and A, B, C, D, . . . are fourth, sixth, eighth, tenth, . . . aspherical coefficients.

Set out below the values of conditions (2-1) and (1-1) regarding the free from surfaces in Numerical Examples 1 to 6.

| | | |Cxn| | |DY| |
|---|---|---|---|
| Example 1 | (4th surface) | 0.0025 | 0.0051 |
| 2 | (3rd surface) | 0.0022 | 0.0021 |
| 3 | (3rd surface) | 0.0001 | 0.0011 |
| 3 | (8th surface) | 0.0002 | 0.0035 |
| 4 | (3rd surface) | 0.0012 | 0.0004 |
| 4 | (4th surface) | 0.0169 | 0.0004 |
| 4 | (7th surface) | 0.0191 | 0.0025 |
| 5 | (3rd surface) | 0.0018 | 0.0000 |
| 5 | (4th surface) | 0.0095 | 0.0010 |
| 5 | (5th surface) | 0.0091 | 0.0040 |
| 6 | (11th surface) | 0.1490 | 0.0008 |
| 6 | (12th surface) | 0.0001 | 0.0002 |

As can be understood from the foregoing description, the present invention can provide a compact yet high-performance finder optical system with aberrations produced by decentration corrected by rotationally asymmetric surfaces.

What we claim is:

1. A single image formation type finder optical system comprising:
    an objective lens-acting surface which forms an object image;
    an image inversion optical subsystem which erects the object image; and an eyepiece lens-acting surface which guides the object image to a location where it may be observed, wherein the image inversion optical subsystem comprises in order from an object side thereof, a first prism, and a second prism, the second prism comprising, a first surface through which light enters the second prism after having exited the first prism, a second surface which reflects light incident from the first surface, a third surface which reflects light incident from the second surface, and a fourth surface through which light incident from the third surface exits said fourth surface on a pupil plane side thereof, the first prism comprising, a fifth surface through which light enters the first prism from an object side thereof, a sixth surface which reflects light incident from the fifth surface, a seventh surface through which light incident from the sixth surface exits the second prism, the second prism constructed and arranged such that an optical path connecting the first surface to the second surface crosses over an optical path connecting the third surface to the fourth surface, and at least one of the second surface and the third surface having a power and having a rotationally asymmetric surface.

2. A finder optical system according to claim 1, wherein the rotationally asymmetric surface has no axis of rotational symmetry, neither intercepting nor non-intercepting the rotationally asymmetric surface.

3. A finder optical system according to claim 1, wherein the rotationally asymmetric surface is a toric surface.

4. A finder optical system according to claim 1, wherein the rotational asymmetric surface is an anamorphic surface.

5. A finder optical system according to claim 2, the rotationally asymmetric surface is a free form surface symmetric with respect to a plane.

* * * * *